United States Patent
Tokuchi

(10) Patent No.: US 10,621,400 B2
(45) Date of Patent: Apr. 14, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/113,179

(22) Filed: Aug. 27, 2018

(65) Prior Publication Data

US 2019/0258839 A1 Aug. 22, 2019

(30) Foreign Application Priority Data

Feb. 20, 2018 (JP) .................. 2018-027795

(51) Int. Cl.
*G06K 7/10* (2006.01)
*G06K 7/14* (2006.01)

(52) U.S. Cl.
CPC .................. *G06K 7/1417* (2013.01)

(58) Field of Classification Search
CPC .................................... G06K 7/1417
USPC .................................... 235/462.01
See application file for complete search history.

(56) References Cited

U.S. PATENT DOCUMENTS

| | | | | |
|---|---|---|---|---|
| 5,977,938 A | * | 11/1999 | Iwasa | G02B 27/2292 345/32 |
| 2007/0272728 A1 | * | 11/2007 | Dzialas | B23K 20/12 228/114.5 |
| 2008/0074659 A1 | * | 3/2008 | Mangan | G01N 21/21 356/237.6 |
| 2009/0049072 A1 | * | 2/2009 | Wakahara | G03G 21/046 |
| 2009/0134225 A1 | * | 5/2009 | Koike | G03G 15/50 235/462.01 |
| 2010/0092241 A1 | * | 4/2010 | Arshad | G06K 9/00651 405/52 |
| 2012/0132701 A1 | * | 5/2012 | Nakagawa | G06K 17/0022 235/375 |
| 2015/0193963 A1 | * | 7/2015 | Chen | G06K 9/0063 345/426 |
| 2015/0254486 A1 | * | 9/2015 | Shigemitsu | G06F 3/005 235/462.11 |
| 2016/0306354 A1 | * | 10/2016 | Tillmann | G01C 11/02 |
| 2018/0005117 A1 | * | 1/2018 | Allen | G06N 5/02 |
| 2018/0130008 A1 | * | 5/2018 | Liu | G06Q 10/083 |

FOREIGN PATENT DOCUMENTS

JP 4382831 B2 12/2009
JP 2017-062709 A 3/2017

* cited by examiner

*Primary Examiner* — Tuyen K Vo
(74) *Attorney, Agent, or Firm* — Oliff PLC

(57) ABSTRACT

An information processing apparatus includes a control unit that controls formation of a graphical code image in air.

27 Claims, 51 Drawing Sheets

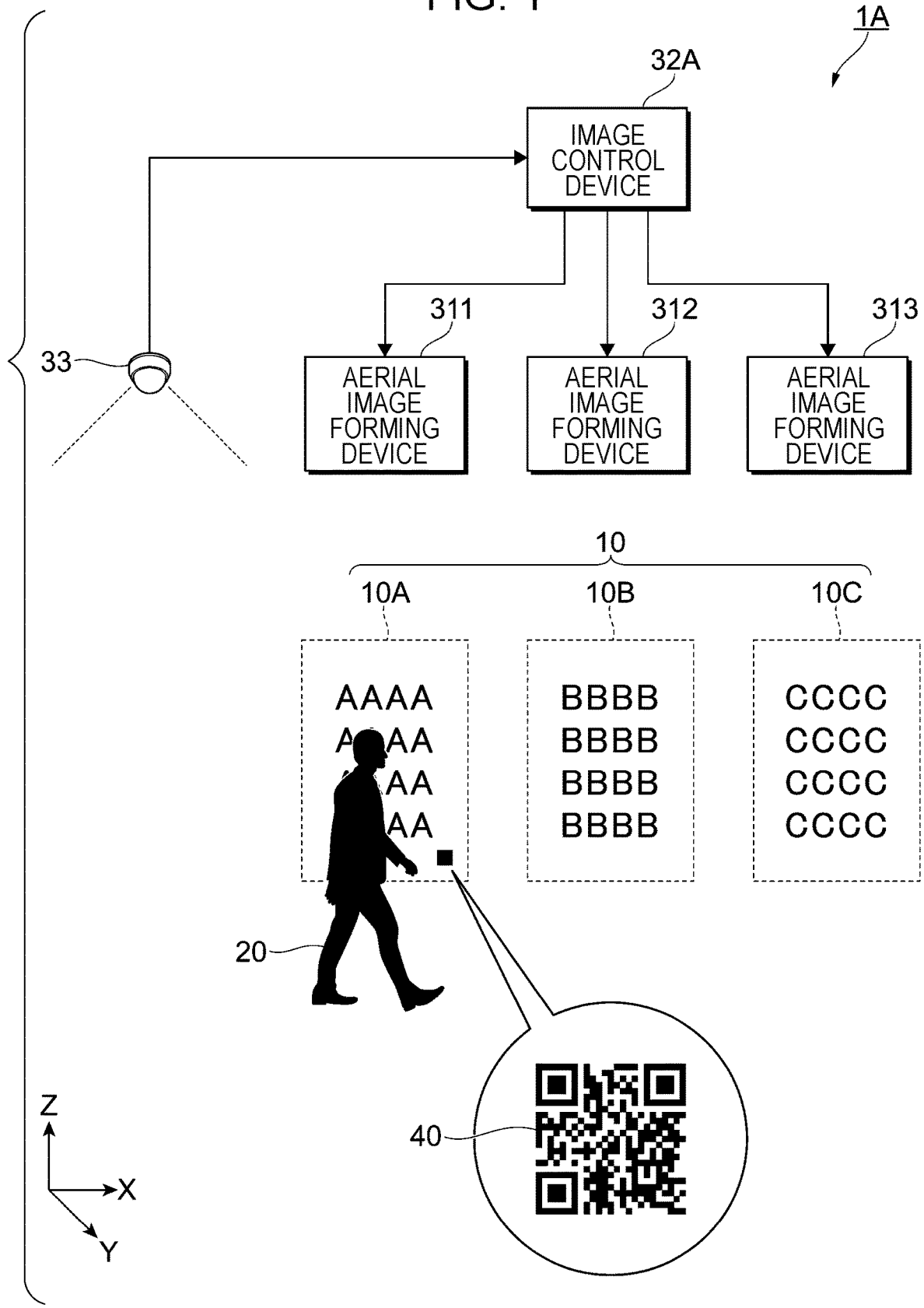

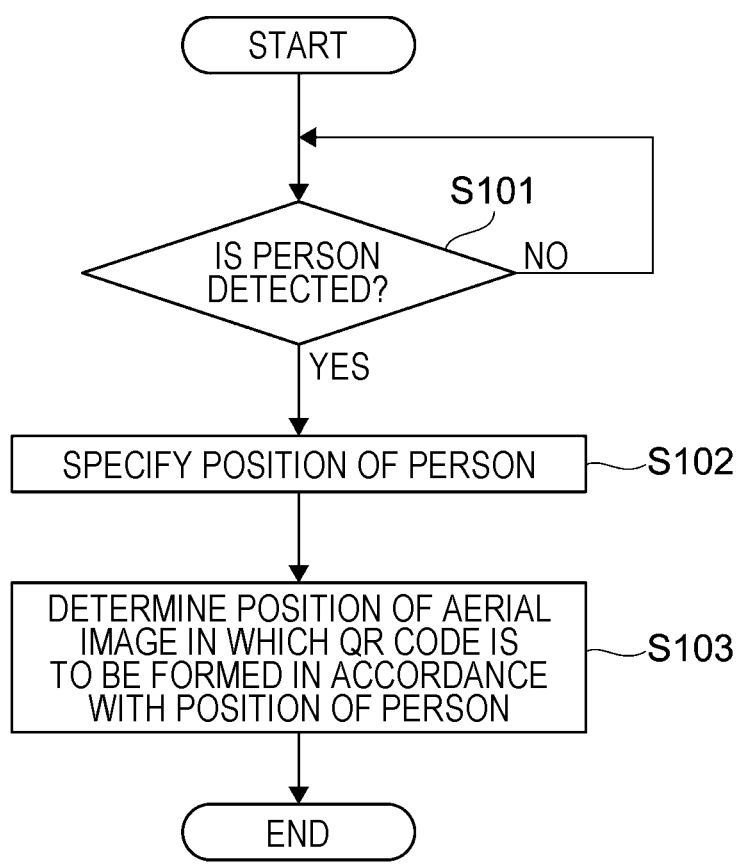

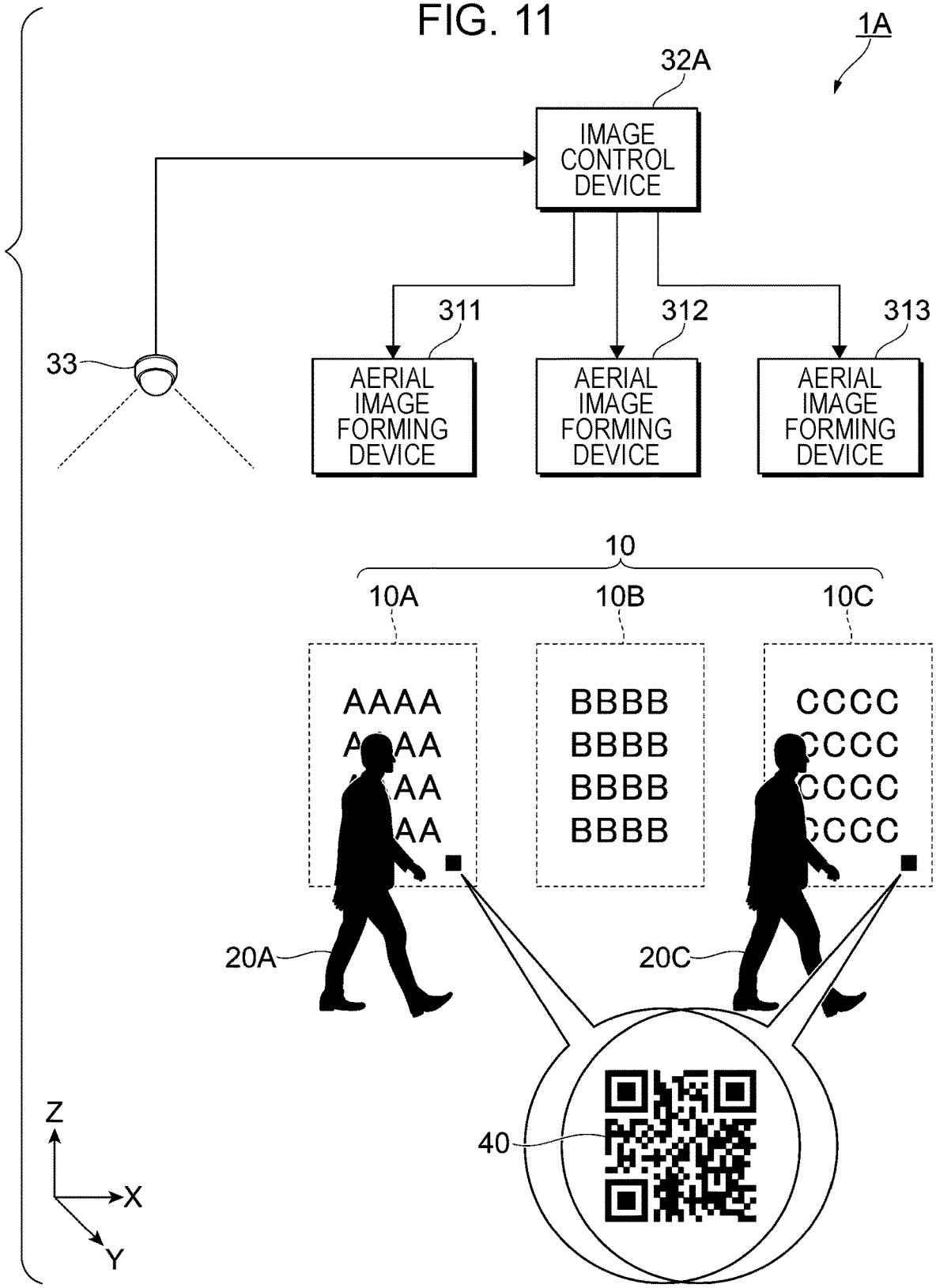

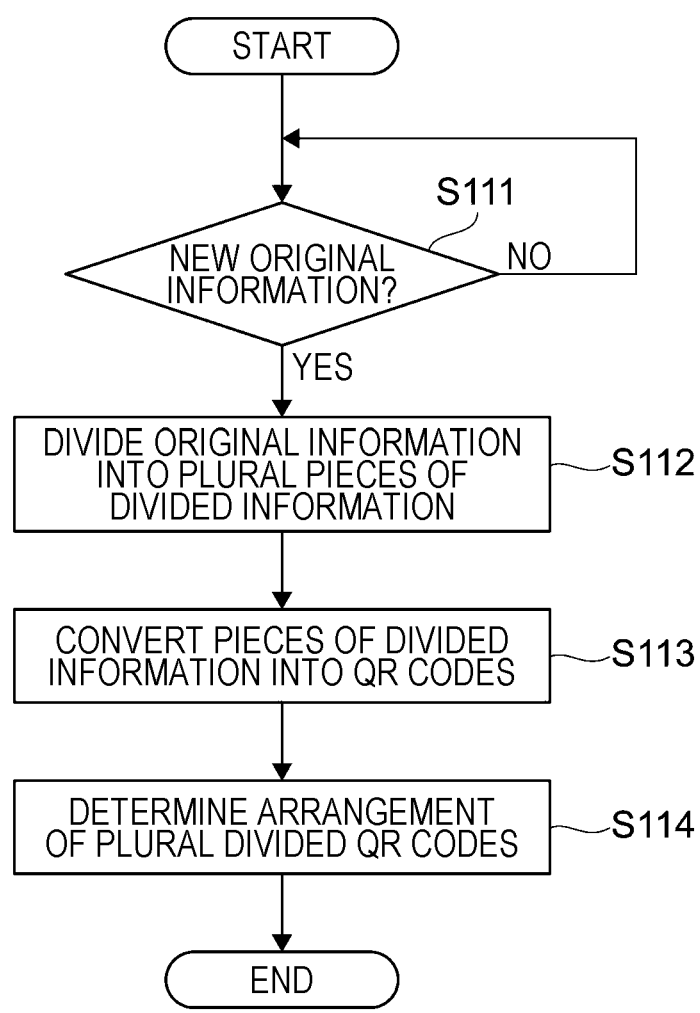

READING ORDER: GREEN → YELLOW → RED

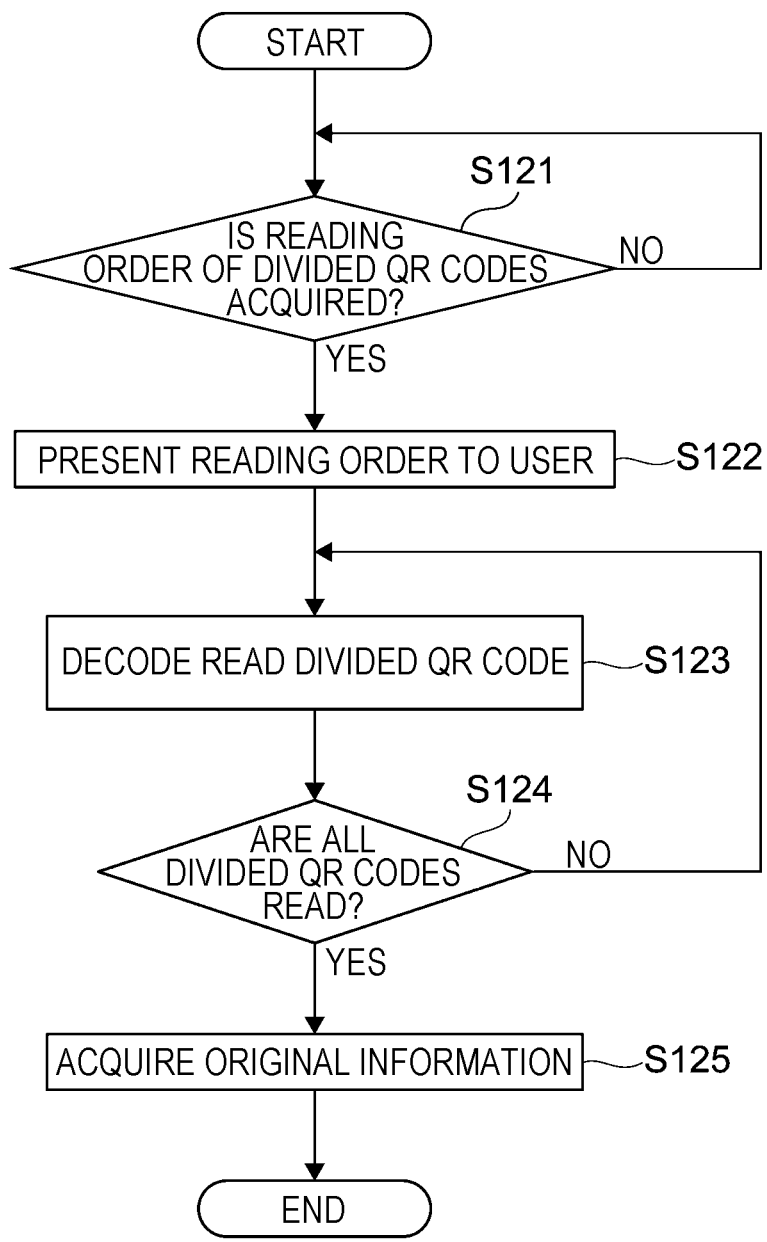

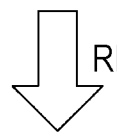 REMOVE NON-BLACK PORTION

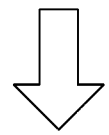

FIG. 30A
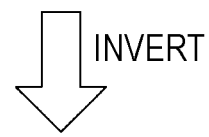 INVERT
FIG. 30B

FIG. 34A  T0 = 0 SECONDS
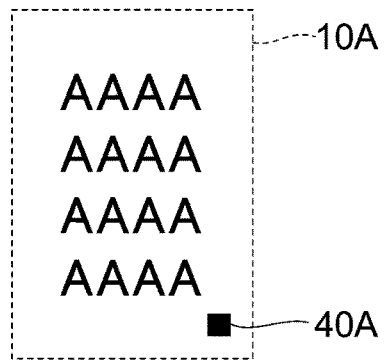
FIG. 34B  T1 = 10 SECONDS
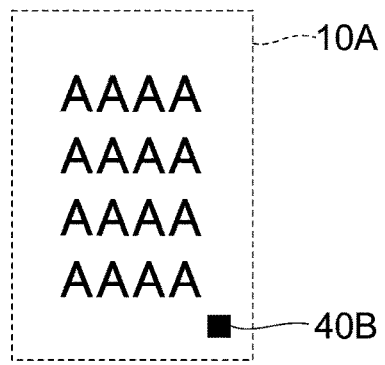
FIG. 34C  T2 = 20 SECONDS
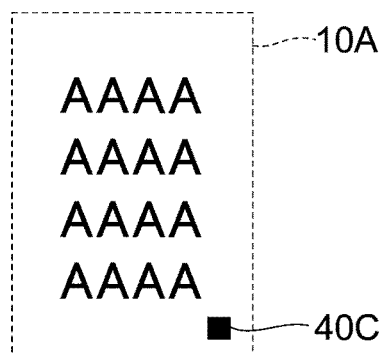
FIG. 34D  T3 = 30 SECONDS
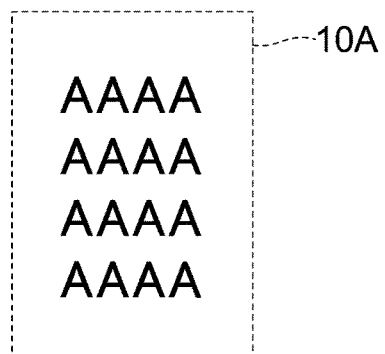

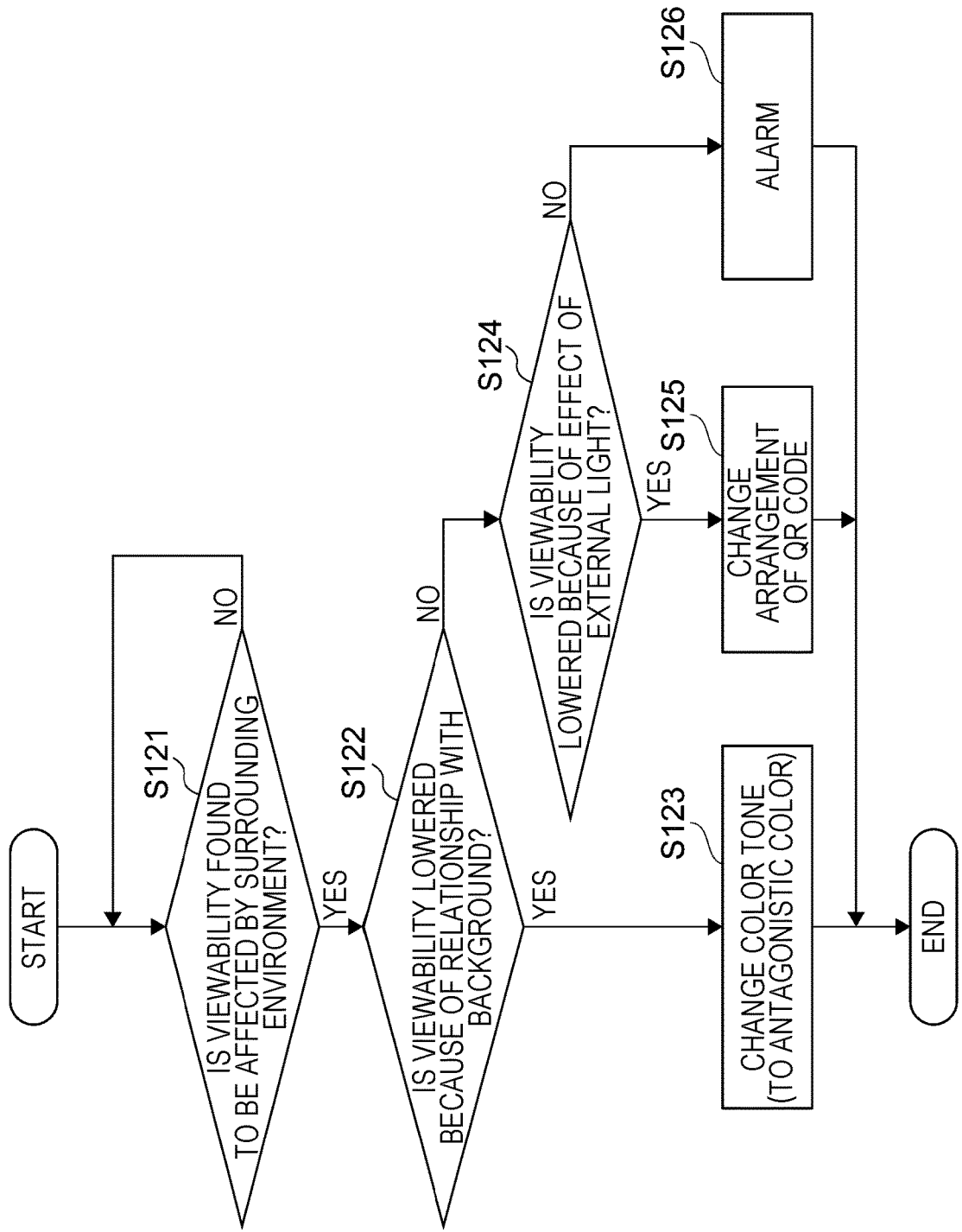

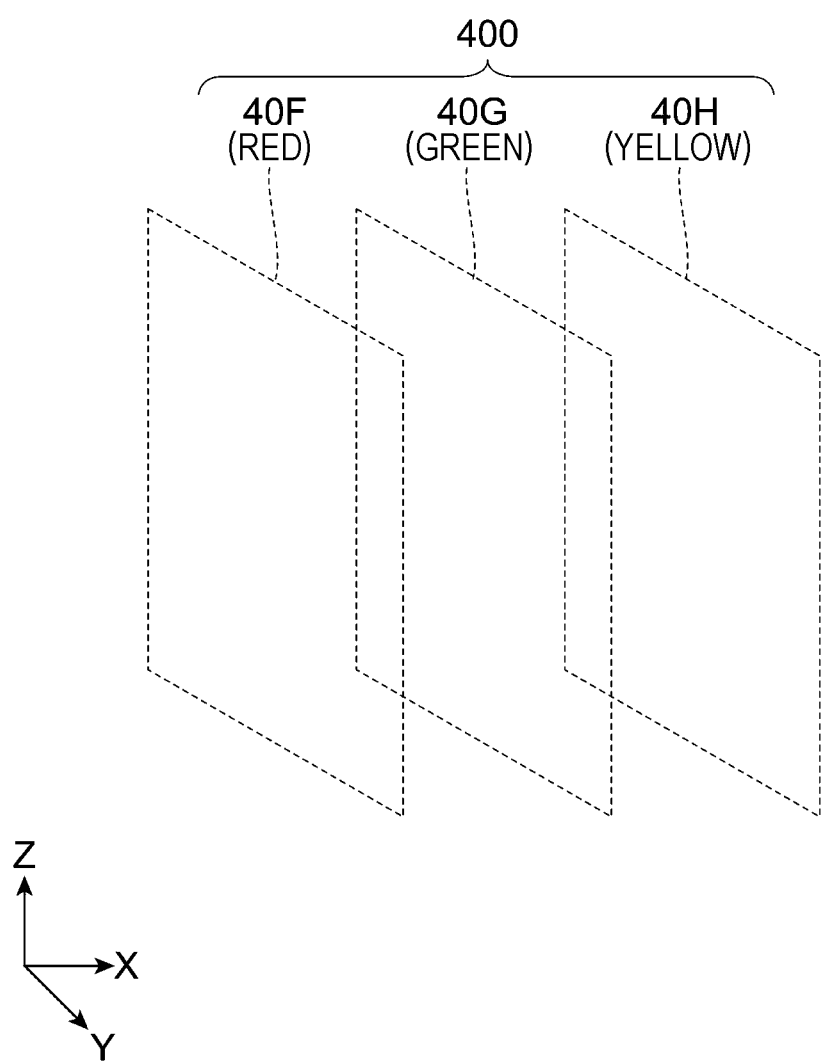

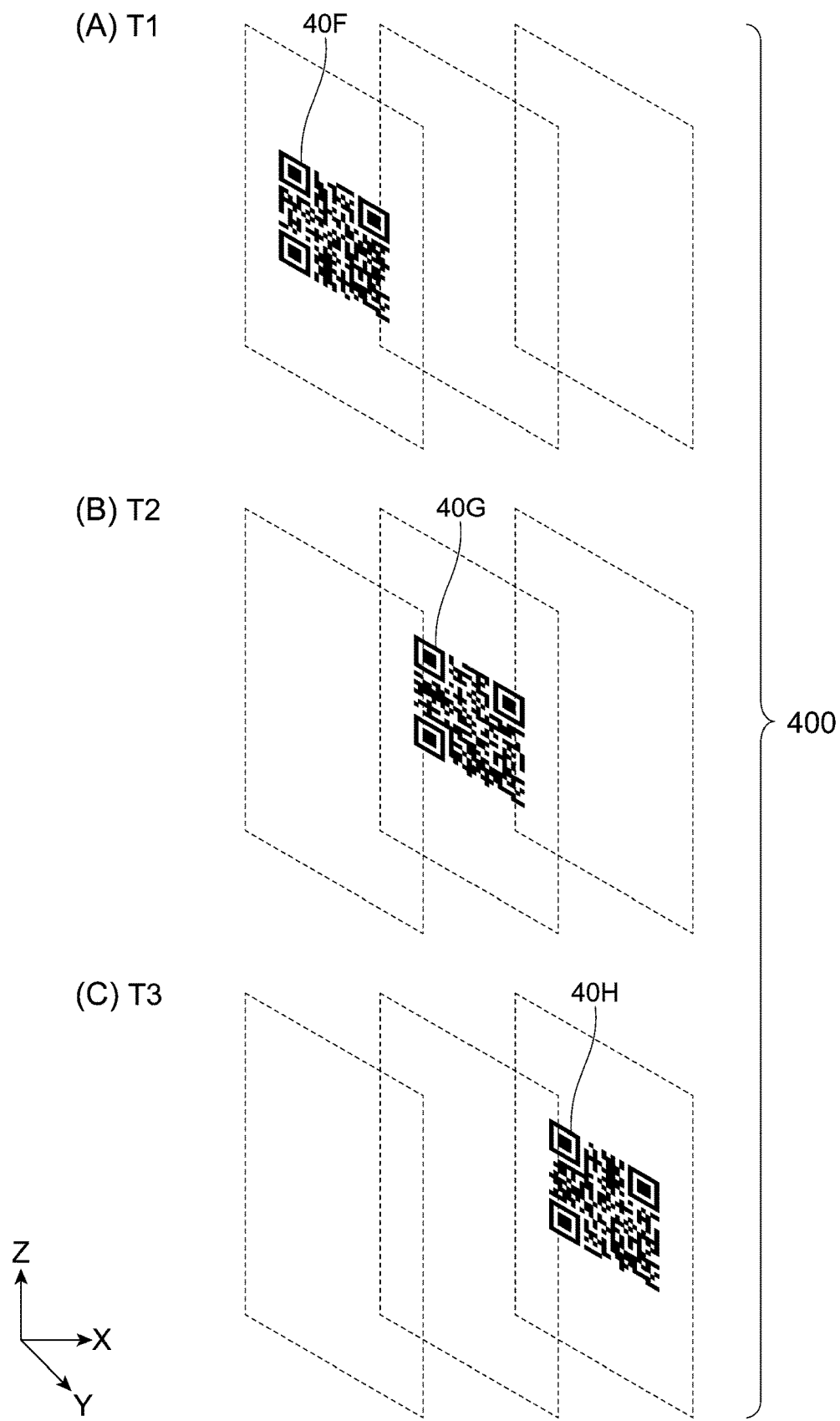

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-027795 filed Feb. 20, 2018.

BACKGROUND (i) Technical Field

The present invention relates to an information processing apparatus and a non-transitory computer readable medium.

(ii) Related Art

There is a technology of causing rays of light to intersect each other in the air to form an image at the crossing point of the rays of light. Such an image displayed by this type of technology is called an "aerial image".

SUMMARY

According to an aspect of the present invention, there is provided an information processing apparatus including a control unit that controls formation of a graphical code image in air.

BRIEF DESCRIPTION OF THE DRAWINGS

Exemplary embodiments of the present invention will be described in detail based on the following figures, wherein:

FIG. 1 illustrates a schematic configuration of an aerial image forming system according to a first exemplary embodiment;

FIG. 9 is a flowchart illustrating an overview of processing operation executed by the image control device according to the first exemplary embodiment;

FIG. 11 illustrates an example of formation of QR codes for a case where plural persons are positioned in front of different aerial images;

FIG. 18 is a flowchart illustrating an overview of processing operation executed by the image control device according to the second exemplary embodiment;

FIG. 26 is a flowchart illustrating an overview of processing operation executed by the smartphone;

FIGS. 30A and 30B illustrate a process performed in the case where an image of a divided QR code is captured from the back side of an aerial image, with FIG. 30A illustrating an image before processing and with FIG. 30B illustrating an image after processing;

FIGS. 34A to 34D each illustrate an example of a divided QR code that is output, with FIGS. 34A to 34D illustrating an example of a divided QR code formed at time T0, time T1, time T2, and time T3, respectively;

FIG. 41 is a flowchart illustrating an overview of processing operation executed by the image control device according to the fifth exemplary embodiment;

FIG. 50 illustrates an example of a code that has a three-dimensional structure; and FIG. 51 illustrates an example of forming divided codes one by one in a time-sharing manner, in which (A), (B), and correspond to time T1, time T2, and time T3, respectively.

DETAILED DESCRIPTION

Figure 2A:
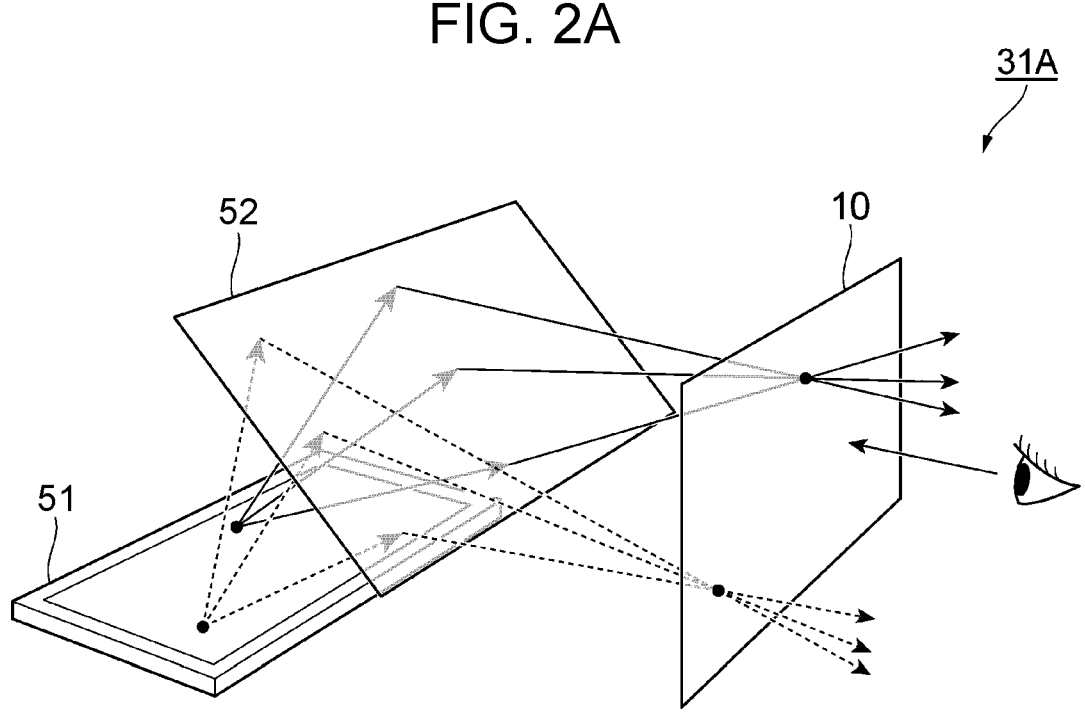
FIGS. 2A and 2B illustrate the principle of an aerial image forming device that forms an aerial image by allowing light output from a display device to pass through a dedicated optical plate, with FIG. 2A illustrating the positional relationship between members and the aerial image and with FIG. 2B illustrating a part of the sectional structure of the optical plate.

Exemplary embodiments of the present invention will be described below with reference to drawings.

<First Exemplary Embodiment>

<Schematic Configuration of Aerial Image Forming System>

FIG. 1 illustrates a schematic configuration of an aerial image forming system 1A according to a first exemplary embodiment. The aerial image forming system 1A is an example of an information processing system.

In the present exemplary embodiment, an aerial image 10 is an image formed in the air so as to reproduce a state of light that is equivalent to that of light reflected from an object.

The aerial image 10 is formed so as to float in the air, and thus a person is able to pass through the aerial image 10.

A screen for guiding or a screen for advertisement for example, displayed in the aerial image 10. A screen operation, the display content of which is varied in accordance with an operation by a person 20, is displayed in the aerial image 10, for example. Needless to say, such screens are examples of display.

Not only a still image but also a moving image may be displayed in the aerial image 10.

In each of the exemplary embodiments, the entirety of a rectangular shape is represented as the aerial image 10. However, the shape of the outer edge of the aerial image 10 is not limited to a rectangular shape, and may be any shape. For example, a space in which an image of an object is formed may be the entirety of a space in which the aerial image 10 is formed. For example, an image of a button for operation, an image of a person, an image of an animal, and image of a product, and an image of a fruit are examples of the aerial image 10. In FIG. 1, the aerial image 10 has a planar shape. However, the aerial image 10 may have a three-dimensional shape such as a curved surface shape, a spherical shape, and a cubic shape.

While the aerial image 10 is disposed independently, plural aerial images 10 may be disposed in one space. In FIG. 1, three aerial images 10A, 10B, and 10C in a planar shape are disposed side by side.

In the case of FIG. 1, the aerial image 10A includes "AAAA/AAAA/AAAA/AAAA". The oblique lines (slashes) indicate returns. The same also applies to the aerial images 10B and 10C. The aerial image 10B includes "BBBB/BBBB/BBBB/BBBB". The aerial image 10C includes "CCCC/CCCC/CCCC/CCCC".

An aerial image forming system 1A illustrated in FIG. 1 includes aerial image forming devices 311, 312, and 313 that form the aerial image 10 in the air, an image control device 32A that controls such devices, and a person detection sensor 33 that detects the position of the person 20.

In the case of the present exemplary embodiment, the aerial image forming device 311 is used to form the aerial image 10A, the aerial image forming device 312 is used to form the aerial image 10B, and the aerial image forming device 313 is used to form the aerial image 10C.

The aerial image forming devices 311, 312, and 313 are examples of an image forming unit.

The image control device 32A controls display of the aerial images 10A, 10B, and 10C to be formed in the air through the aerial image forming devices 311, 312, and 313, respectively. The image control device 32A according to the present exemplary embodiment determines the arrangement of a QR code 40 using a detection signal from the person detection sensor 33.

The image control device 32A is an example of a control unit. The image control device 32A is also an example of an information processing apparatus. The QR code 40 is an example of a graphical code image.

The person detection sensor 33 is a sensor that detects the positional relationship between the aerial images 10A, 10B, and 10C and the person 20. The person detection sensor 33 may be a heat sensor that uses infrared light, a light sensor that uses light, a sound wave sensor that uses sound waves, an auditory sensor that detects a sound, a touch sensor that detects static electricity, a mat sensor that detects a load, or the like, for example. In FIG. 1, one person detection sensor 33 is provided. However, plural person detection sensors 33 may be provided. The person detection sensor 33 may be implemented as an image capture camera and an image processing section that processes a captured image. The person detection sensor 33 is an example of a detection unit.

In the case of FIG. 1, the QR code 40 is disposed at the lower right portion of the aerial image 10A. The QR code 40 is a type of two-dimensional code. The two-dimensional code is an example of a graphical code image.

The QR code 40 according to the present exemplary embodiment has rectangular clipping symbols at three, upper right, upper left, and lower left, corners. Version information, format information, a timing pattern, and an alignment pattern are disposed in the peripheral part of the QR code and a two-dimensional code corresponding to data and an error correction code are disposed in the remaining region. The arrangement of such patterns is determined in accordance with the standard.

The QR code 40 expresses information expressed using numerals, alphabets, kanji characters, etc. as a pattern which cells (squares or dots) are disposed in a grid.

In the case of the present exemplary embodiment, the QR code 40 is correlated with the entirety or a part of a content displayed as the aerial image 10A.

In the case of FIG. 1, the QR code 40 is disposed at the lower right corner of the aerial image 10A. However, the QR code 40 may be formed at any position.

<Example of Aerial Image Forming Device>
The principles of forming the aerial image 10 will be described with reference to FIGS. 2A and 2B to 6. All the principles described below are already known.

Figure 2B:
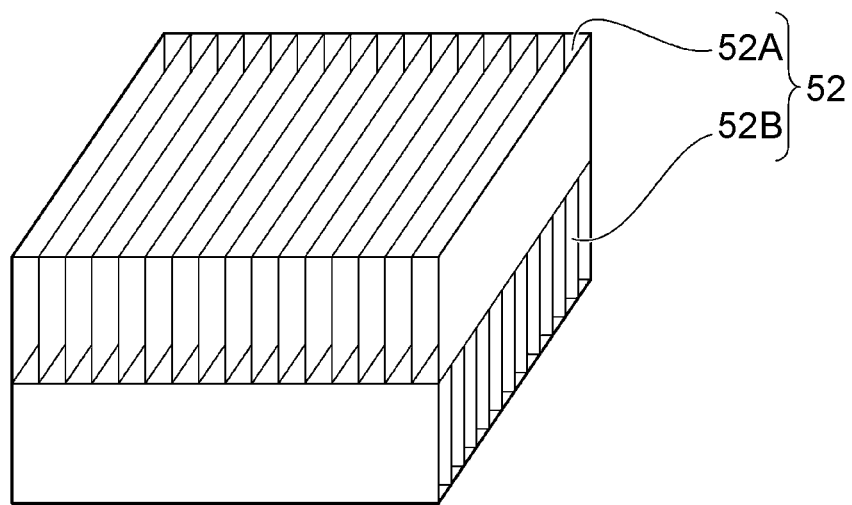

FIGS. 2A and 2B illustrate the principle of an aerial image forming device 31A that forms an aerial image 10 by allowing light output from a display device 51 to pass through a dedicated optical plate 52, with FIG. 2A illustrating the positional relationship between members and the aerial image 10 and with FIG. 2B illustrating a part of the sectional structure of the optical plate 52. The display device 51 and the optical plate 52 are examples of an optical component.

The optical plate 52 has a structure in which a plate in which short strips of glass 52A with a wall surface used as a mirror are arranged and a plate in which short strips of glass 52B are arranged in a direction that is orthogonal to that of short strips of glass 52A are vertically stacked on each other.

The optical plate 52 reproduces an image displayed on the display device 51 in the air by reflecting light output from the display device 51 twice using the short strips of glass 52A and 52B to form an image in the air. The distance between the display device 51 and the optical plate 52 and the distance between the optical plate 52 and the aerial image 10 are equal to each other. The dimensions of an image displayed on the display device 51 and the dimensions of the aerial image 10 are equal to each other.

Figure 3:
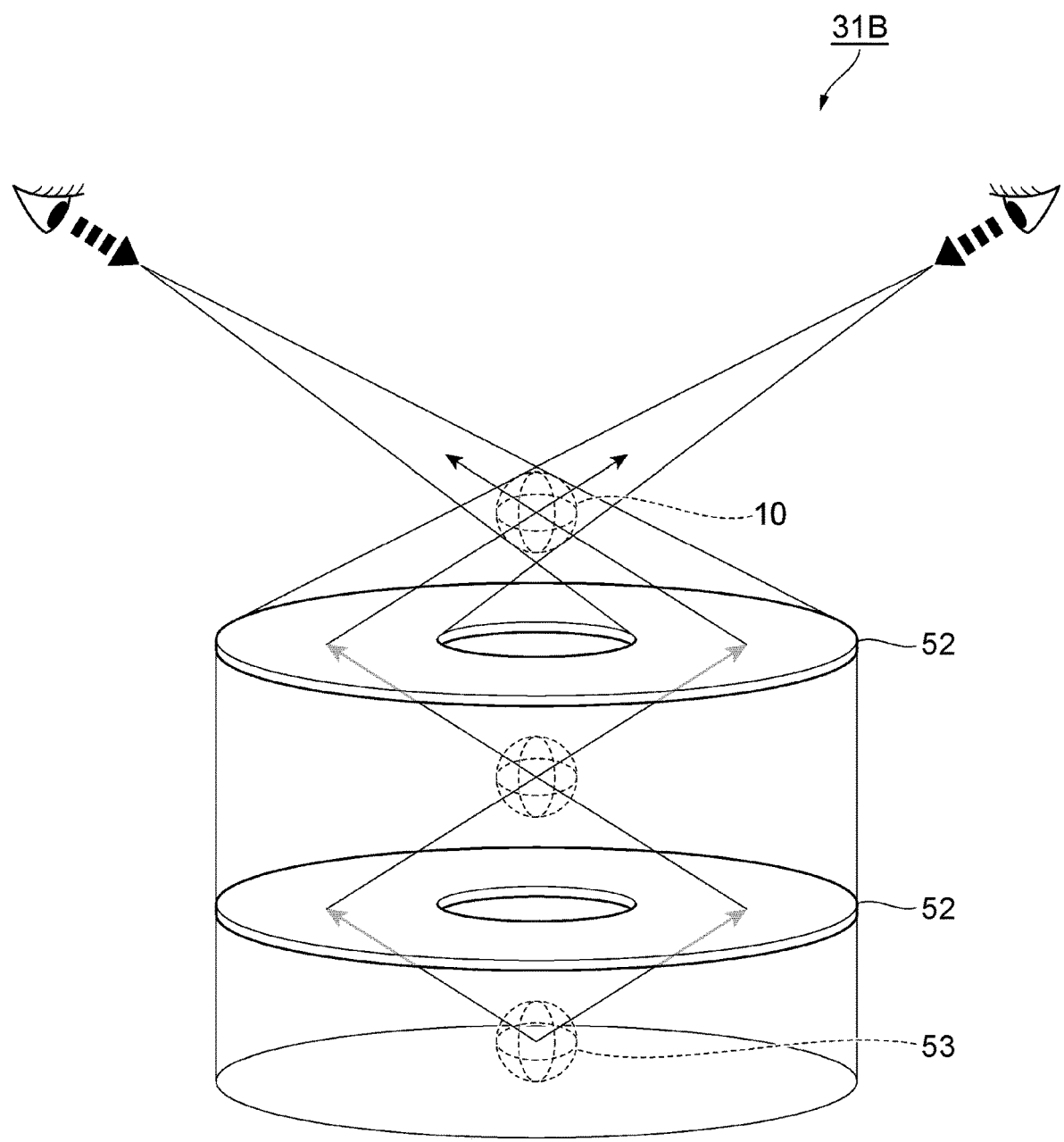
FIG. 3 illustrates the principle of an aerial image forming device that forms a three-dimensional image as an aerial image.

FIG. 3 illustrates the principle of an aerial image forming device 31B that forms a three-dimensional image as an aerial image 10. The aerial image forming device 31B reproduces a three-dimensional image (aerial image 10) in the air by allowing light reflected by a surface of an actual object 53 to pass through two optical plates 52 in a ring shape. It is not necessary that the optical plates 52 should be disposed in series with each other.

Figure 4A:
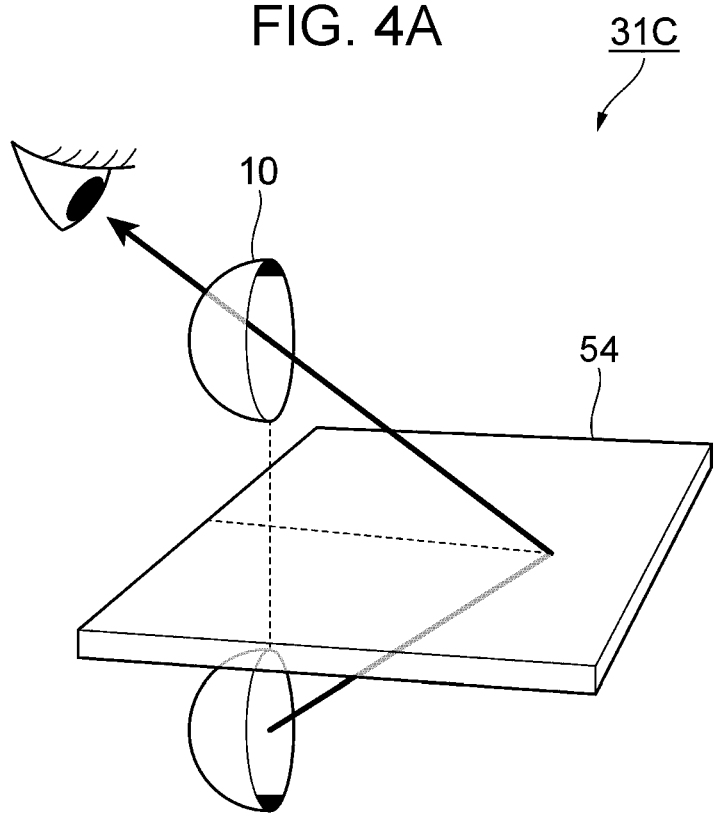
FIGS. 4A and 4B illustrate the principle of an aerial image forming device that forms an aerial image using a micro mirror array with a structure in which minute rectangular holes that constitute a two-face corner reflector are arranged at equal intervals in a plane, with FIG. 4A illustrating the positional relationship between members and the aerial image and with FIG. 2B illustrating a part of the micro mirror array as enlarged.
Figure 4B:
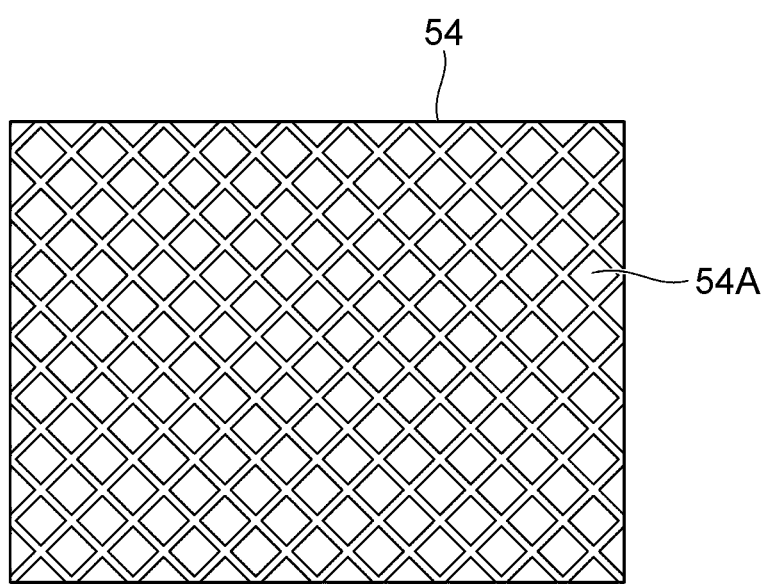

FIGS. 4A and 4B illustrate the principle of an aerial image forming device 31C that forms an aerial image 10 using a micro mirror array 54 with a structure in which minute rectangular holes 54A that constitute a two-face corner reflector are arranged at equal intervals in a plane, with FIG. 4A illustrating the positional relationship between members and the aerial image 10 and with FIG. 2B illustrating a part of the micro mirror array 54 as enlarged. One hole 54A is formed as a square, 100 μm each side, for example. The micro mirror array 54 is an example of an optical component.

Figure 5:
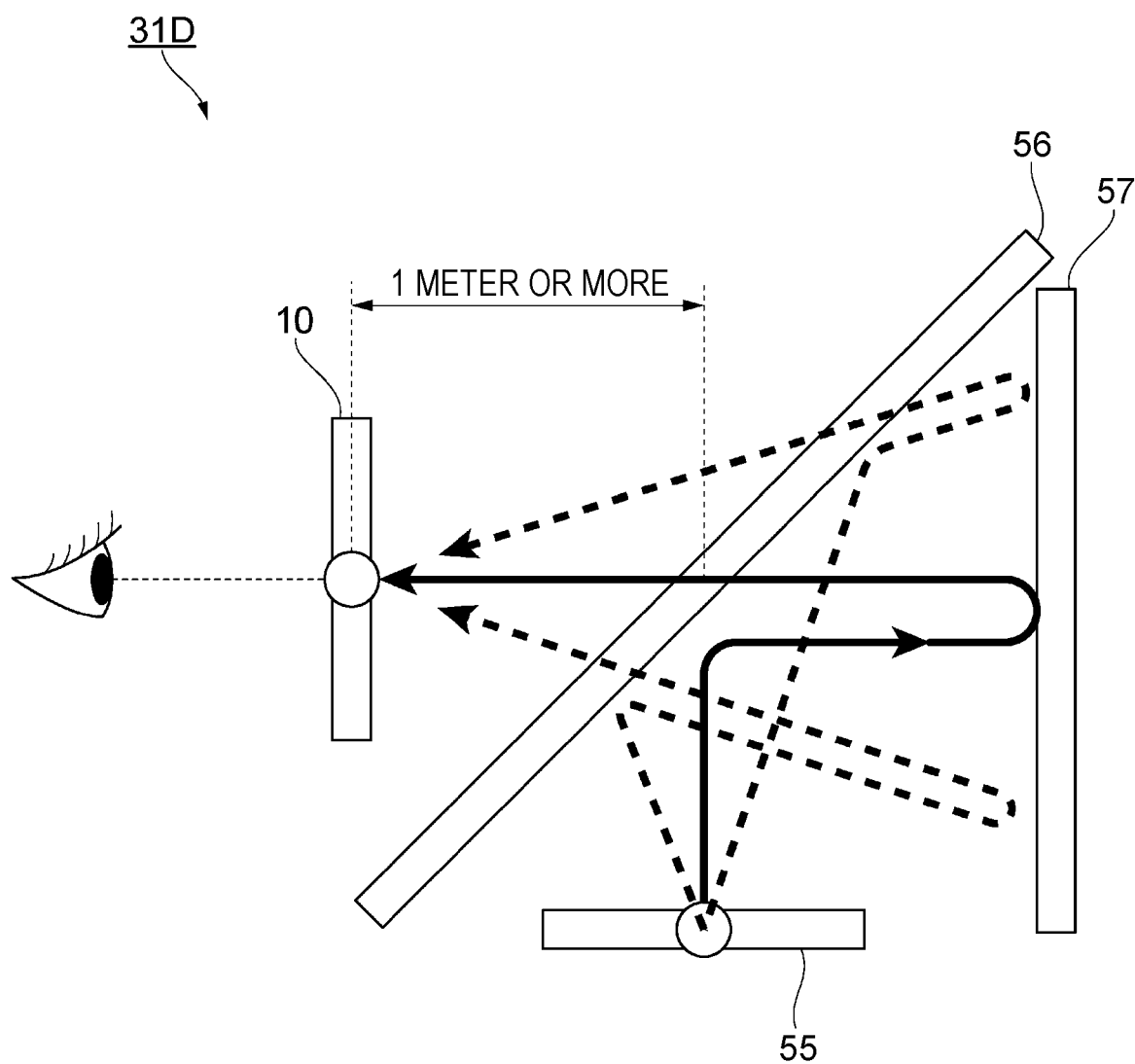
FIG. 5 illustrates the principle of an aerial image forming device that uses a beam splitter and a retroreflective sheet.

FIG. 5 illustrates the principle of an aerial image forming device 31D that uses a beam splitter 56 and a retroreflective sheet 57. The beam splitter 56 is disposed at an angle of 45° with respect to a display surface of a display device 55. The retroreflective sheet 57 is disposed at an angle of 90° with respect to the display surface of the display device 55 in the direction of reflection of a display image by the beam splitter 56. The display device 55, the beam splitter 56, and the retroreflective sheet 57 are examples of an optical component.

In the case of the aerial image forming device 31D, light output from the display device 55 is reflected by the beam splitter 56 in the direction of the retroreflective sheet 57, next retroreflected by the retroreflective sheet 57, and passes through the beam splitter 56 to form an image in the air. The aerial image 10 is formed at the position at which light forms an image.

Figure 6:
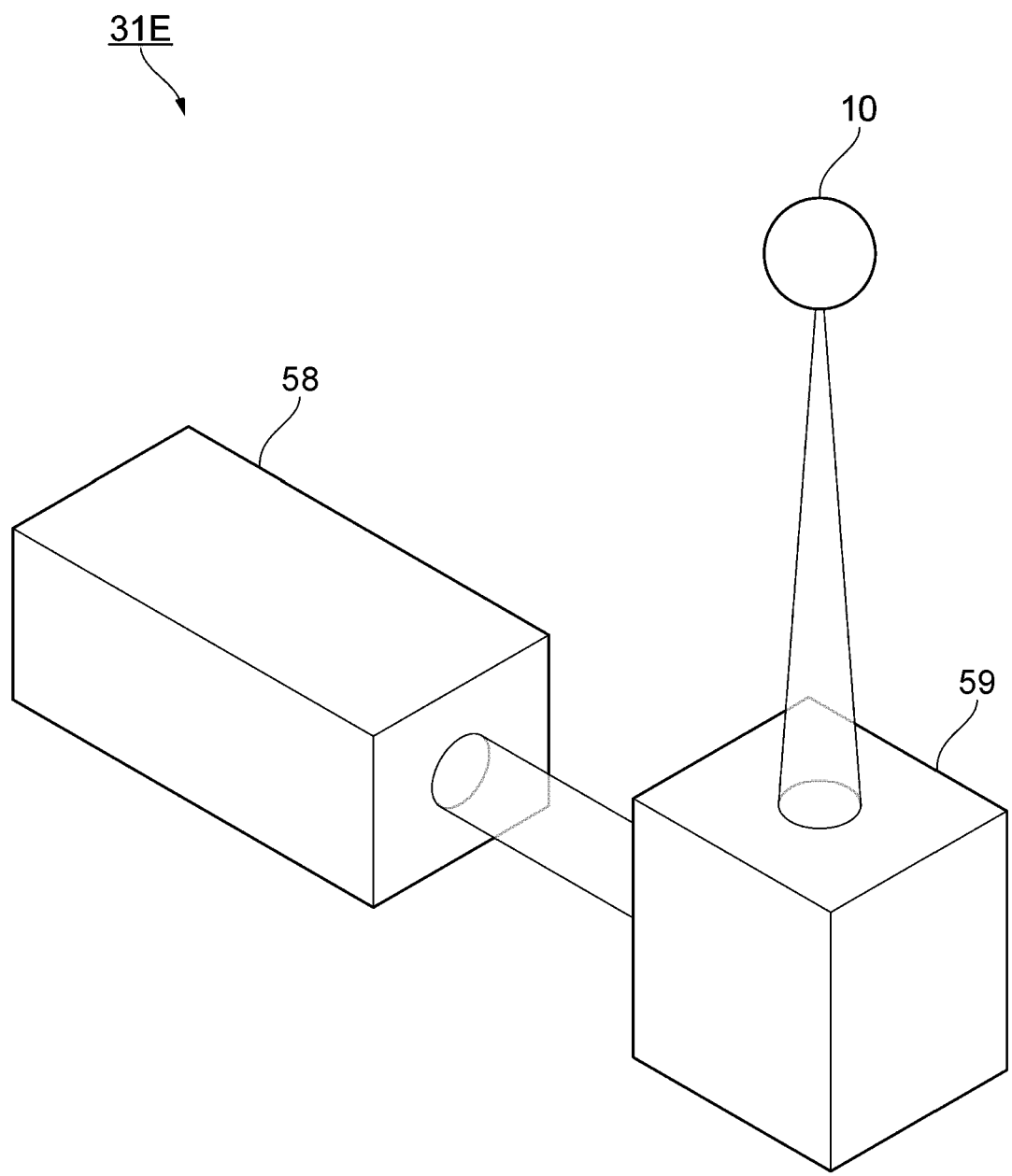
FIG. 6 illustrates the principle of an aerial image forming device that forms an aerial image as a collection of plasma light emitting bodies.

FIG. 6 illustrates the principle of an aerial image forming device 31E that forms an aerial image as a collection of plasma light emitting bodies.

In the case of the aerial image forming device 31E, an infrared pulse laser 58 outputs pulsed laser light, and an XYZ scanner 59 condenses the pulsed laser light in the At this time, a gas in the vicinity of the focal point is momentarily formed into plasma to emit light. The pulse frequency is 100 Hz or less, for example, and the pulsed light emission time is in the nano second order, for example. The infrared pulse laser 58 and the XYZ scanner 59 are examples of an optical component.

<Configuration of Image Control Device 32A>

Figure 7:
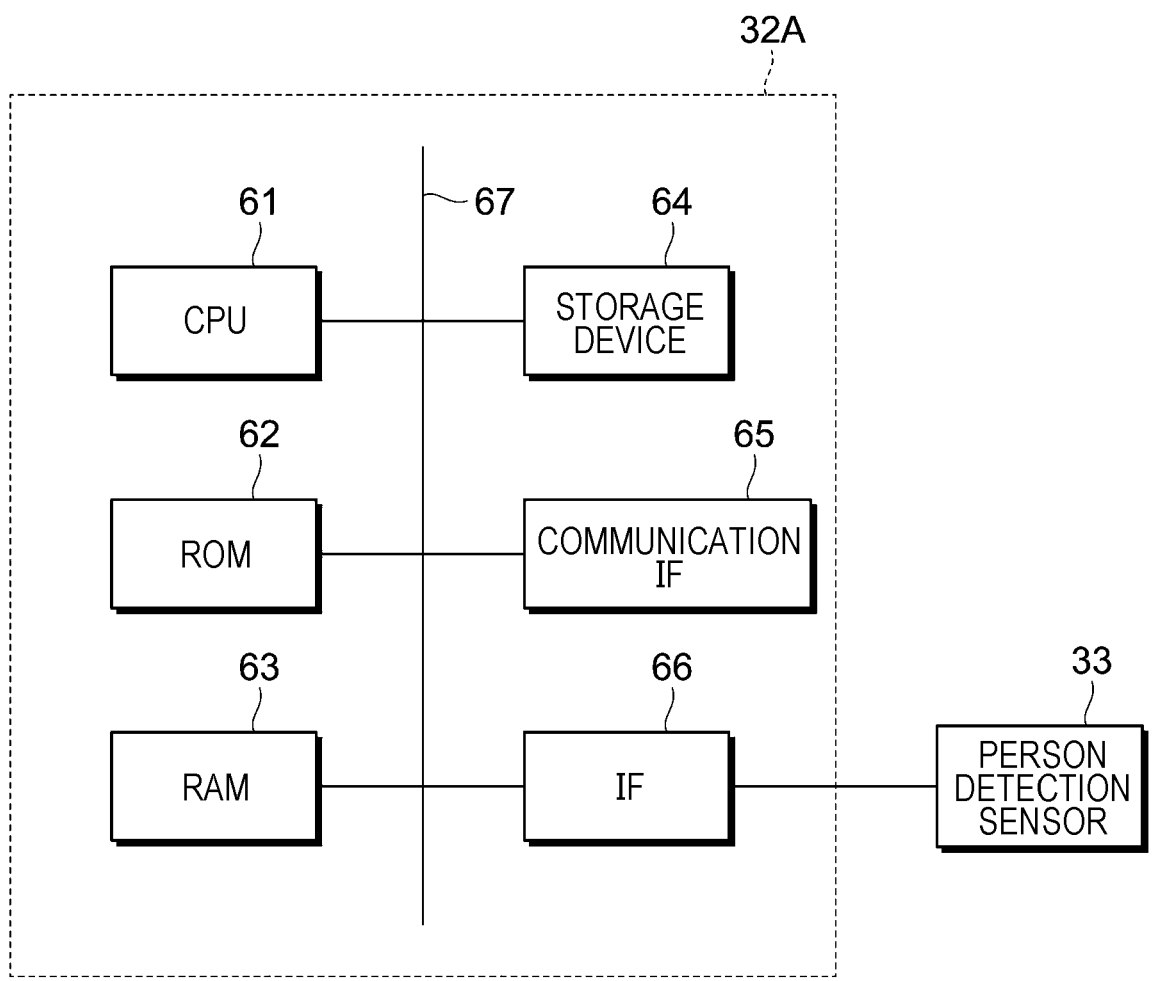
FIG. 7 illustrates an example of the hardware configuration of an image control device according to the first exemplary embodiment.

FIG. 7 illustrates an example of the hardware configuration of an image control device 32A according to the first exemplary embodiment.

The image control device 32A includes a central processing unit (CPU) 61 that provides various functions through execution of firmware or an application program, a read only memory (ROM) 62 that serves as a storage region that stores firmware or a basic input output system (BIOS), and a random access memory (RAM) 63 that serves as an execution region for a program. The CPU 61, the ROM 62, and the RAM 63 are examples of a so-called computer.

The image control device 32A includes a storage device 64 that stores data such as an application program. The storage device 64 is a rewritable non-volatile storage medium, for example.

The image control device 32A controls the aerial image forming devices 311 to 313 using a communication interface (communication IF) 65 to vary the formation of the aerial image 10. The position, dimensions, etc. of the aerial image 10 to be formed are to be controlled. The position includes not only a two-dimensional position but also a three-dimensional position.

The image control device 32A communicates with the person detection sensor 33 using an interface (IF) 66.

The various portions are connected to each other through a bus 67.

Figure 8:
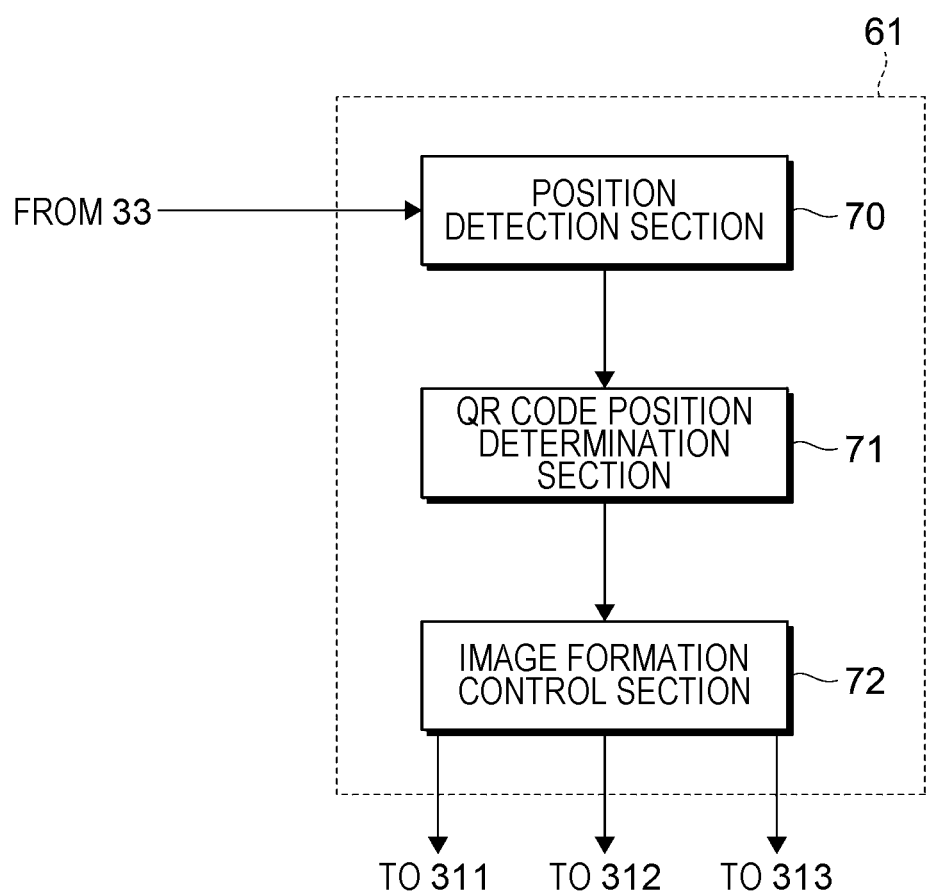
FIG. 8 illustrates an example of the functional configuration of the image control device according to the first exemplary embodiment.

FIG. 8 illustrates an example of the functional configuration of the image control device 32A (see FIG. 7) according to the first exemplary embodiment.

The functional configuration illustrated in FIG. 8 is implemented through execution of a program by the CPU 61.

The CPU 61 functions as a position detection section 70 that detects the position of the person 20 (see FIG. 1) on the basis of a detection signal from the person detection sensor 33, a QR code position determination section 71 that determines the position at which the QR code 40 (see FIG. 1) is formed in accordance with the detected position of the person 20, and an image formation control section 72 that controls formation of the aerial image 10 (see FIG. 1) and the QR code 40 using information on the detected position.

In the case of the present exemplary embodiment, the position detection section 70 detects whether the person 20 is positioned around the aerial image 10A (see FIG. 1), positioned around the aerial image 10B (see FIG. 1), or positioned around the aerial image 10C (see FIG. 1), The QR code position determination section 71 determines to form the QR code 40 in the aerial image 10A in the case where the person 20 is positioned around the aerial image 10A, determines to form the QR code 40 in the aerial image 10B in the case where the person 20 is positioned around the aerial image 10B, and determines to form the QR code 40 in the aerial image 10C in the case where the person 20 is positioned around the aerial image 10C.

The QR code position determination section 71 may have a function of determining the arrangement of the QR code 40 in the aerial image 10. For example, the QR code position determination section 71 determines the position at which the QR code 40 is formed on the basis of information on the layout of the aerial image 10 or information on a vacant region.

The image formation control section 72 outputs image data corresponding to the aerial images 10A to 10C (see FIG. 1) to the aerial image forming devices 311 to 313.

<Processing Operation of Image Control Device 32A>

FIG. 9 is a flowchart illustrating an overview of processing operation executed by the image control device 3A (see FIG. 7) according to the first exemplary embodiment. The drawing illustrates an overview, and thus the details differ in accordance with the individual mode of use.

First, the image control device 32A determines whether or not a person is detected (step 101).

In the case where a negative result is obtained in step 101, the image control device 32A repeatedly makes the determination until a person is detected.

In the case where a positive result is obtained in step 101, the image control device 32A specifies the position of the detected person (step 102), Next, the image control device 32A determines the position of the aerial image 10 in which the QR code 40 is to be formed in accordance with the position of the person (step 103).

Figure 10A:
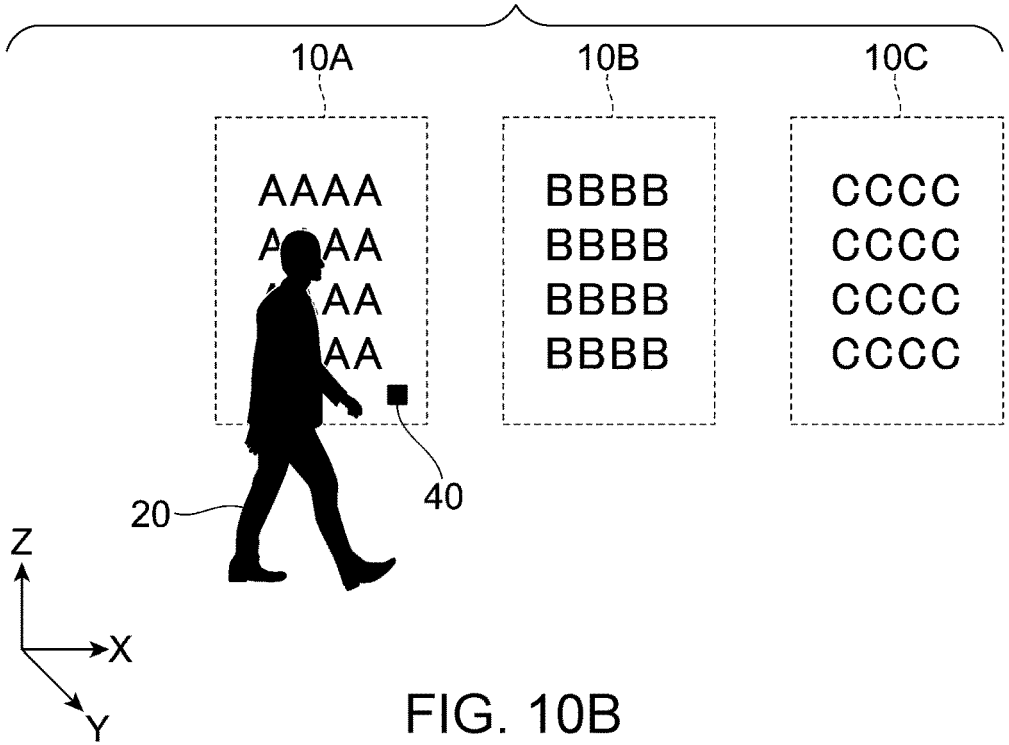
FIGS. 10A and 10B illustrate switching of the position at which a QR code (a registered trademark of Denso Wave) is formed according to the position of a person, with FIG. 10A illustrating the position of the QR code for a case where the person is positioned in front of an aerial image at the left end of the drawing and with FIG. 10B illustrating the position of the QR code for a case where the person is positioned in front of an aerial image at the right end of the drawing.
Figure 10B:
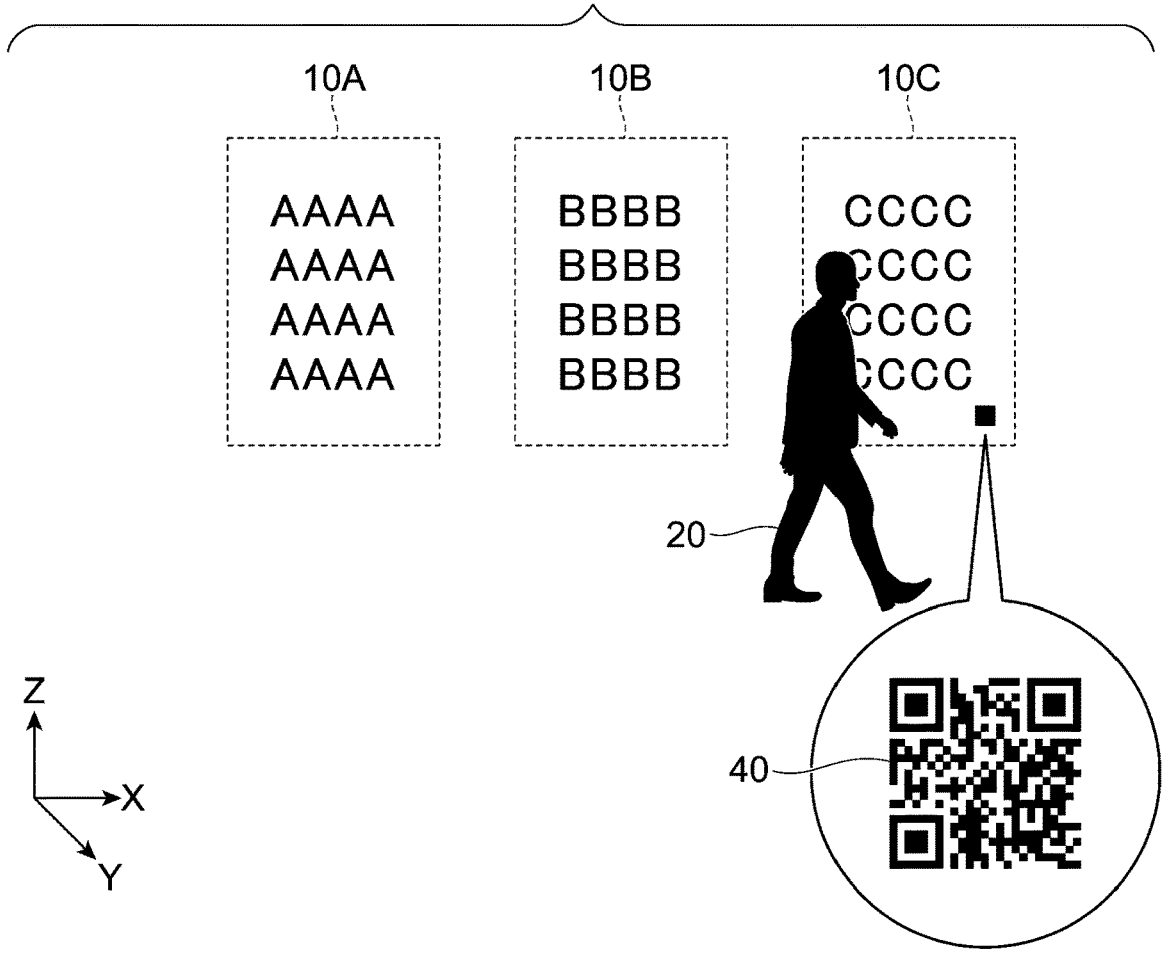

FIGS. 10A and 10B illustrate switching of the position at which the QR code 40 is formed according to the position of the person 20, with FIG. 10A illustrating the position of the QR code 40 for a case where the person 20 is positioned in front of the aerial image 10A at the left end of the drawing and with FIG. 10B illustrating the position of the QR code 40 for a case where the person is positioned in front of the aerial image 10C at right end of the drawing.

In the case of the present exemplary embodiment, the QR code 40 is formed in the aerial image 10 at which the person 20 is positioned. Therefore, the person 20 easily notices display of the QR code 40. In addition, there is no need for the person 20 to move to a different position in order to read the QR code 40.

The content displayed by the QR code 40 may differ in accordance with the content of the aerial images 10A, 10B, and 10C with which the QR code 40 is correlated or the position at which the QR code 40 is formed.

The QR code 40 may be formed on the screen in the case where the person 20 is close to the aerial image 10, and may not be formed on the screen in the case where the person 20 is not close to the aerial image 10.

FIG. 11 illustrates an example of formation of QR codes 40 for a case where plural persons are positioned in front of different aerial images 10. Portions in FIG. 11 corresponding to those in FIG. 1 are denoted by the corresponding reference numerals.

It should be noted, however, that a common image is displayed as the aerial images 10A to 10C in FIG. 11.

In the case of FIG. 11, a person 20A is positioned in front of the aerial image 10A, and a person 20C is positioned in front of the aerial image 10C. No person 20 is present in front of the aerial image 10B.

In this case, the image control device 32A forms the QR code 40 in each of the aerial image 10.E and the aerial image 10C, and does not form the QR code 40 in the aerial image 10B.

In the case of FIG. 11, the QR codes 40 which are formed in the aerial image 10A and the aerial image 10C have a common content. However, the QR codes 40 may have different contents depending on the positions at which the QR codes 40 are formed.

Figure 12:
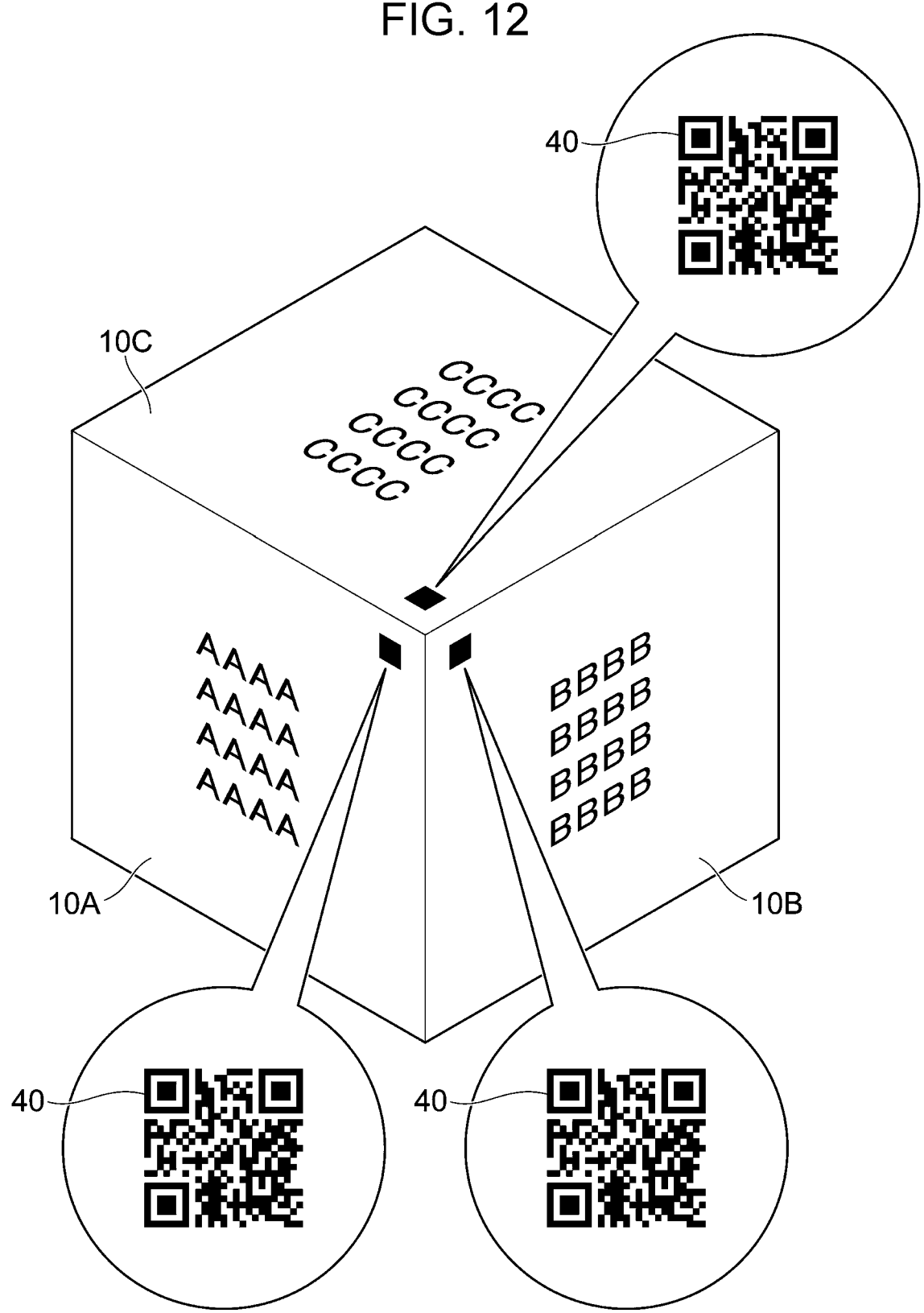
FIG. 12 illustrates an example of the arrangement of QR codes for a case where aerial images are disposed on three surfaces of a hexahedron that share one vertex.

FIG. 12 illustrates an example of the arrangement of QR codes 40 for a case where aerial images 10A to 10C are disposed on three surfaces of a hexahedron that share one vertex.

In FIG. 12, a common QR code 40 is formed on the surfaces. However, QR codes 40 which express different pieces of information may be formed.

In the case of FIG. 12, the three QR codes 40 are disposed around one of the vertexes of a hexahedron.

The display surfaces far the aerial images 10A, 1013, and 10C are orthogonal to each other. Therefore, in the case where each of the QR codes 40 is read from a direction that is perpendicular thereto, a different QR code 40 is not captured behind the QR code 40 being read.

FIG. 12 illustrates an example of the arrangement of the QR codes 40 with which images of the plural QR codes 40 are not observed as overlapping each other.

Incidentally, the three QR codes 40 may express different kinds of information in accordance with the surfaces.

In the case where plural QR codes 40 are disposed so as to surround one vertex as illustrated in FIG. 12, the plural QR codes 40 may be included in one image capture range, depending on the performance of a reading device.

Figure 13:
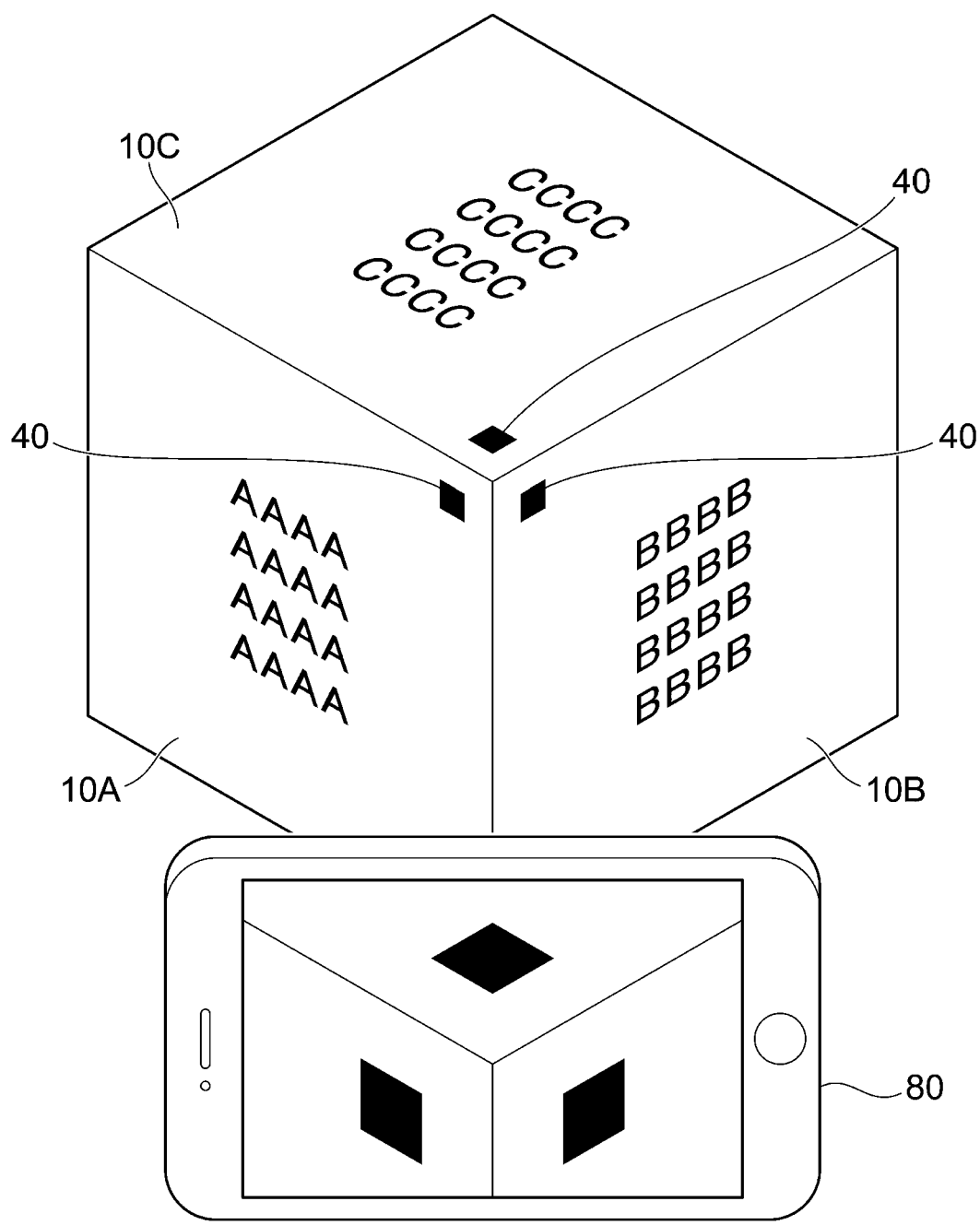
FIG. 13 illustrates an example in which plural QR codes are read at a time using a smartphone.

FIG. 13 illustrates an example in which plural QR codes 40 are read at a time using a smartphone 80. In FIG. 13, three QR codes 40 are read in one image capture.

Information may be decoded using one of the three QR codes 40 captured in an image.

On the other hand, different pieces of information may be assigned to the three QR codes 40. In this case, as illustrated in FIG. 13, plural pieces of information may be read at a time if plural QR codes 40 are captured in an image at a time, In the case of FIG. 13, the two QR codes 40 displayed in the aerial image 10B and the aerial image 100 are distorted in shape. Thus, such distortion in the images may be corrected when decoding such QR codes 40.

<Second Exemplary Embodiment>

In the present exemplary embodiment, information to be expressed is divided to generate plural QR codes. In the present exemplary embodiment, QR codes corresponding to pieces of divided information are referred to as divided QR codes for differentiation from a QR code 40 that independently enables decoding of information.

Figure 14:
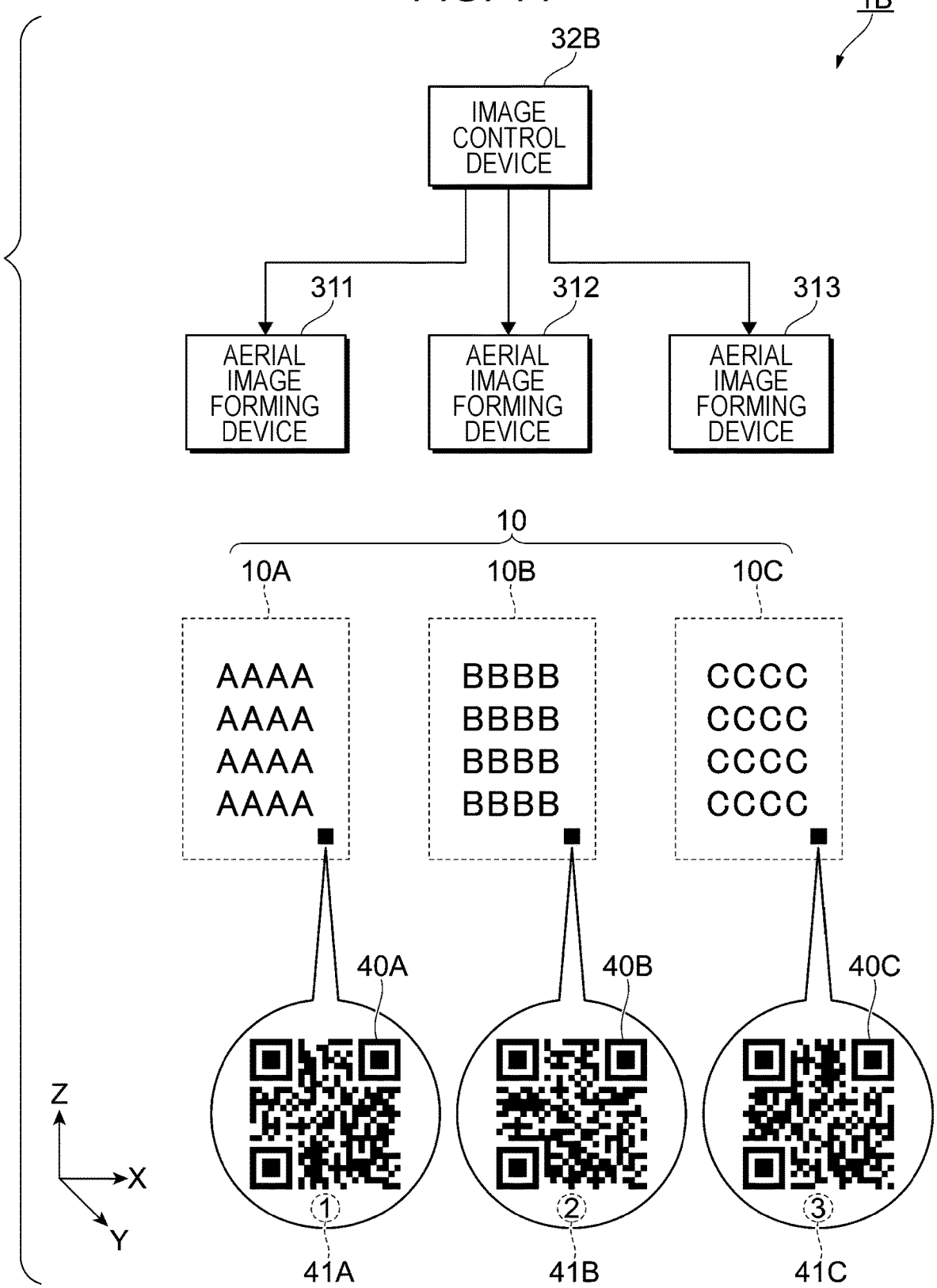
FIG. 14 illustrates a schematic configuration of an aerial image forming system according to a second exemplary embodiment.

FIG. 14 illustrates a schematic configuration of an aerial image forming system 1B according to a second exemplary embodiment. Portions in FIG. 14 corresponding to those in FIG. 1 are denoted by the corresponding reference numerals.

In the case of the aerial image forming system 1B, the person detection sensor 33 is not used.

In the case of FIG. 14, a divided QR code 40A is displayed in an aerial image 10A, a divided QR code 40B is displayed in an aerial image 10B, and a divided QR code 40C is displayed in an aerial image 10C. That is, the divided QR codes 40A to 40C are displayed as being dispersed in a space. In the present exemplary embodiment, plural divided QR codes arranged spatially so much away from each other as not to be captured in an image at a time and plural divided QR codes that may not be read as QR codes even if the plural divided QR codes are captured in one image are expressed as being "dispersed".

In the case of the present exemplary embodiment, the divided QR codes 40A to 40C are generated such that original information may not be decoded unless the divided QR codes 40A to 40C are read in an order determined in advance. Therefore, in FIG. 14, numbers 41A, 41B, and 41C that indicate the reading order are correlated with the divided QR codes 40A, 40B, and 40C.

In the case of FIG. 14, the original information may not be decoded unless the divided QR code 40A in the aerial image 10A is read first, the divided QR code 40B in the aerial image 10B is read next, and the divided QR code 40C in the aerial image 10C is read last.

The numbers 41A, 41B, and 41C also represent the decoding order.

In FIG. 14, the numbers 41A, 41B, and 41C are disposed below the divided QR codes 40A, 40B, and 40C, respectively, corresponding thereto. However, the numbers may be arranged as desired as long as the correlation thereof with the divided QR codes is clear.

In the case of FIG. 14, the divided QR codes 40A, 40B, and 40C are disposed in different aerial images 10A, 10B, and 10C. However, plural divided QR codes 40A, 40B, and 40C may be disposed in one aerial image 10.

Figure 15:
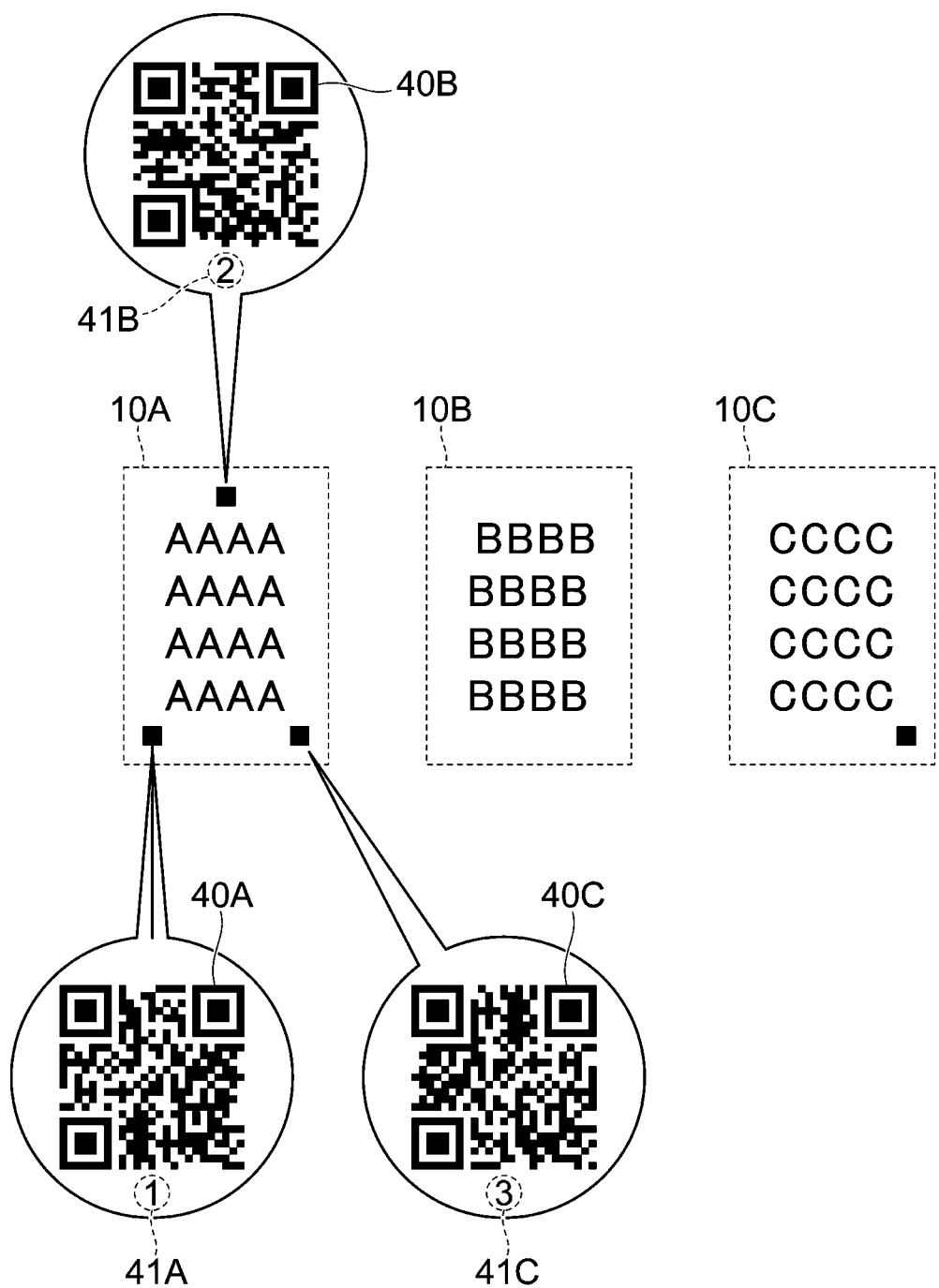
FIG. 15 illustrates an example in which three divided QR codes and numbers are disposed in an aerial image.

FIG. 15 illustrates an example in which three divided QR codes 40A, 40B, and 40C and numbers 41A, 41B, and 41C are disposed in an aerial image 10A.

Plural QR codes may be disposed in one aerial image 10.

In the example of FIG. 15, the numbers 41A, 41B, and 41C are provided below the three divided QR codes 40A, 40B, and 40C, respectively.

The hardware configuration of an image control device 32B according to the present exemplary embodiment is basically the same as that of the image control device 32A illustrated in FIG. 7. It should be noted, however, that the person detection sensor 33 is not connected to the image control device 32B.

Figure 16:
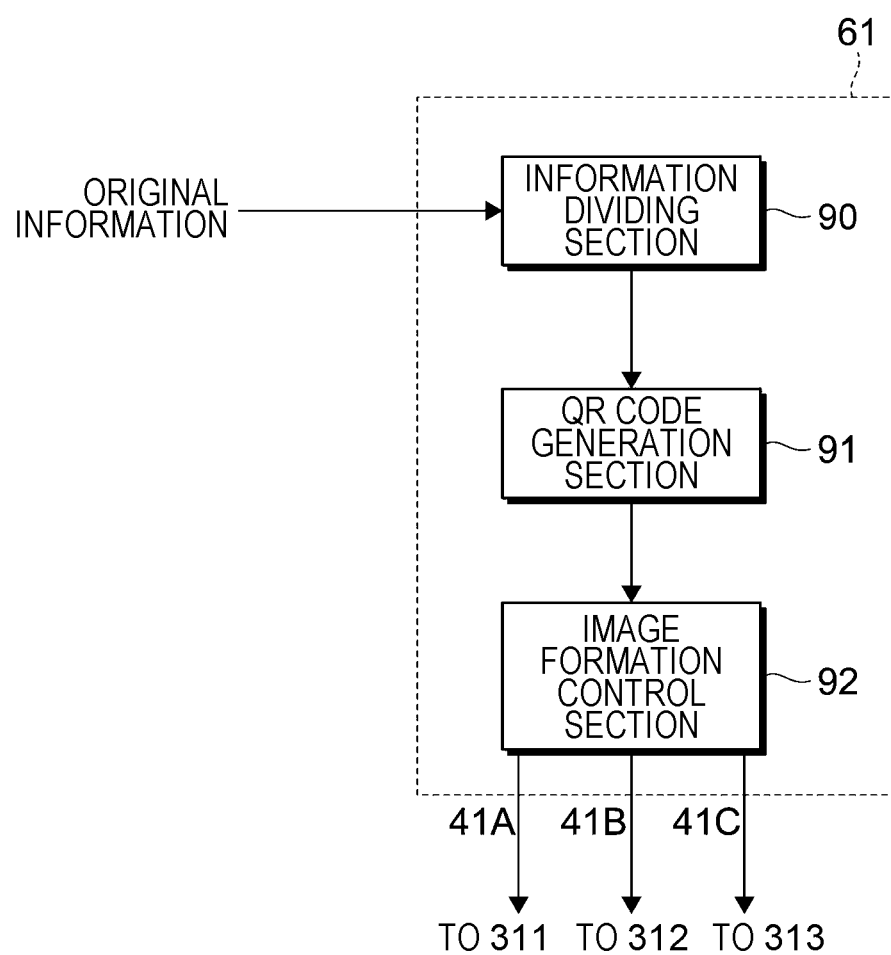
FIG. 16 illustrates an example of the functional configuration of an image control device according to the second exemplary embodiment.

FIG. 16 illustrates an example of the functional configuration of the image control device 32B (see FIG. 13) according to the second exemplary embodiment.

The functional configuration illustrated in FIG. 16 is implemented through execution of a program by the CPU 61 (see FIG. 7).

The CPU 61 functions as an information dividing section 90 that divides the original information into plural pieces of information, a QR code generation section 91 that generates divided QR codes from the pieces of divided information, and an image formation control section 92 that controls formation of the aerial images 10A to 10C and the divided QR codes.

In the case of the present exemplary embodiment, the information dividing section 90 divides the original information in accordance with the number of aerial images 10 (see FIG. 13) that may be formed. This dividing method is exemplary, and the original information may be divided irrespective of the number of aerial images 10 that may be formed. For example, the original information may be divided into a number of pieces, the number being given in advance, for example.

The original information may be divided after being subjected to processing such as scrambling. Alternatively, the original information may be subjected to processing such as scrambling after being divided.

Information on the order of arrangement of the pieces of divided information, which is necessary to decode the original information, is handed over to the QR code generation section 91 and the image formation control section 92. The QR code generation section 91 is an example of a generation unit.

The image formation control section 92 controls formation of the aerial images 10A, 10B, and 10C, formation of images corresponding to the divided QR codes 40A, 40B, and 40C, and formation of the numbers 41A, 41B, and 41C which indicate the reading order (decoding order) of the divided QR codes 40A, 40B, and 40C.

Figure 17:
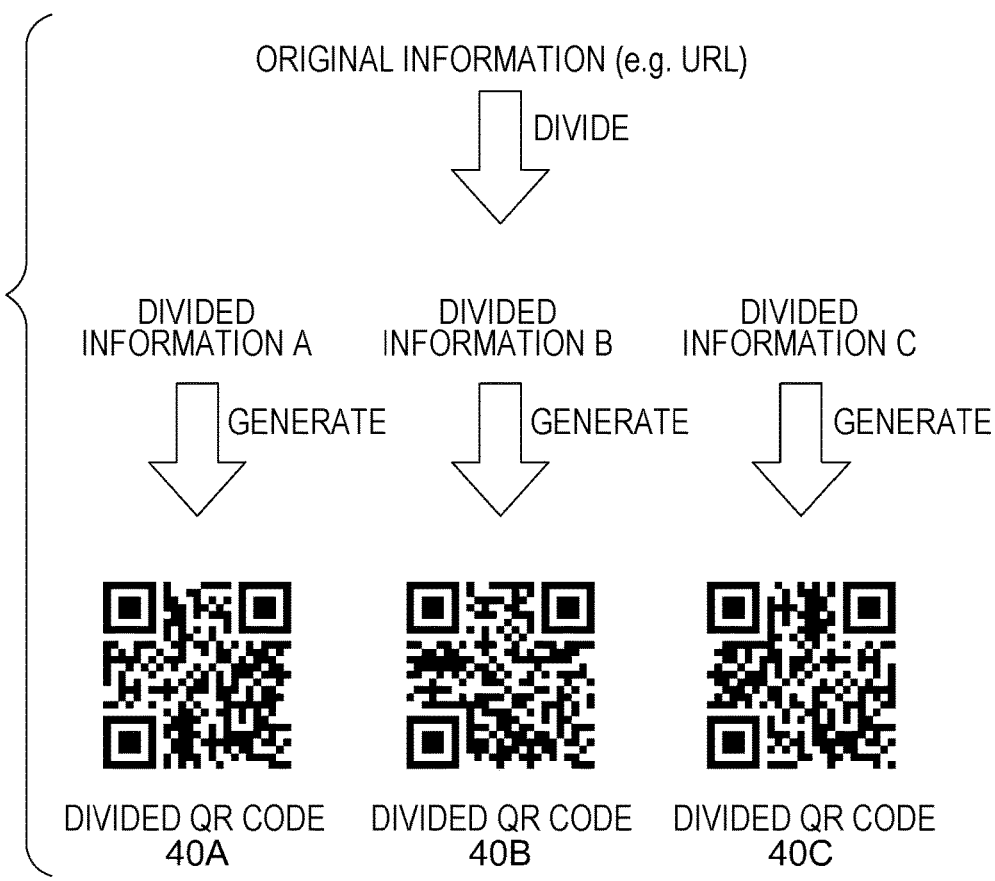
FIG. 17 conceptually illustrates the flow of a process performed by the image control device.

FIG. 17 conceptually illustrates the flow of a process performed by the image control device 32B (see FIG. 13).

FIG. 17 illustrates a case where information (Uniform Resource Locator (URL)) that indicates a link destination is provided as the original information. The original information is divided into three, namely divided information A, divided information B, and divided information C, from which the divided QR codes 40A, 40B, and 40C, respectively, are generated.

FIG. 18 is a flowchart illustrating an overview of processing operation executed by the image control device 32B (see FIG. 14) according to the second exemplary embodiment. The drawing illustrates an overview, and thus the details differ in accordance with the individual mode of use.

First, the image control device 32B determines whether or not new original information is provided (step 111).

In the case where a negative result is obtained in step 111, the image control device 32B repeatedly makes the determination until new original information is detected.

In the case where a positive result is obtained in step 111, the image control device 32B divides the provided original information into plural pieces of divided information (step 112).

Next, the image control device 32B converts the pieces of divided information into QR codes (step 13). That is, the divided QR codes 40A, 40B, and 40C (see FIG. 14) are generated.

Subsequently, the image control device 32B determines the arrangement of the plural divided QR codes 40A, 40B, and 40C (step 114).

The following describes another example of presenting the reading order of the divided QR codes 40A to 40C (see FIG. 14).

Figure 19A:
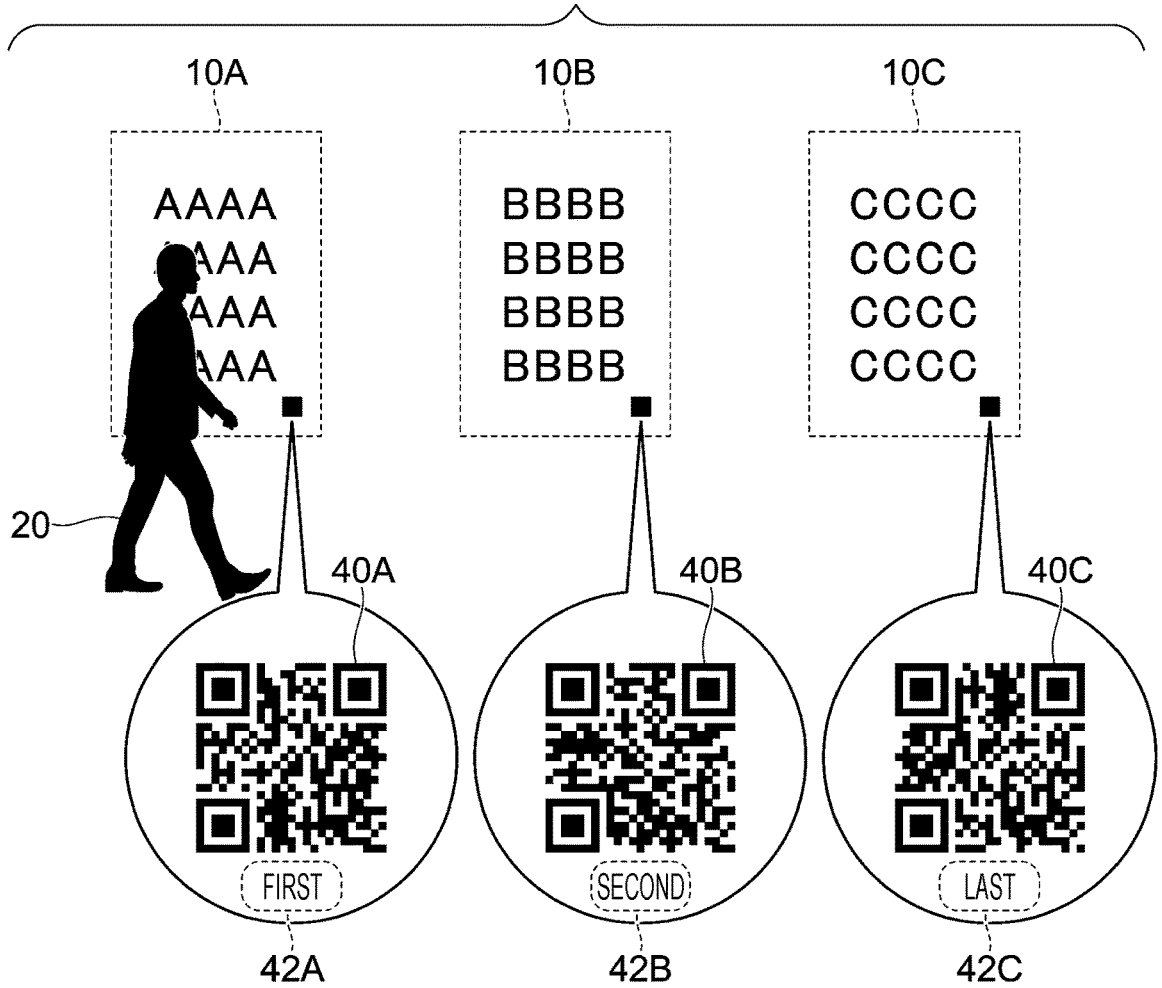
FIGS. 19A and 19B illustrate another example in which the reading order of divided QR codes is presented using elements other than numbers, with FIG. 19A illustrating an example in which words are used and with FIG. 19B illustrating an example in which colors are used for differentiation.
Figure 19B:
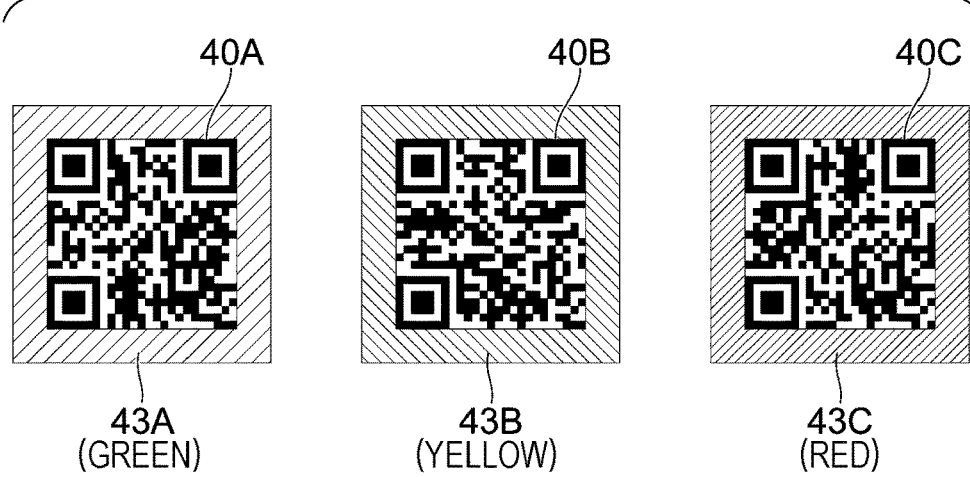

FIGS. 19A and 19B illustrate another example in which the reading order of divided QR codes 40A to 40C is presented using elements other than numbers, with FIG. 19A illustrating an example in which words are used and with FIG. 19B illustrating an example in which colors are used for differentiation.

Also in the case of FIG. 19A, the reading order is from the left side toward the right side of the drawing. It should be noted, however, that in the case of FIG. 19A, a text 42A "first" is disposed below the divided QR code 40A, a text "second" is disposed below the divided QR code 40B, and a text 42C "last" is disposed below the divided QR code 40C.

In the case of FIG. 19B, the reading order is expressed by the colors of outer frames 43A to 430 of the divided QR codes 40A to 40C, respectively. Also in the case of FIG. 19B, the reading order is from the left side toward the right side of the drawing. FIG. 19 illustrates a case where the colors corresponding to the reading order match variations in color of a traffic light. Thus, the color indicating the first is green, the color indicating the second is yellow, and the color indicating the third is red.

The display colors of the divided QR codes 40A to 40C the selves, rather than, the outer frames 43A to 43C, may be determined in accordance with the reading order.

As a matter of course, the relationship between the reading order and the colors indicated, in FIG. 19B is exemplary.

<Third Exemplary Embodiment>

Also in the present exemplary embodiment, original information is divided to generate plural QR codes, and the original information may not be decoded unless the QR codes are read in an order determined in advance.

In the present exemplary embodiment, however, information that indicates the reading order is not displayed, but a reading device or the like is notified of such information.

Figure 20:
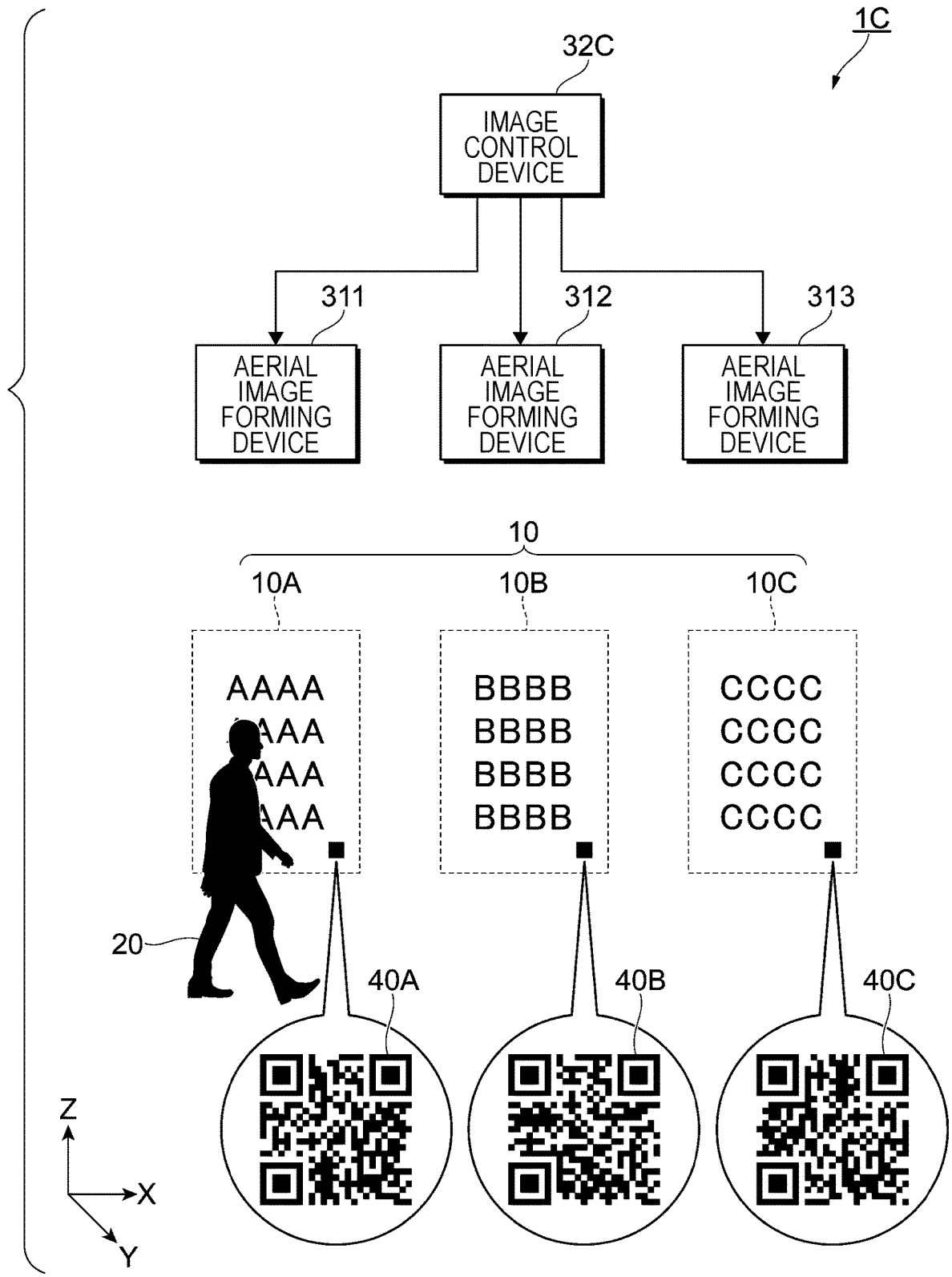
FIG. 20 illustrates a schematic configuration of an aerial image forming system according to a third exemplary embodiment.

FIG. 20 illustrates a schematic configuration of an aerial image forming system 1C according to a third exemplary embodiment. Portions in FIG. 20 corresponding to those in FIG. 14 are denoted by the corresponding reference numerals.

In the case of FIG. 20, the divided QR codes 40A to 40C are displayed in correspondence with the aerial images 10A to 10C, respectively, but the reading order is not indicated. That is, the appearance gives no clue to the reading order.

Therefore, only a person 20 that knows the correct reading order is able to decode the original information from the divided QR codes 40A to 40C. This display method is preferable in the case where the original information is highly confidential.

The hardware configuration of an image control device 32C according to the present exemplary embodiment is basically the same as that of the image control device 32A illustrated in FIG. 7. It should be noted, however, that the person detection sensor 33 is not connected to the image control device 32C, as with the image control device 32B (see FIG. 16).

Figure 21:
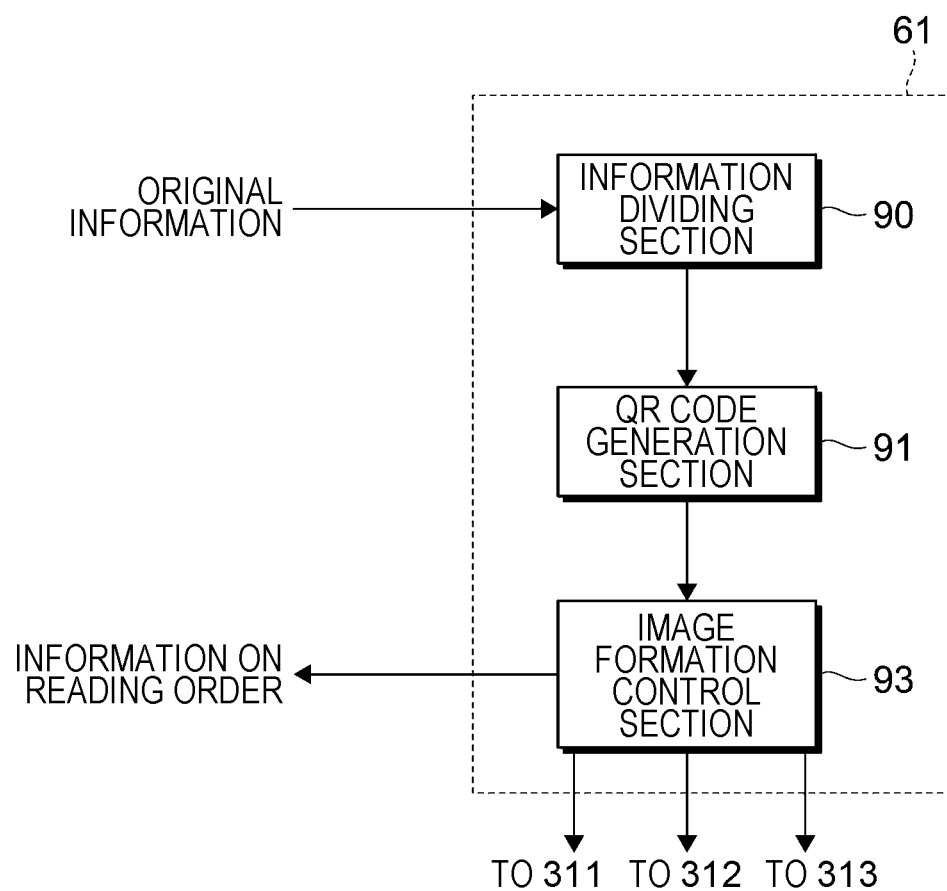
FIG. 21 illustrates an example of the functional configuration of an image control device according to the third exemplary embodiment.

FIG. 21 illustrates an example of the functional configuration of the image control device 32C (see FIG. 20) according to the third exemplary embodiment.

The functional configuration illustrated in FIG. 21 is implemented through execution of a program by the CPU 61 (see FIG. 7).

The CPU 61 functions as an information dividing section 90 that divides the original information into plural pieces of information, a QR code generation section 91 that generates divided QR codes from the pieces of divided information, and an image formation control section 93 that controls formation of the aerial images 10A to 10C and the divided QR codes.

Unlike the image formation control section 92 (see FIG. 16) according to the second exemplary embodiment, the image formation control section 93 is provided with a function of making a notification of the reading order instead of forming the numbers 41A, 41B, and 41C which indicate the reading order.

Figure 22:
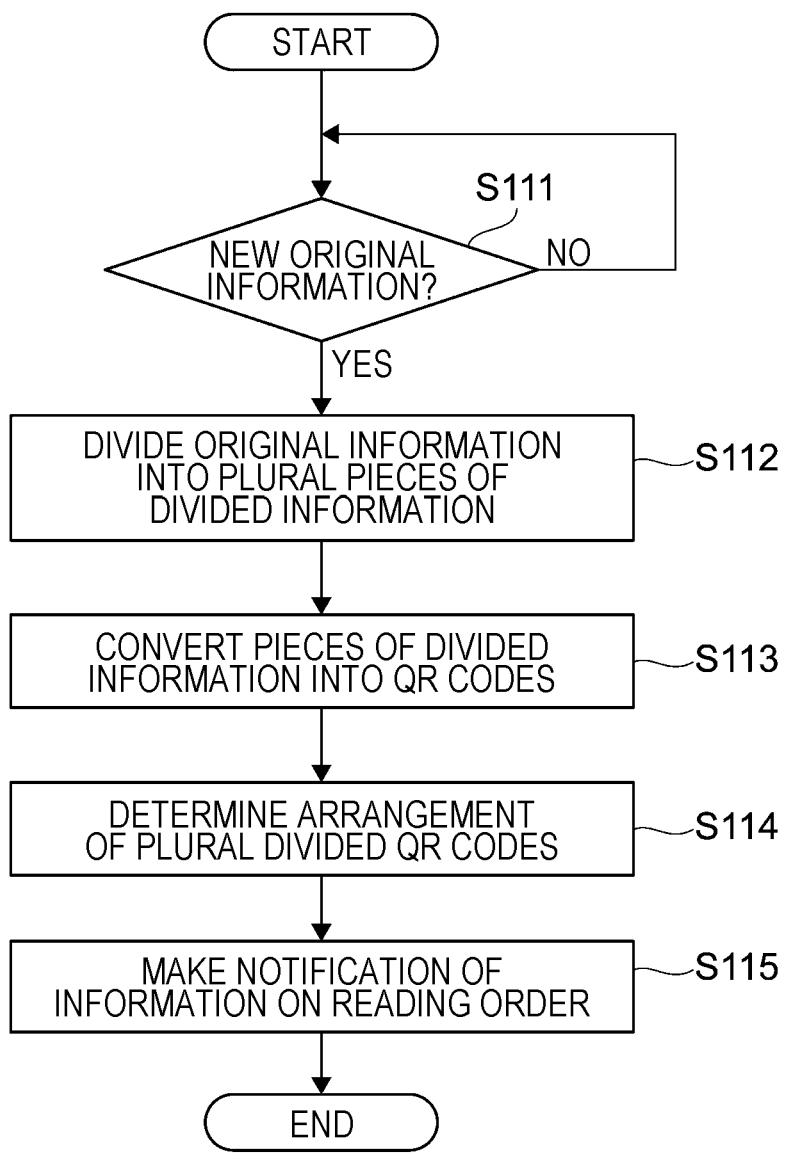
FIG. 22 is a flowchart illustrating an overview of processing operation executed by the image control device according to the third exemplary embodiment.

FIG. 22 is a flowchart illustrating an overview of processing operation executed by the image control device 32C (see FIG. 20) according to the third exemplary embodiment. The drawing illustrates an overview, and thus the details differ in accordance with the individual mode of use.

Portions in FIG. 22 corresponding to those in FIG. 18 are denoted by the corresponding reference numerals. FIG. 22 is different from the processing operation illustrated in FIG. 18 in that step 115, in which a notification of information on the reading order is made, is executed after execution of step 114. Before a notification of information on the reading order is made, a process of authenticating whether or not access to the original information is permitted is executed between the image control device 32C and a terminal (e.g. a smartphone) possessed by the person 20 (see FIG. 20).

Figure 23:
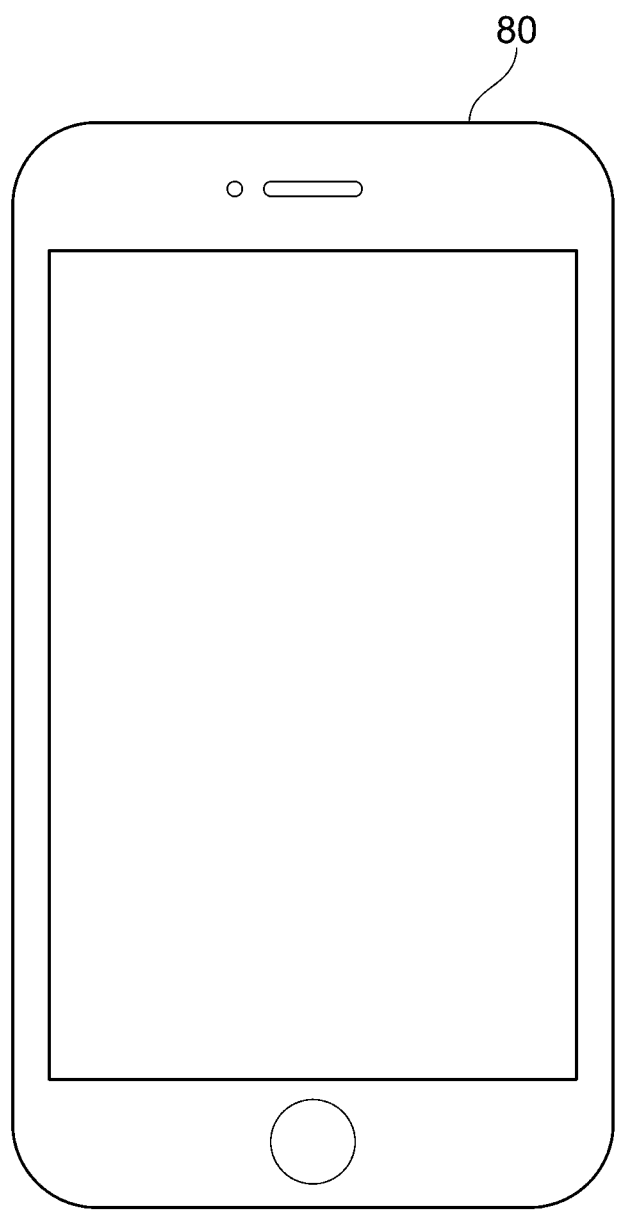
FIG. 23 illustrates an example of the appearance of a smartphone that is used to read divided QR codes.

FIG. 23 illustrates an example of the appearance of a smartphone 80 that is used to read divided QR codes 40A to 40C (see FIG. 20). The smartphone 80 is an example of the information processing apparatus.

Figure 24:
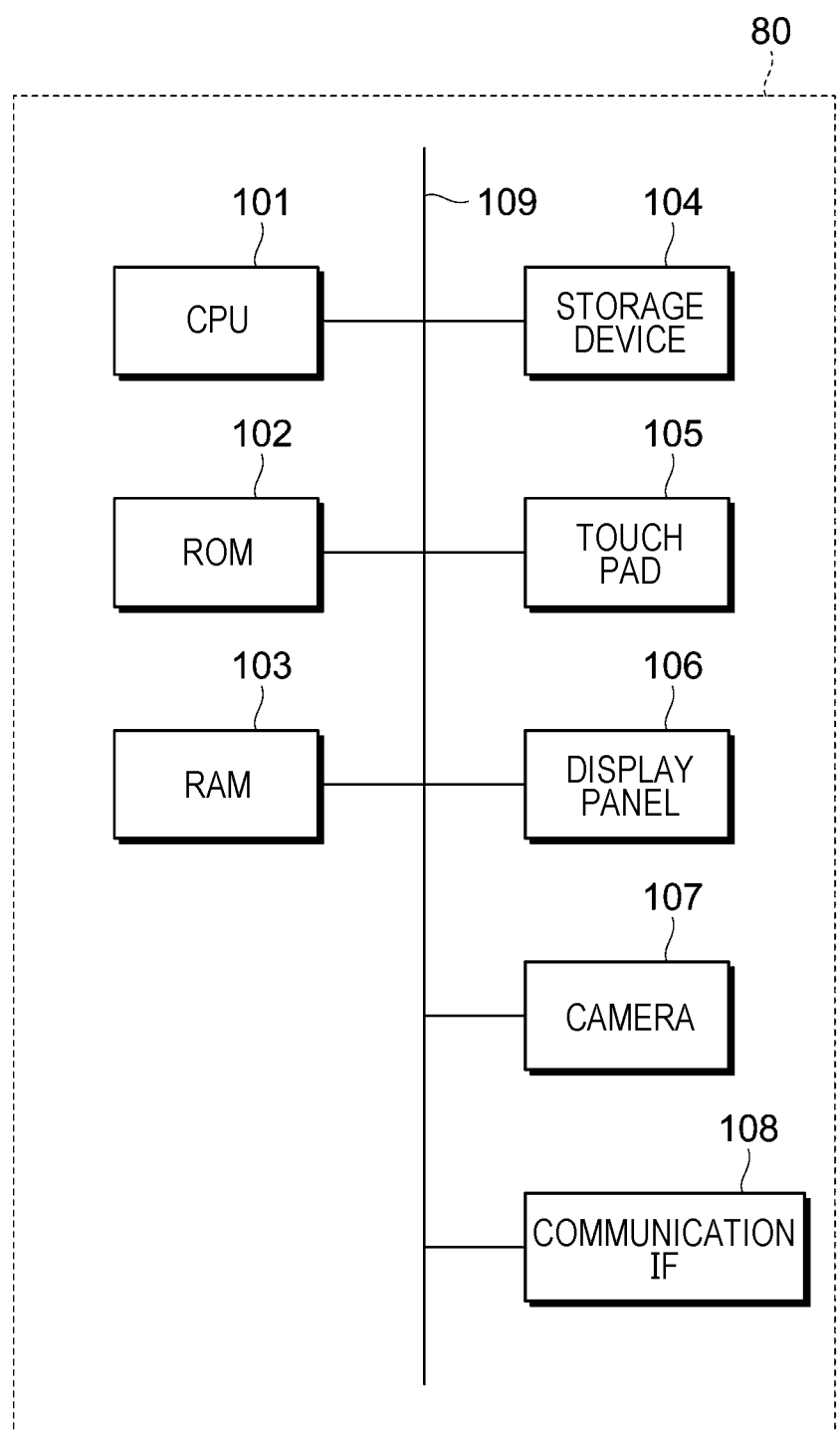
FIG. 24 illustrates an example of the hardware configuration of the smartphone.

FIG. 24 illustrates an example of the hardware configuration of the smartphone 80.

The smartphone 80 includes a CPU 101 that provides various functions through execution of firmware or an application program, a ROM 102 that serves as a storage region that stores firmware or a BIOS, and a RAM 103 that serves as an execution region for a program. The CPU 101, the ROM 102, and the RAM 103 are examples of a so-called computer.

The smartphone 80 includes a storage device 104 that stores data su an application program. The storage device 104 is a rewritable non-volatile storage medium, for example.

The smartphone 80 also includes a touch pad 105 and a display panel 106 that constitute a touch screen. The display panel 106 includes a liquid crystal display or an organic electro-luminescence (EL) display.

Besides, the smartphone 80 includes a camera 107 that is used to capture an image of the divided QR codes 40A to 40C (see FIG. 20) etc. and a communication interface (communication IF) 108 that is used for external communication.

The various portions are connected to each other through a bus 109.

Figure 25:
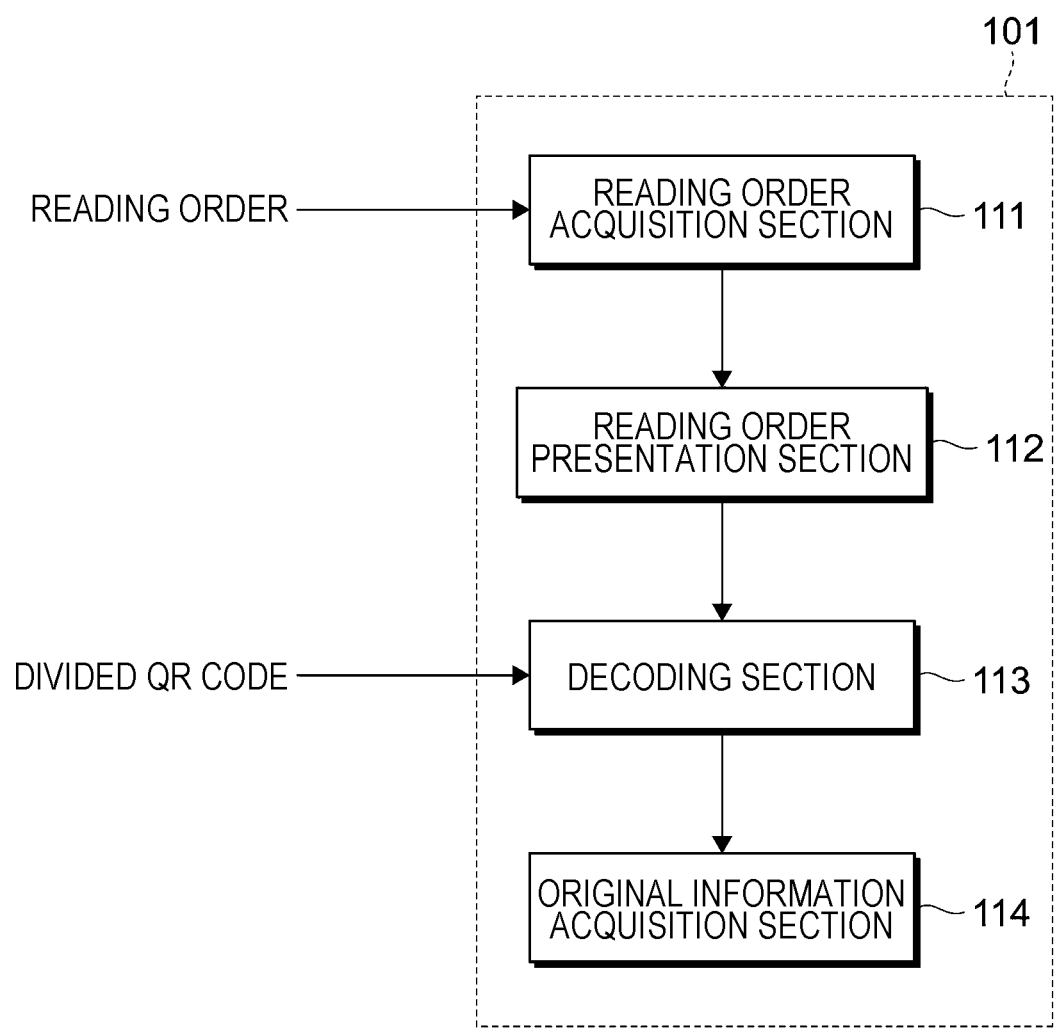
FIG. 25 illustrates an example of the functional configuration of the smartphone which is used to read divided QR codes.

FIG. 25 illustrates an example of the functional configuration of the smartphone 80 (see FIG. 23) which is used to read divided QR codes 40A to 40C (see FIG. 20).

The functional configuration illustrated in FIG. 25 is implemented through execution of a program by the CPU 101.

The CPU 101 functions as a reading order acquisition section 111 that receives a notification of the reading order from the image control device 32C (not illustrated; see FIG. 20), a reading order presentation section 112 that presents the reading order to the user who operates the smartphone 80, a decoding section 113 that sequentially decodes divided QR codes captured in an image by the camera 107 (FIG. 24), and an original information acquisition section 114 that acquires original information from all the decoding results.

As discussed earlier, the reading order acquisition section 111 executes a process such as authentication with the image control device 32C, and receives a notification of information on the reading order in the case where the image control device 32C permits access to the original information.

The reading order presentation section 112 and the decoding section 113 are examples of a reading unit.

FIG. 26 is a flowchart illustrating an overview of processing operation executed by the smartphone 80 (see FIG. 23). The drawing illustrates an overview, and thus the details differ in accordance with the individual mode of use.

First, the smartphone 80 determines whether or not the reading order of the divided QR codes is acquired (step 121).

In the case where a negative result is obtained in step 121, the smartphone 80 repeatedly makes the determination until a notification of the reading order is made.

In the case where a positive result is obtained in step 121, the smartphone 80 presents the acquired reading order to the user (step 122).

Figure 27A:
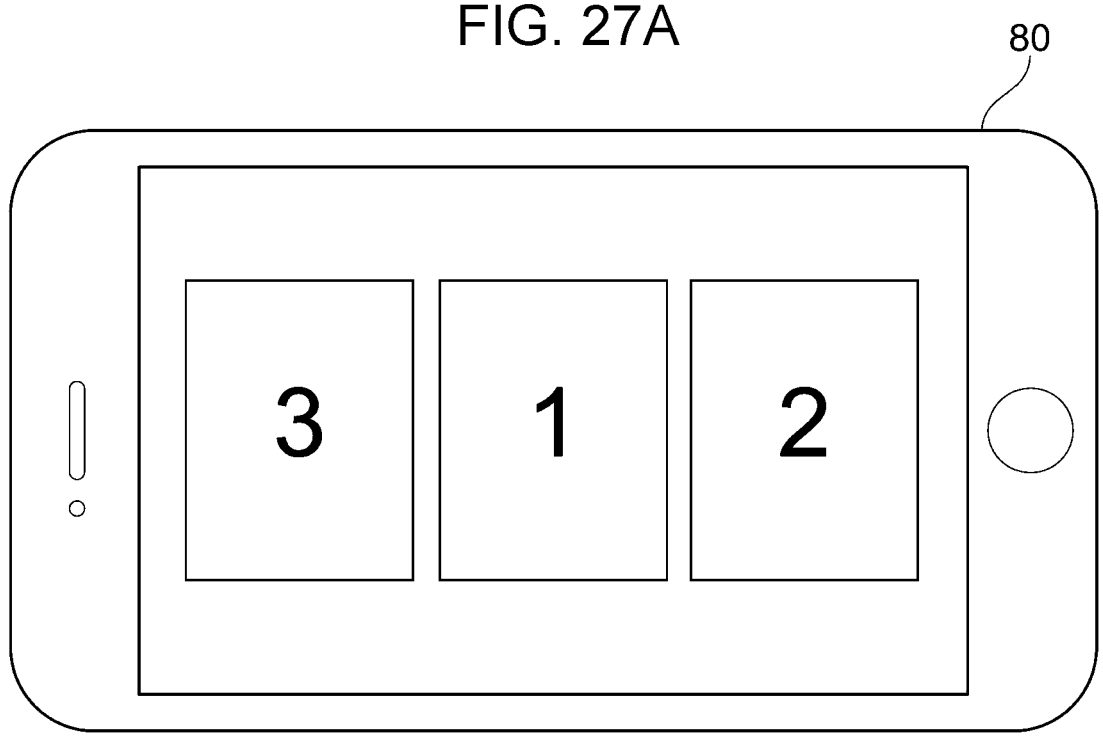
FIGS. 27A and 27B each illustrate an example of presenting the reading order, with FIG. 27A illustrating a case where the reading order of divided QR codes is indicated using numbers and the positional relationship and with FIG. 27B illustrating a case where the reading order of divided QR codes is indicated using a text.
Figure 27B:
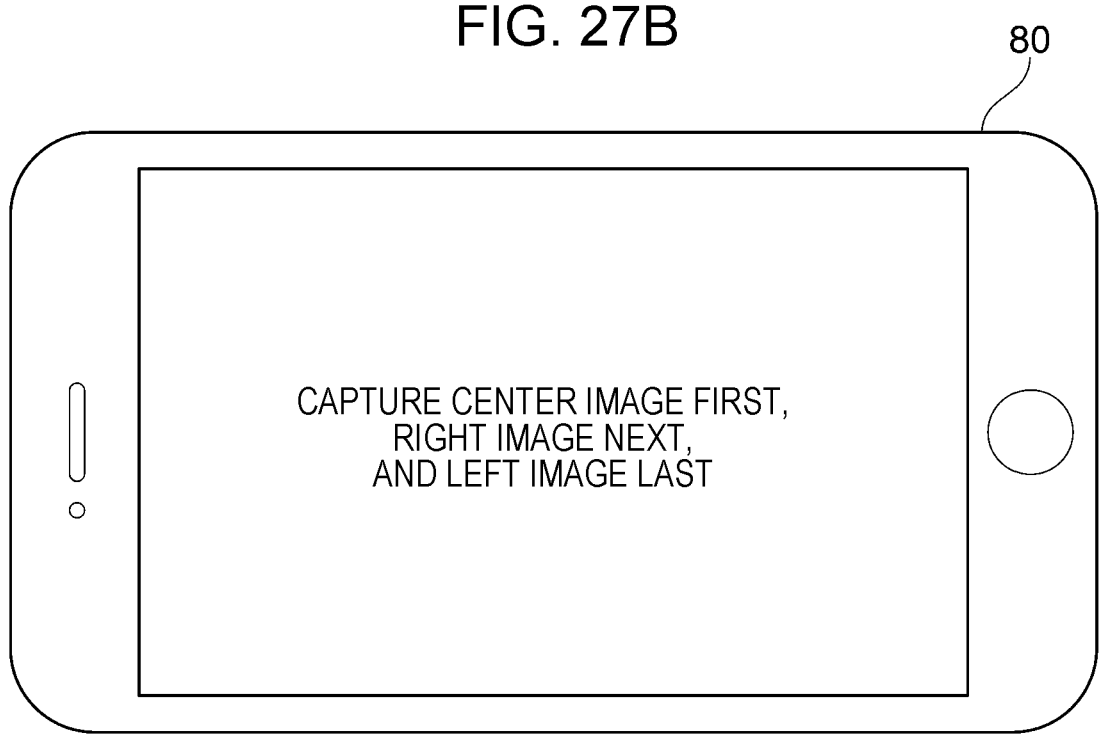

FIGS. 27A and 27B each illustrate an example of presenting the reading order, with FIG. 27A illustrating a case where the reading order of divided QR codes is indicated using numbers and the positional relationship and with FIG. 27B illustrating 3 case where the reading order of divided QR codes is indicated using a text.

The presentation in FIG. 27A may be used both in the case where the divided QR codes are displayed in the aerial images 10A to 10C (see FIG. 20), respectively, and in the case where plural divided QR codes are disposed in one aerial image.

In the example in FIG. 27B, language saying "capture center image first, right image next, and left image last" is displayed.

In FIGS. 27A and 27B, the reading order is displayed on the screen of the smartphone 80.

The description returns to FIG. 26.

When the reading order is presented, the user reads the divided QR codes in the presented order.

The smartphone 80 decodes the read divided QR code each time the divided QR code is read (step 123).

In the decoding, image processing such as background removal, distortion correction, and inside/outside conversion is executed.

Figure 28A:
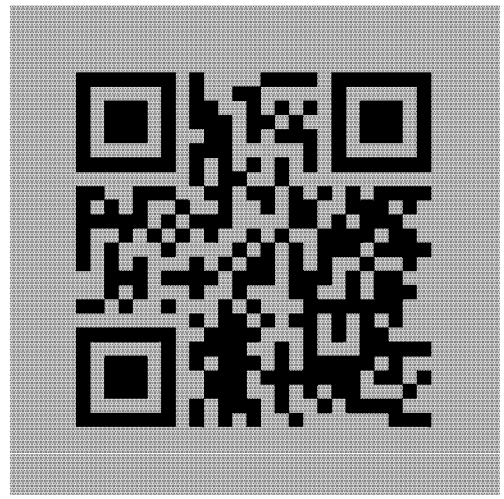
FIGS. 28A and 28B illustrate a process of removing a background portion of a divided QR code from an image captured using a camera, with FIG. 28A illustrating an image before processing and with FIG. 28B illustrating an image after processing.
Figure 28B:

FIGS. 28A and 28B illustrate a process of removing a background portion of a divided QR code from an image captured using a camera, with FIG. 28A illustrating an image before processing and with FIG. 28B illustrating an image after processing; in FIG. 28B, a non-black portion has been removed from an image captured in order to extract a divided QR code displayed in black. The aerial image 10 (see FIG. 20) is an image optically formed in the air, and therefore there is not a little possibility that a surrounding scene is captured through the aerial image 10. Thus, a process of separating the divided QR code and the scene from each other is executed during decoding.

In this manner, conditions for extracting a divided QR code from the aerial image 10 are harder than those for reading a divided QR code from an object. Thus, it is desirable that the minimum symbol size for prescribing the resolution of a divided QR code should be larger than that for a case where a divided QR code is formed on an object. As a matter of course, such conditions depend on the environment in which a divided QR code is read.

Figure 29A:
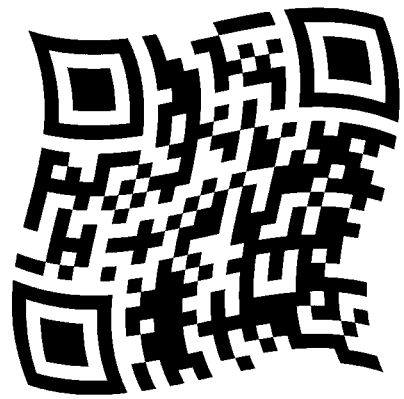
FIGS. 29A and 29B illustrate a process of removing distortion from an image of a divided QR code captured using a camera, with FIG. 29A illustrating an image before processing and with FIG. 29B illustrating an image after processing.
Figure 29B:

FIGS. 29A and 29B illustrate a process of removing distortion from an image of a divided QR code captured using a camera, with FIG. 29A illustrating an image before processing and with FIG. 29B illustrating an image after processing; The image illustrated in FIG. 29A is distorted in accordance with the shape of a curved surface.

FIGS. 30A and 30B illustrate a process performed in the case where an image of a divided QR code is captured from the back side of an aerial image, with FIG. 30A illustrating an image before processing and with FIG. 30B illustrating an image after processing;

The back surface refers to a surface on the opposite side of the front surface. The front surface refers to a surface, characters on which are recognized as being in the correct direction, or a surface, a face on which is observed as being in the correct right-left direction. In the case where the aerial image 10 is a three-dimensional image, a surface in the direction in which a surface determined as the front surface is observed is referred to as the front surface.

As discussed earlier, an aerial image is an image optically formed in the air, and thus is observable also from the back side. Therefore, the user may read a divided QR code from the back side by mistake.

In the case where a divided QR code is captured in an image from the front surface, rectangular clipping symbols should appear at three, upper right, upper left, and lower left, corners. In the image in FIG. 30A, however, the clipping symbols appear at three, upper right, upper left, and lower right, corners. In this case, the decoding section 113 (see FIG. 25) inverts the image to recover an image captured f the front side.

FIG. 26 is described again.

When the divided QR code which is included in the captured image is successfully decoded, the smartphone 80 determines whether or not all the divided QR codes have been read (step 124).

In the case where a negative result is obtained in step 124, the smartphone 80 returns to step 123, and decodes a divided QR code in the next reading order. In the present exemplary embodiment, the process is repeated until three divided QR codes are decoded.

In the case where a positive result is obtained in step 124, the smartphone 80 acquires the original information from the decoded information (step 125).

<Fourth Exemplary Embodiment>

In the present exemplary embodiment, plural QR codes are formed time-sequentially.

Figure 31:
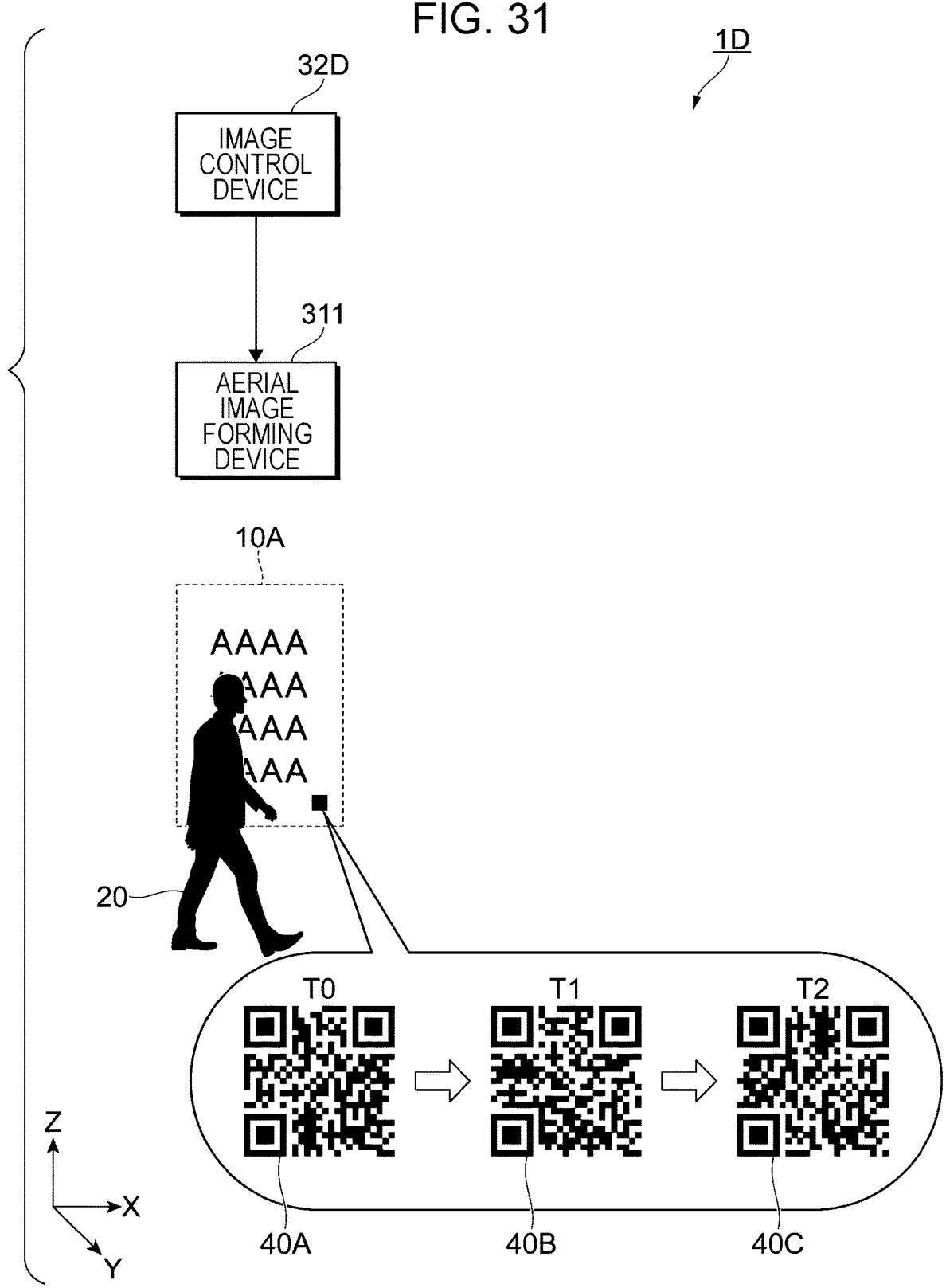
FIG. 31 illustrates a schematic configuration of an aerial image forming system according to a fourth exemplary embodiment.

FIG. 31 illustrates a schematic configuration of an aerial image forming system 1D according to a fourth exemplary embodiment. Portions in FIG. 31 corresponding to those in FIG. 20 are denoted by the corresponding reference numerals.

The aerial image forming system 1D includes an aerial image forming device 311 that forms an aerial image 10A and an image control device 32D that controls the aerial image forming device 311.

FIG. 31 is different from the third exemplary embodiment in that one aerial image 10A is formed using one aerial image forming device 311 and divided QR codes 40A, 40B, and 40C are formed time-sequentially (in the order of T1, T2, and T3) in a portion of the aerial image 10A.

The hardware configuration of the image control device 32D according to the present exemplary embodiment is basically the same as that of the image control device 32A illustrated in FIG. 7. It should be noted, however, that the person detection sensor 33 is not connected to the image control device 32D.

Figure 32:
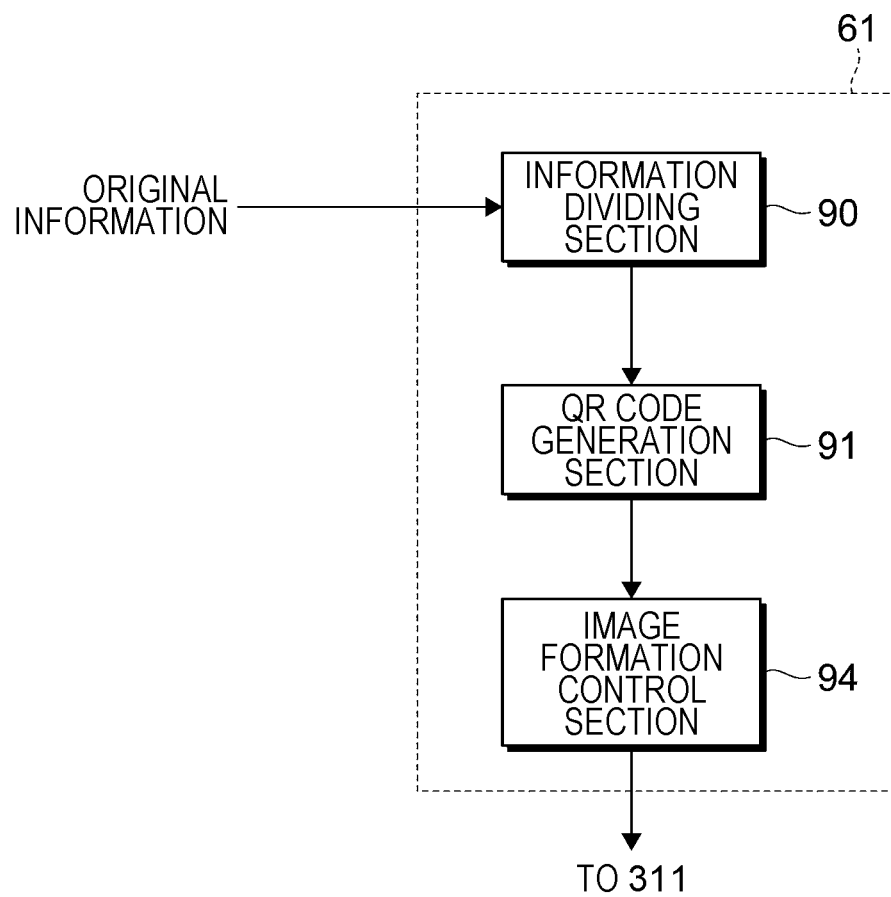
FIG. 32 illustrates an example of the functional configuration of an image control device according to the fourth exemplary embodiment.

FIG. 32 illustrates an example of the functional configuration of the image control device 32D (see FIG. 31) according to the fourth exemplary embodiment. Portions in FIG. 32 corresponding to those in FIG. 21 are denoted by the corresponding reference numerals.

The functional configuration illustrated in FIG. 32 is implemented through execution of a program by the CPU 61 (see FIG. 7).

The CPU 61 functions as an information dividing section that divides the original information into plural pieces of information, a QR code generation section 91 that generates divided QR codes from the divided information, and an image formation control section 94 that controls formation of the aerial image 10A which includes the divided QR codes.

The image formation control section 94 according to the present exemplary embodiment differs from the third exemplary embodiment in that the divided QR codes are formed ti sequentially in the reading order.

The divided QR codes are formed one at a time in the reading order, which enables decoding the original information by simply sequentially capturing images of the divided QR codes which are switched time-sequentially.

It should be noted, however, that the present exemplary embodiment is based on the assumption that the user knows the timing when display of the divided QR codes is started, the number of the divided QR codes, the cycle of the switching, etc.

Figure 33:
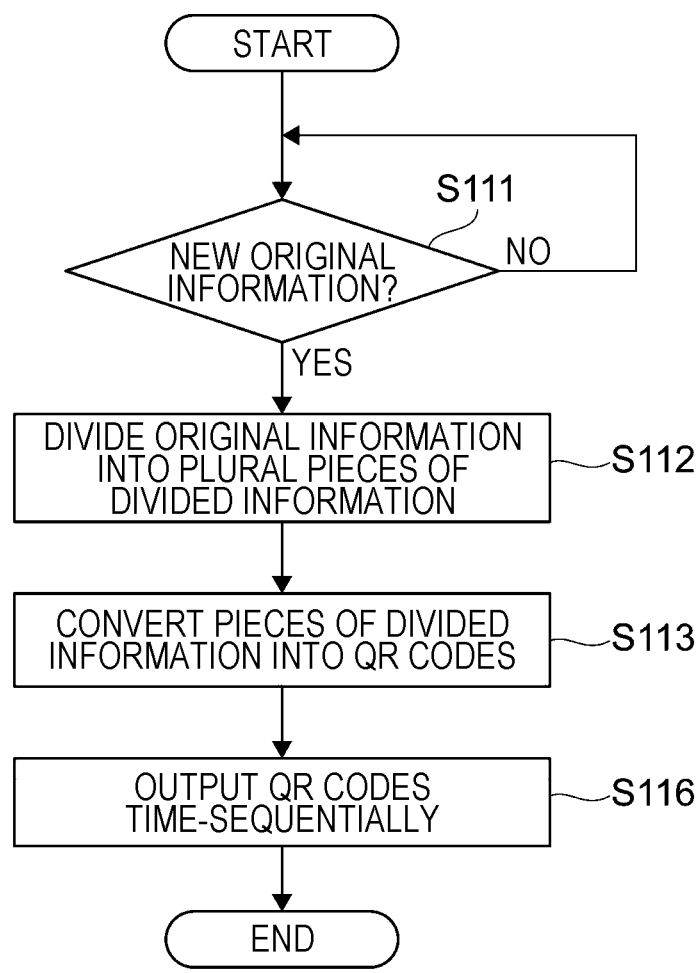
FIG. 33 is a flowchart illustrating an overview of processing operation executed by the image control device according to the fourth exemplary embodiment.

FIG. 33 is a flowchart illustrating an overview of processing operation executed by the image control device 32D (see FIG. 31) according to the fourth exemplary embodiment. The drawing illustrates an overview, and thus the details differ in accordance with the individual mode of use.

Portions in FIG. 33 corresponding to those in FIG. 22 are denoted by the corresponding reference numerals. FIG. 33 is different from the processing operation illustrated in FIG. 22 in that step 116, in which the generated divided QR codes are output time-sequentially, is executed after execution of step 113.

Also in this case, before a notification of information on the reading order is made, a process of authenticating whether or not access to the original information is permitted is executed between the image control device 32D and a terminal (e.g. a smartphone) possessed by the person 20 (see FIG. 31), for example. It is also possible to use a portion of the aerial image 10A as an authentication screen, detect a gesture by the person 20, authenticate the person 20 by his/her face, or the like.

It this event, the user is notified of the display position of the divided QR codes, the timing when display of the divided QR codes is started, the number of the divided QR codes, the cycle of the switching, etc.

The notification may be made using an indication in the aerial image 10A, a sound or an image output from the smartphone 80 (see FIG. 23), for example, or the like.

FIGS. 34A to 34D each illustrate an example of the divided QR code 40A, 40B, 40C that is output, with FIGS. 34A to 34D illustrating an example of the divided QR code 40A to 40C formed at time T0, time T1, time T2, and time T3, respectively.

In the example of FIGS. 34A to 34D, the divided QR codes 40A, 40B, and 40C are positioned at the lower right of the aerial image 10A, and switched in a cycle of 10 seconds.

In the case of FIGS. 34A to 34D, the aerial image 10A which includes no divided QR code is displayed 30 seconds after the output of the divided QR code 40A is started. The output in the next cycle may be started at time T3.

Figure 35A:
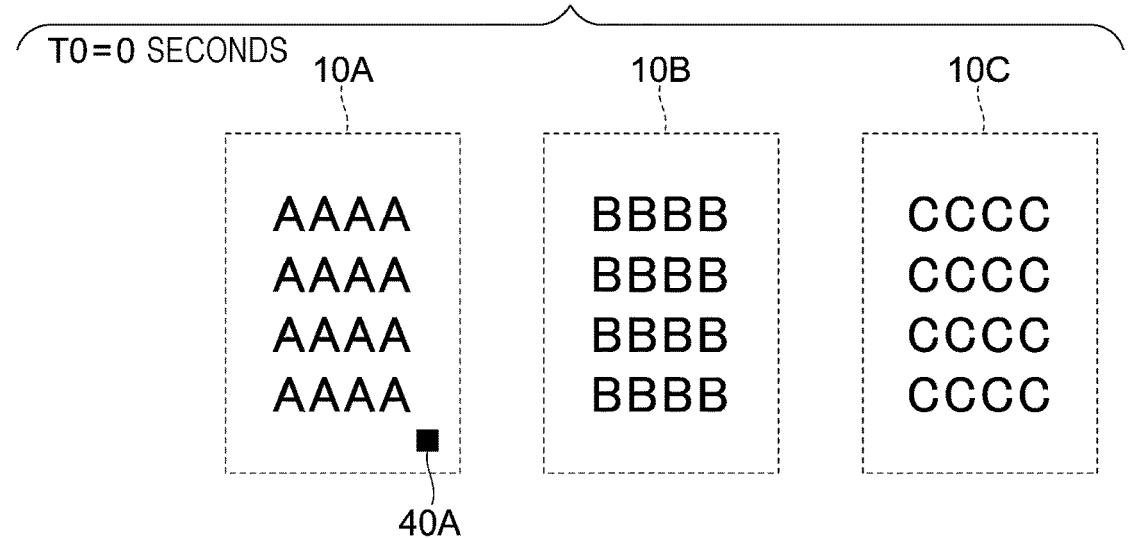
FIGS. 35A to 35C each illustrate another example of a divided QR code that is output, with FIGS. 35A to 35C illustrating an example of a divided QR code formed at time T0, time T1, and time T2, respectively.
Figure 35B:
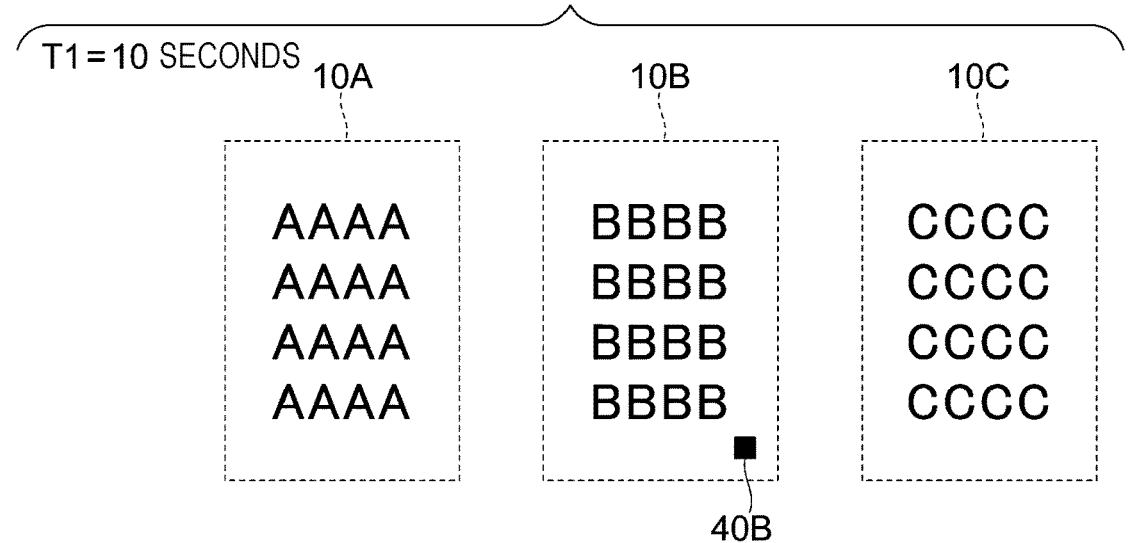
Figure 35C:
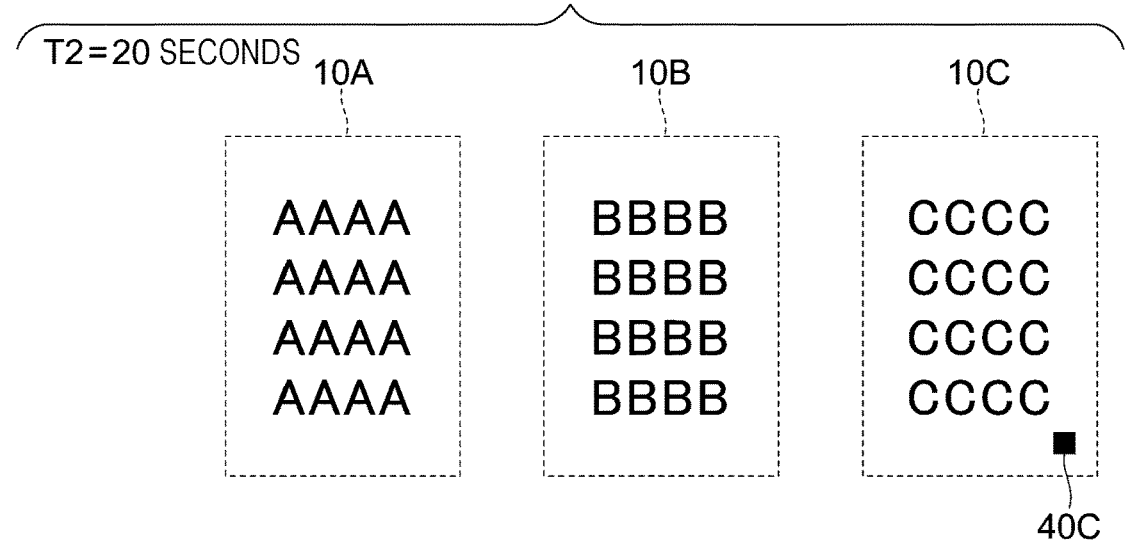

FIGS. 35A to 35C each illustrate another example of the divided QR 40A, 40B, 40C code that is output, with FIGS. 35A to 35C illustrating an example of the divided QR code 40A to 40C formed at time T0, time T1, and time T2, respectively.

As with the second and third exemplary embodiments, this example also assumes a case where plural aerial images 10A to 10C are formed. One divided QR code is displayed each time. For example, the divided QR code 40A is formed in the aerial image 10A at time T0, the divided QR code 40B is formed in the aerial image 10B at time T1, and the divided QR code 400 is formed in the aerial image 100 at time T2.

In the present exemplary embodiment, the display order and the reading order coincide with each other. As in the second and third exemplary embodiments, however, the reading order may be linked to the display position.

Subsequently, a scheme for sharing the reading timing between the image control device 32D and the person 20 will be described.

In the earlier description, the user has been notified beforehand of the timing when display of the divided QR codes is started, the number of the divided QR codes, the cycle of the switching, etc. However, a method of reliably decoding the original information will be described with reference to FIGS. 36 and 37.

Figure 36:
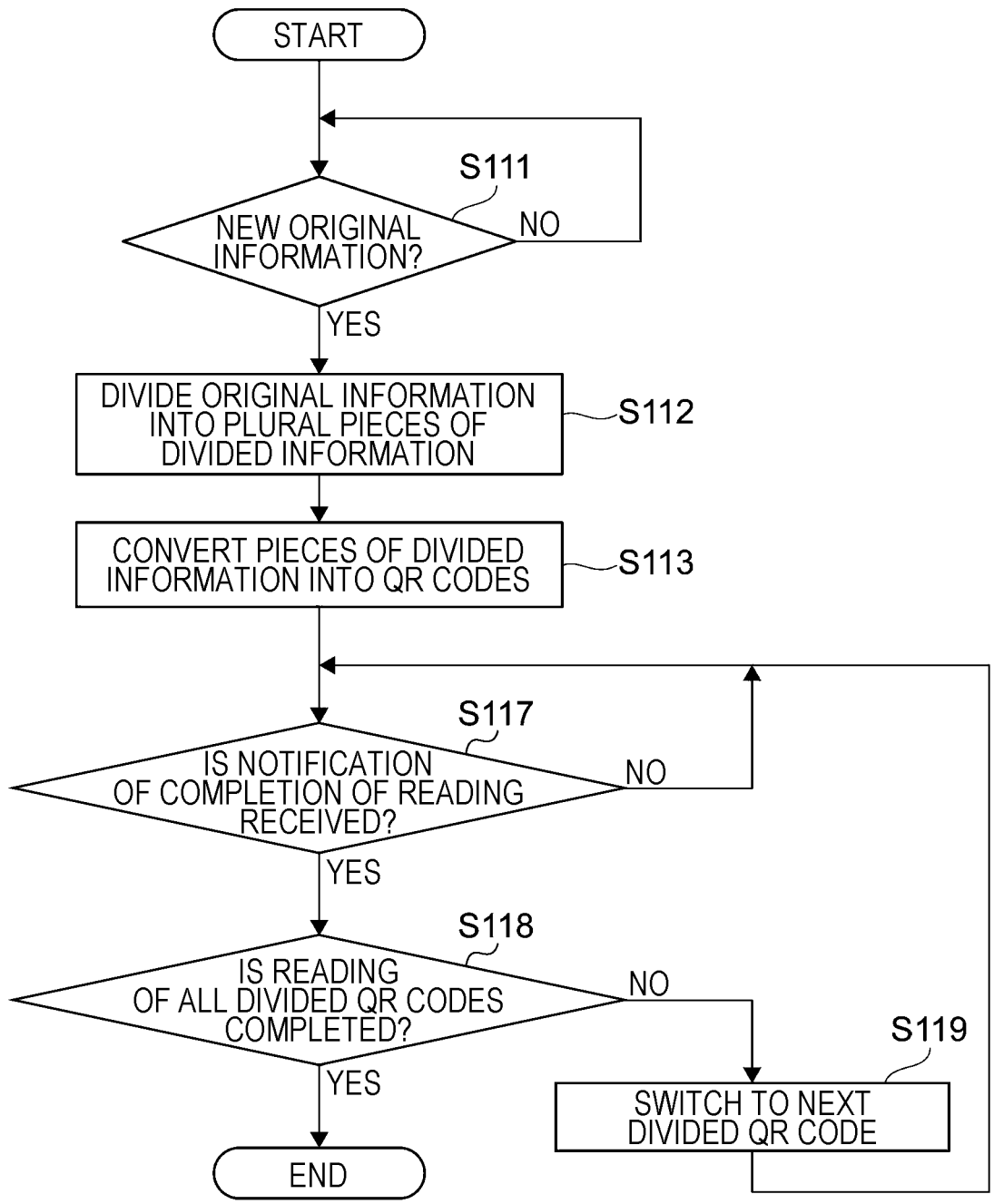
FIG. 36 is a flowchart illustrating another overview of processing operation executed by the image control device according to the fourth exemplary embodiment.

FIG. 36 is a flowchart illustrating another overview of processing operation executed by the image control device 32D (see FIG. 31) according to the fourth exemplary embodiment.

Figure 37:
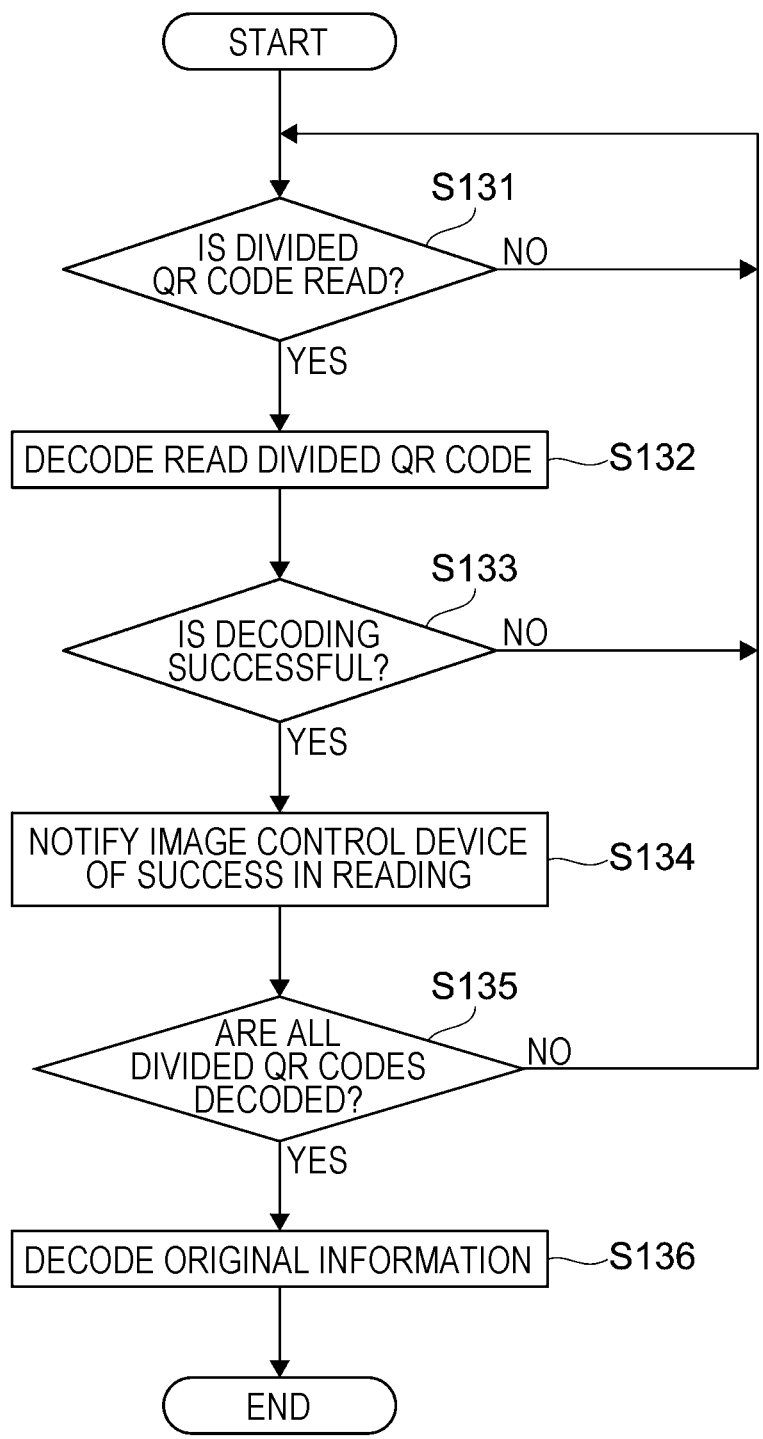
FIG. 37 is a flowchart illustrating an overview of processing operation executed by a smartphone that is used to read divided QR codes.

FIG. 37 is a flowchart illustrating an overview of processing operation executed by the smartphone 80 (see FIG. 23) that is used to read divided QR codes The drawings illustrate an overview, and thus the details differ in accordance with the individual mode of use.

First, processing operation performed by the image control device 32D will be described. Portions in FIG. 36 corresponding to those in FIG. 33 are denoted by the corresponding reference numerals. FIG. 36 differs from FIG. 33 in processes after step 113.

When the output of the first divided QR code in the reading order is permitted, the CPU 61 (see FIG. 7) which constitutes the image control device 32D (see FIG. 31) determines whether or not the CPU 61 has received a notification of completion of reading of the divided QR code being displayed (step 117). The notification of completion of reading is sent from the smartphone 80.

The CPU 61 repeatedly makes the determination while a negative result is obtained in step 117.

In the case where a positive result is obtained in step 117, the CPU 61 determines whether or not reading of all the divided QR codes has been completed (step 118).

In the case where a negative result obtained in step 118, the CPU 61 switches the output target to the next divided QR code (step 119). After that, the CPU 61 returns to step 117, and stands by to receive a notification of completion of reading.

In the case where a positive result is obtained in step 118 (which means that reading of all the divided QR codes has been completed), the CPU 61 ends the process.

Next, processing operation performed by the smartphone will be described.

First, the smartphone 80 determines whether or not a divided QR code is read (step 131).

The smartphone 80 repeatedly makes the determination while a negative result is obtained in step 131.

In the case where a positive result is obtained in step 131, the smartphone 80 decodes the read divided QR code (step 132).

Next, the smartphone 80 determines whether or not the divided QR code is successfully decoded (step 133).

While a negative result is obtained in step 133, the smartphone 80 returns to step 131, and reads a divided QR code again. This is because reading of a divided QR code formed as a part of the aerial image 10A (see FIG. 31) tends to be affected by the surrounding environment as discussed earlier.

In the case where a positive result is obtained in step 133, the smartphone 80 notifies the image control device 32D (see FIG. 31) of the success in reading (step 134). The determination made in step 117 (see FIG. 36) is based on the reception of this notification.

After that, the smartphone 80 determines whether or not all the divided QR codes have been decoded (step 135).

In the case where a negative result is obtained in step 135, the smartphone 80 transitions to step 131, and prepares to read the next divided QR code.

In the case where a positive result is obtained in step 135, the smartphone 80 decodes the original information (step 136).

Figure 38:
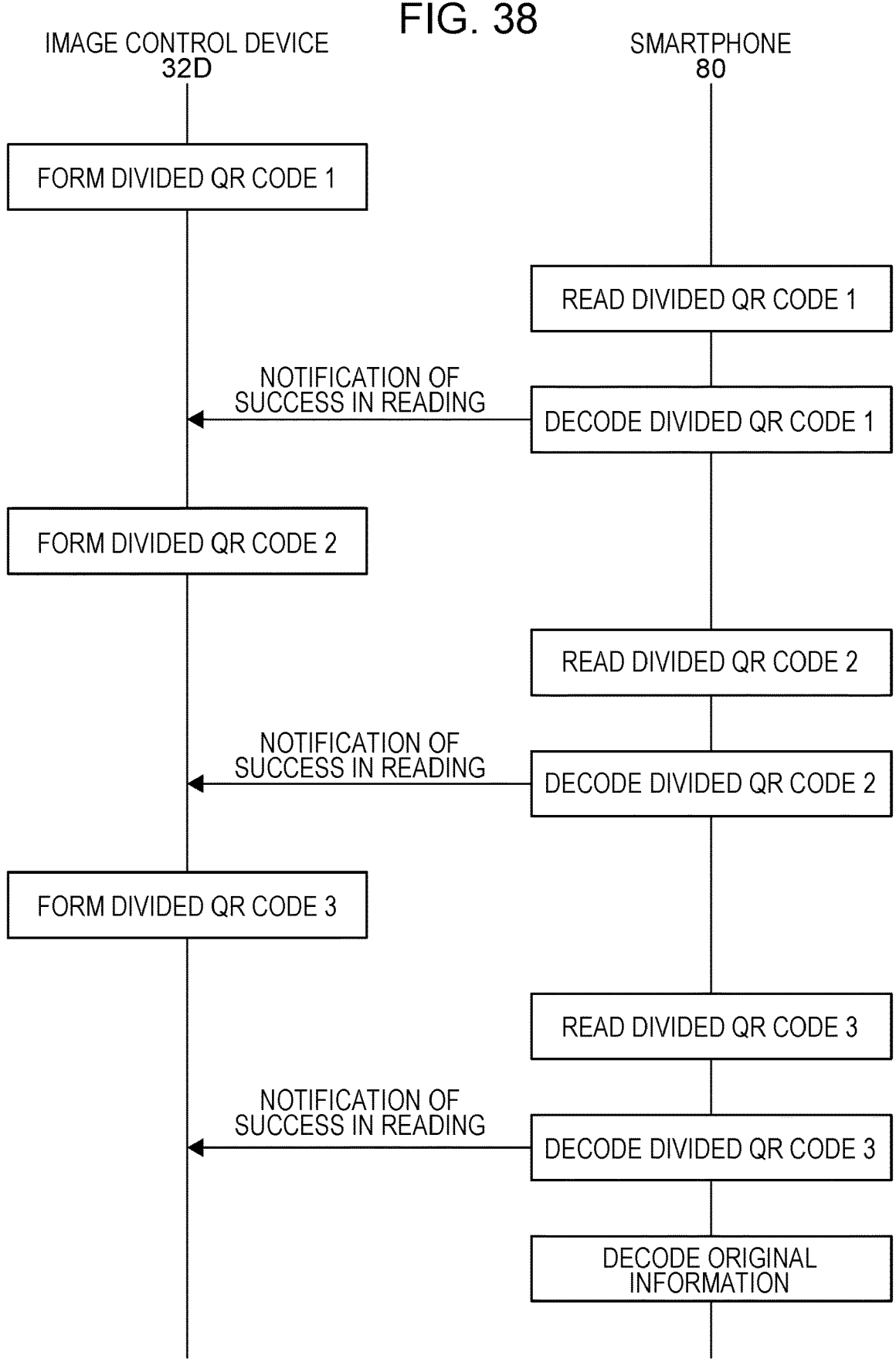
FIG. 38 illustrates the relationship between formation of divided QR codes by an image control device and reading operation by the smartphone.

FIG. 38 illustrates the relationship between formation of divided QR codes by the image control device 32D and reading operation by the smartphone 80.

In FIG. 38, the divided QR codes are indicated as a divided QR code 1, a divided QR code 2, and a divided QR code 3 in the order of formation.

First, the image control device 32D forms the divided QR code 1, and the smartphone 80 reads and decodes the divided QR code 1. When the smartphone 80 successfully reads the divided QR code, the image control device 32D forms the divided QR code 2, and the smartphone 80 reads and decodes the divided QR code 2. When the smartphone 80 successfully reads the divided QR code, the image control device 32D forms the divided QR code 3, and the smartphone 80 reads and decodes the divided QR code 3. When the divided QR code 3 is successfully read, the smartphone 80 notifies the image control device 32D of the success in reading, and decodes the original information from the divided QR codes 1 to 3.

<Fifth Exemplary Embodiment>

The present exemplary embodiment describes an example of a method of determining conditions for forming an image of a QR code in accordance with the surrounding environment.

Figure 39:
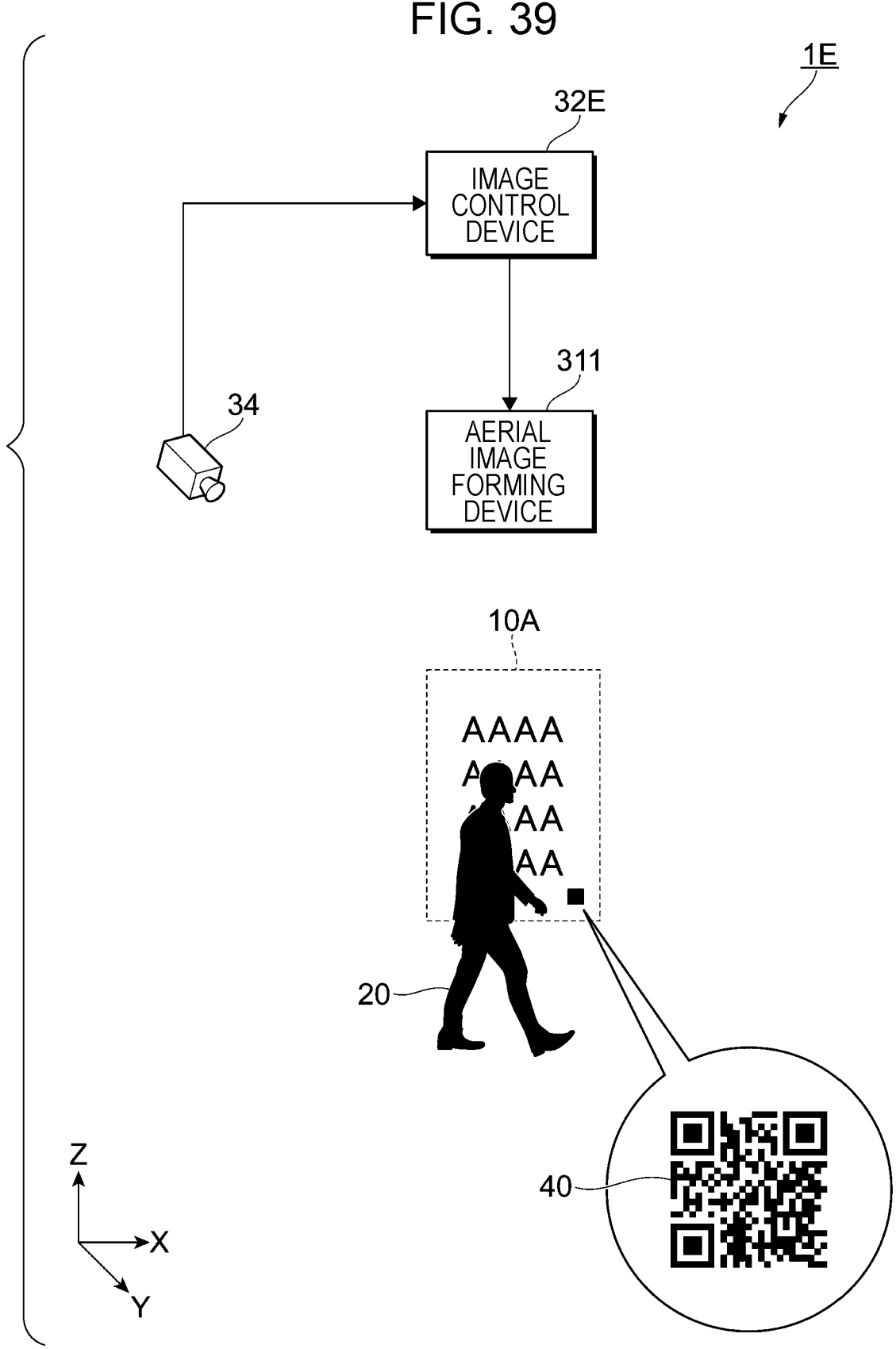
FIG. 39 illustrates a schematic configuration of an aerial image forming system according to a fifth exemplary embodiment.

FIG. 39 illustrates a schematic configuration of an aerial image forming system 1E according to a fifth exemplary embodiment. Portions in FIG. 39 corresponding to those in. FIG. 1 are denoted by the corresponding reference numerals.

In the case of FIG. 39, a camera 34 that captures an image of e surrounding environment is connected to an image control device 32E, and the QR code 40 is formed in the aerial image 10A. Plural QR codes or divided QR codes may be formed as in the first to third exemplary embodiments discussed earlier.

The camera 34 according to the present exemplary embodiment is disposed so as to be able to capture an image of at least the QR code 40.

It is not necessary that the camera 34 should be provided as equipment, and the camera 34 may be mounted on the smartphone 80 (see FIG. 23) which captures an image of the QR code 40. In this case, the smartphone 80 (see FIG. 23) is able to send an image to the image control device 32E.

The hardware configuration of the image control device 32E according to the present exemplary embodiment is basically the same as that of the image control device 32A illustrated in FIG. 7. It should be noted, however, that the camera 34 is connected to the image control device 32E in place of the person detection sensor 33.

Figure 40:
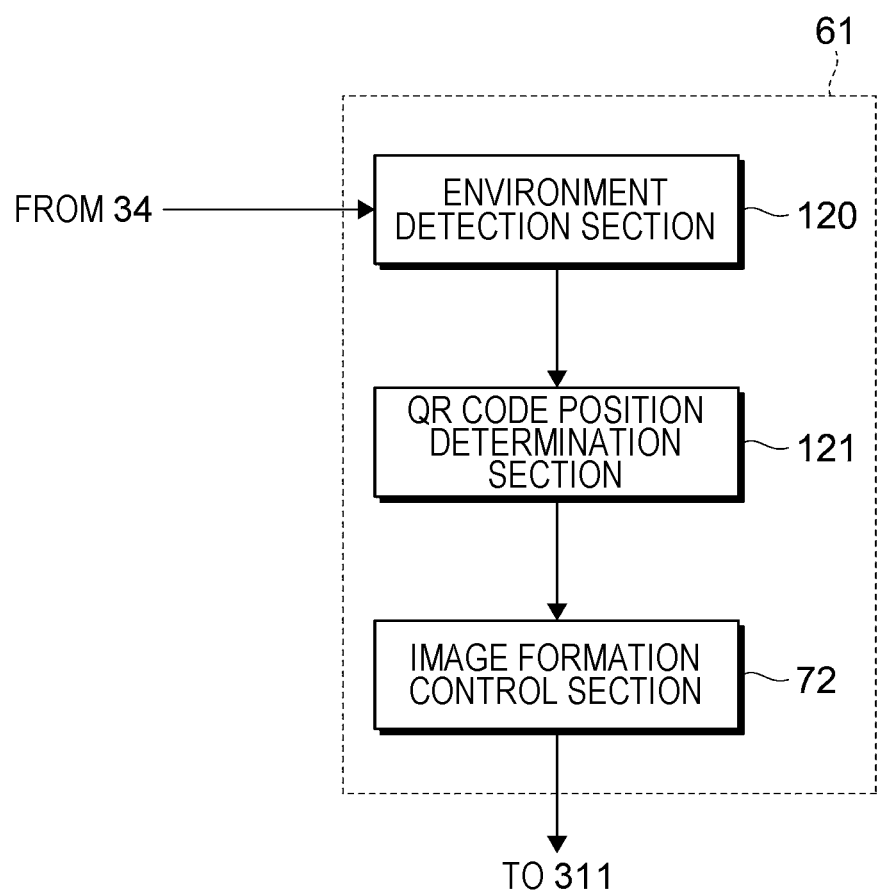
FIG. 40 illustrates an example of the functional configuration of an image control device according to the fifth exemplary embodiment.

FIG. 40 illustrates an example of the functional configuration of the image control device 32E (see FIG. 39) according to the fifth exemplary embodiment. Portions in FIG. 40 corresponding to those in FIG. 8 are denoted by the corresponding reference numerals.

The functional configuration illustrated in FIG. 40 is implemented through execution of a program by the CPU 61 (see FIG. 7).

In the case of the present exemplary embodiment, the CPU 61 functions as an environment detection section 120 that detects the surrounding environment which affects how a QR code looks by processing an image captured by the camera 34, a QR code position determination section 121 that determines the position at which the QR code 40 (see FIG. 39) is formed in accordance with the detected environment, and an image formation control section 72 that controls formation of the aerial image 10 (see FIG. 1) and the QR code 40 using information on the detected position.

FIG. 41 is a flowchart illustrating an overview of processing operation executed by the image control device 32E (see FIG. 39) according to the fifth exemplary embodiment. The drawing illustrates an overview, and thus the details differ in accordance with the individual mode of use.

First, the image control device 32E determines whether or not the viewability of a QR code is found to be affected by the surrounding environment (step 121).

The image control device 32E repeatedly makes the determination while a negative result is obtained in step 121.

In the case where a positive result is obtained in step 121, the g e control device 32E determines whether or not the viewability is lowered because of the relationship with the background (step 122).

In the case where a positive result is obtained in step 122, the image control device 32E changes the color tone of the QR code to a color that is antagonistic to that of the background, for example (step 123).

Figure 42A:
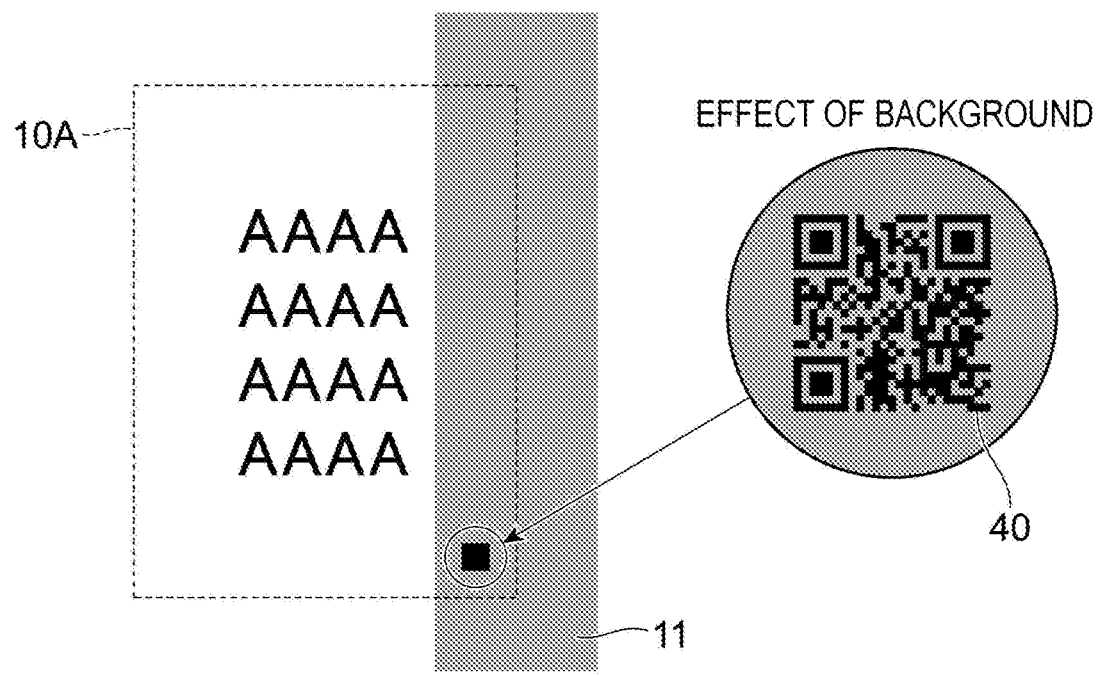
FIGS. 42A and 42B illustrate the effect of a background on the viewability of a QR code, with FIG. 42A illustrating a case with an effect and with FIG. 42B illustrating a case with no effect.
Figure 42B:
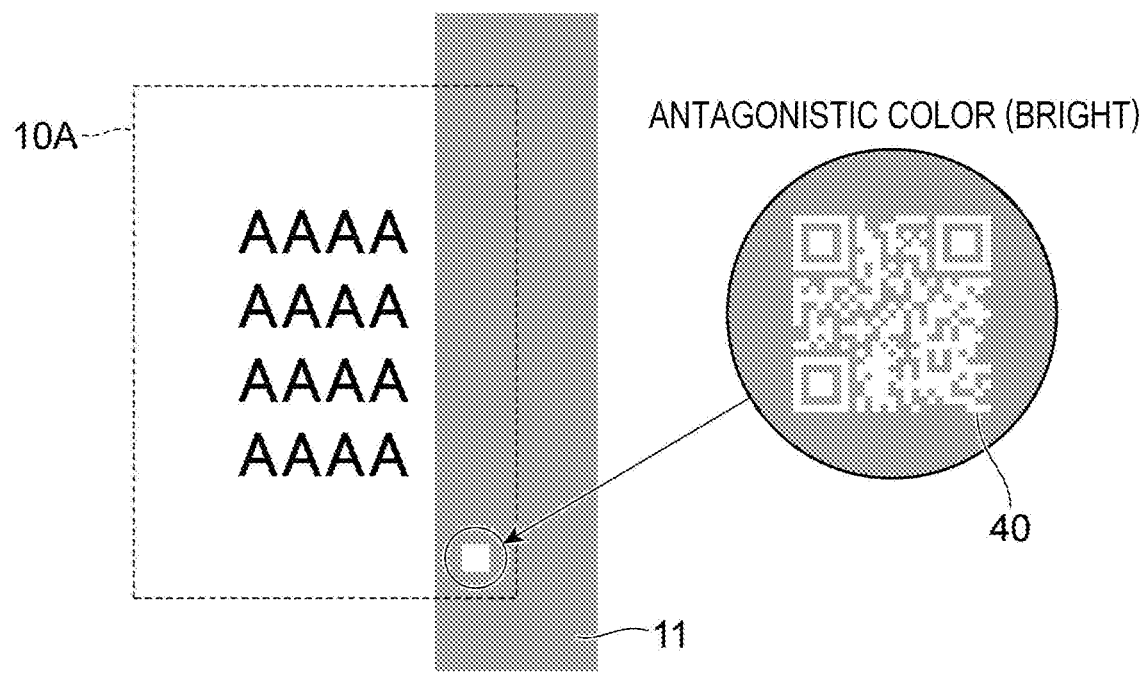

FIGS. 42A and 42B illustrate the effect of a background 11 on the viewability of a QR code 40, with FIG. 42A illustrating a case with an effect and th FIG. 42B illustrating a case with no effect.

In FIG. 42A, the color tone of the background 11 and the color tone of the QR code 40 are close to each other, and therefore it is difficult to identify the QR code 40. In FIG. 42B, however, the display color of the QR code 40 is changed to a white (or bright) color which is antagonistic to that of the background 11 to enhance the viewability of the QR code 40.

A different aerial image that lowers the viewability of the background may be formed behind the QR code 40 (aerial image 10A) to enhance the viewability of the QR code 40 (aerial image 10A) on the front side. In this case, the different aerial image may be a solid screen in a color that is antagonistic to that of the QR code 40, for example.

FIG. 41 is described again.

In the case where a negative result is obtained in step 122, the image control device 32E determines whether or not the viewability is lowered because of the effect of external light (step 124).

In the case where a positive result is obtained in step 124, the image control device 32E changes the arrangement of the QR code 40 (step 125). This change may be a movement to a candidate prepared in advance, or a movement to a region less affected by external light estimated from an image captured by the camera 34.

In the case where a negative result is obtained in step 124, the image control device 32E issues an alarm (step 126).

Figure 43A:
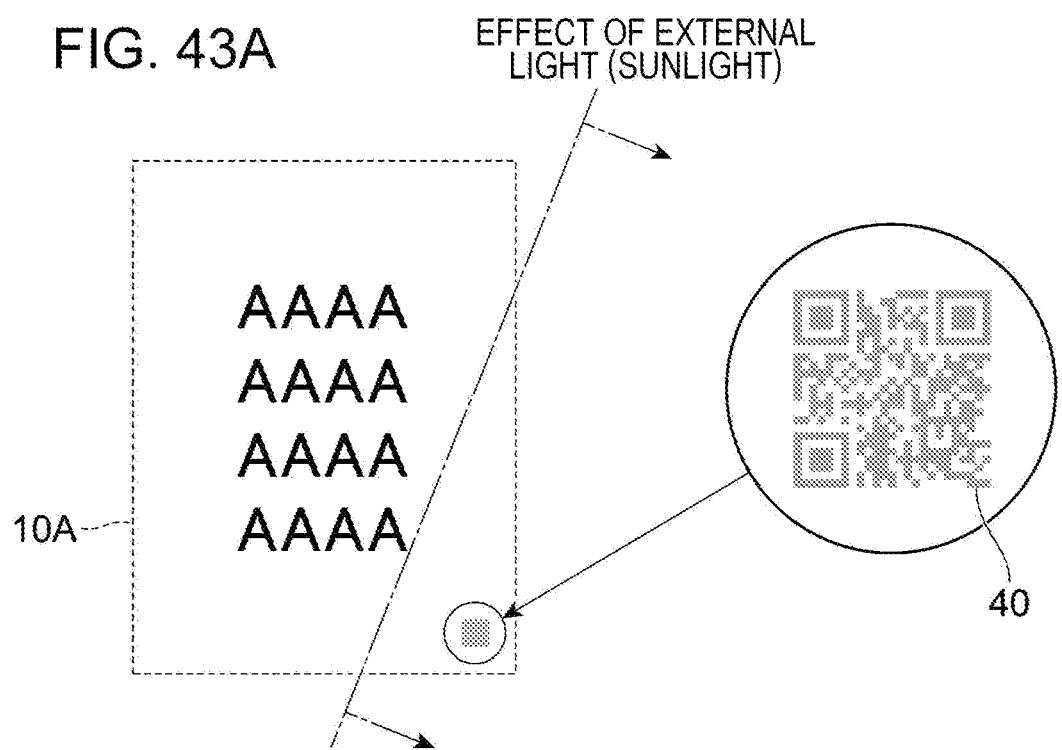
FIGS. 43A and 43B illustrate the effect of external light on the viewability of a QR code, with FIG. 43A illustrating a case where the position of the QR code and the external light overlap each other and with FIG. 43B illustrating how the QR code looks in the case where the position of the QR code is changed.
Figure 43B:
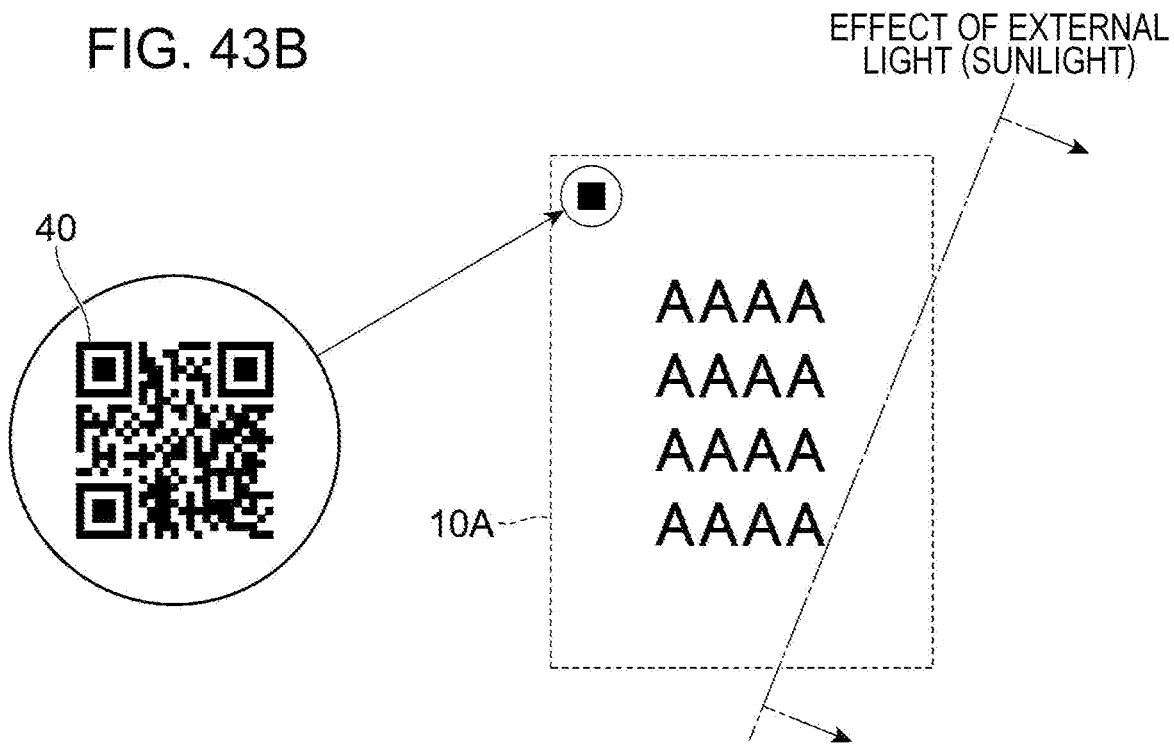

FIGS. 43A and 43B illustrate the effect of external light on the viewability of a QR code 40, with FIG. 43A illustrating a case where the position of the QR code 40 and the external light overlap each other and with FIG. 43B illustrating how the QR code 40 looks in the case where the position of the QR code is changed.

In FIG. 43A, the QR code 40 is recognized as being slightly whited out because of the bright surroundings. In FIG. 43B, the QR code 40 is formed at a position under no external light, and thus is viewable much better.

<Other Exemplary Embodiments>

While exemplary embodiments of the present invention have been described above, the technical scope of the present invention is not limited to the exemplary embodiments discussed above. It is apparent from the following claims that a variety of modifications and improvements that may be made to the exemplary embodiments discussed above also fall within the technical scope of the present invention.

(1) For example, in the exemplary embodiments discussed earlier, the aerial image 10 (see FIG. 1) is exclusively formed in a planar shape. However, the present invention is also applicable to a case where the aerial image 10 is formed three-dimensionally.

Figure 44:
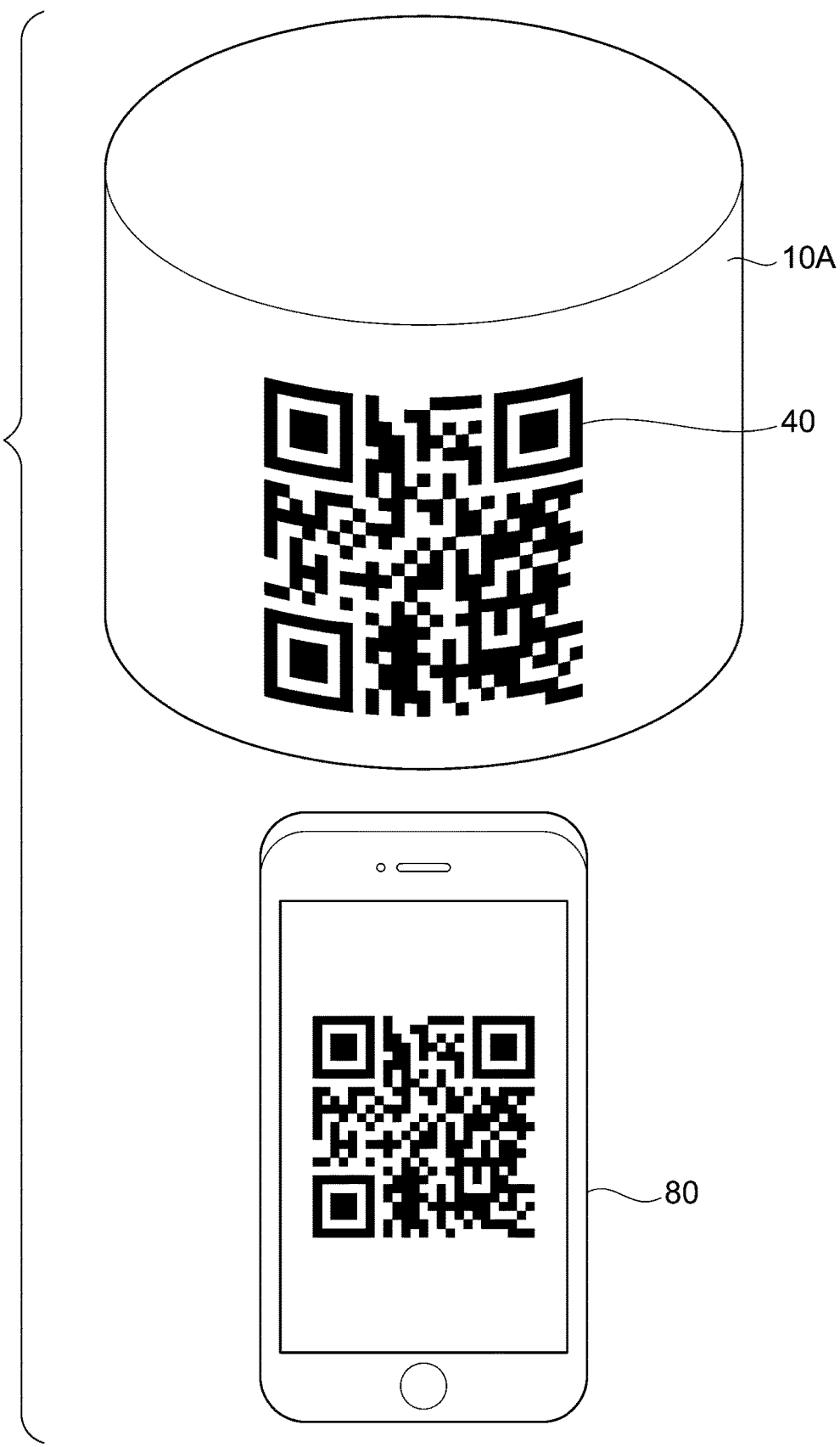
FIG. 44 illustrates an example in which an aerial image is formed in a cylindrical shape.

FIG. 44 illustrates an example in which an aerial image 10A is formed in a cylindrical shape. In FIG. 44, the QR code 40 is formed along a cylindrical surface. Therefore, the QR code 40 is displayed on a curved surface.

In this case, if an image generated internally were affixed, as it is, to the cylindrical surface, the QR code 40 which is captured by the smartphone 80 would be an image compressed along the direction of the curved surface.

Thus, the image control device 32A (see FIG. 1) is provided with a function of forming the QR code 40 as being distorted in accordance with the curvature of the cylindrical surface so that the original image is recovered when captured by the smartphone 80. In the example of FIG. 44, the QR code 40 is displayed as being deformed such that the pattern length longer than the original length to a greater degree toward the cuter edges of the QR code 40 in the circumferential direction.

Therefore, a planar image that is not affected by the cylindrical surface is displayed on the display section of the smartphone 80.

(2) In the exemplary embodiments discussed earlier, the aerial image forming device 311 etc. is assumed to be of a basically stationary type. However, the aerial image forming device 311 may be provided in a device that is highly portable.

Figure 45:
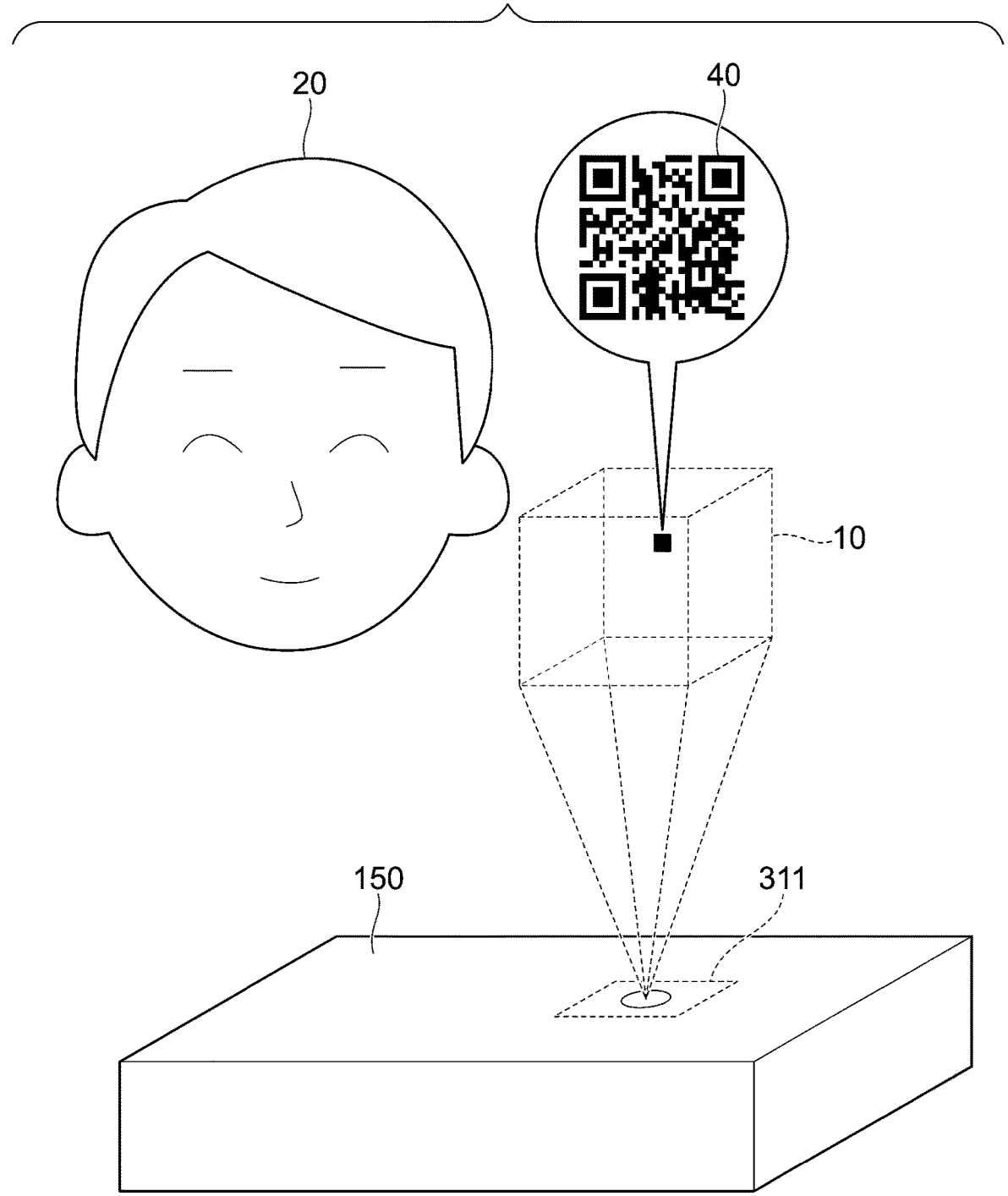
FIG. 45 illustrates a portable information processing apparatus that includes a built-in aerial image forming device.

FIG. 45 illustrates a portable information processing apparatus 150 that includes a built-in aerial image forming device 311.

The information processing apparatus 150 in FIG. 45 is assumed to be a device such as a notebook computer, a smartphone, a gaming machine, or an electronic dictionary, or a device that is used as being placed at a desired location such as on a desk or a floor surface.

The aerial image forming device 311 may be a device that forms the aerial image 10 by condensing pulsed laser light in the air, for example.

Also in the case of FIG. 45, the QR code 40 is formed in a part of the aerial image 10.

(3) In the exemplary embodiments discussed earlier, the QR code 40 (see FIG. 1) is formed in a portion of the aerial image 10 (see FIG. 1) (i.e. on the same plane). However, a plane on which the QR code 40 is formed and a plane on which the aerial image 10 is formed may not be the same as each other.

Figure 46A:
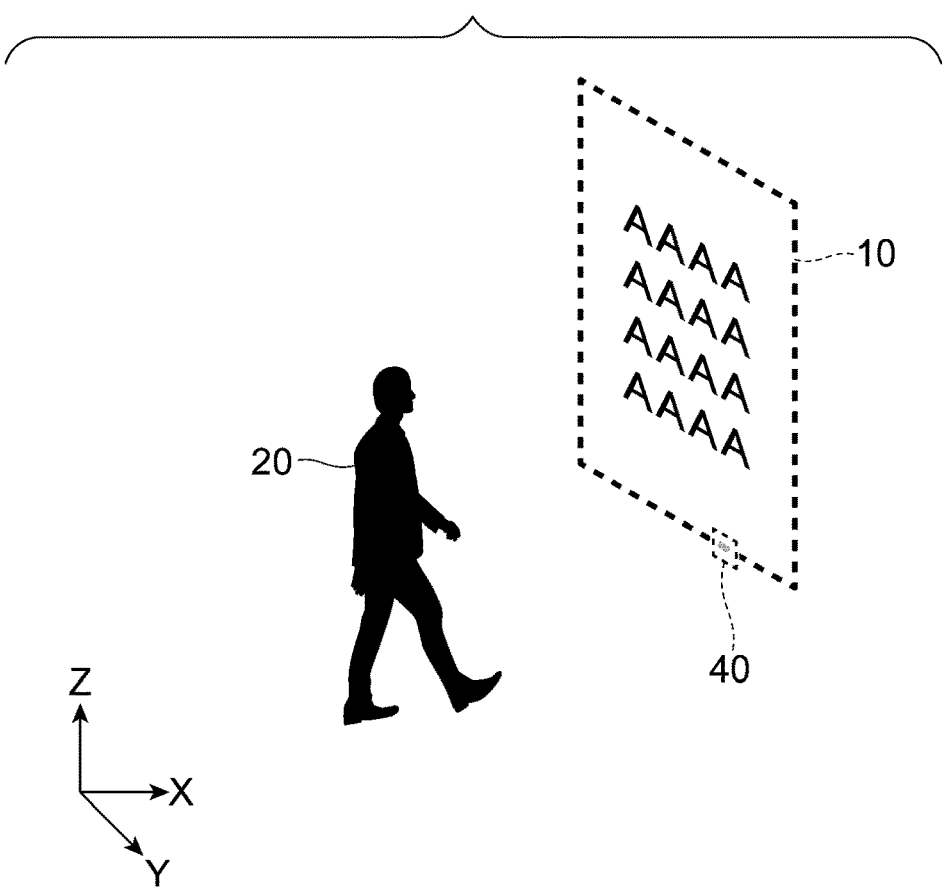
FIGS. 46A and 46B illustrate an example in which a QR code is formed at a position closer to a person and an aerial image is formed on the back side with respect to the QR code, with FIG. 46A illustrating the positional relationship between the QR code and the aerial image as seen from an oblique front side and with FIG. 46B illustrating the positional relationship between the QR code and the aerial image as seen from above.
Figure 46B:
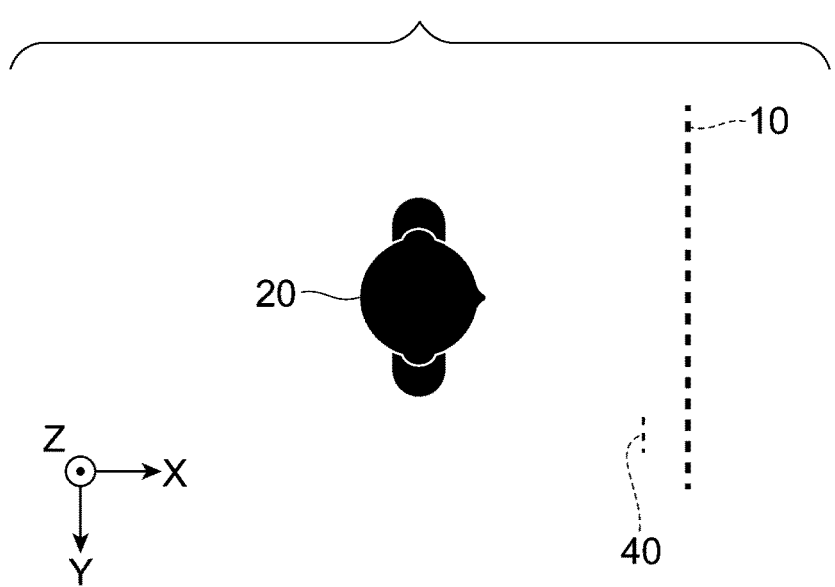

FIGS. 46A and 46B illustrate an example in which a QR code 40 is formed at a position closer to a person 20 and an aerial image 10 is formed on the back side with respect to the QR code 40, with FIG. 46A illustrating the positional relationship between the QR code 40 and the aerial image 10 as seen from an oblique front side and with FIG. 46B illustrating the positional relationship between the QR code 40 and the aerial image 10 as seen from above.

Figure 47:
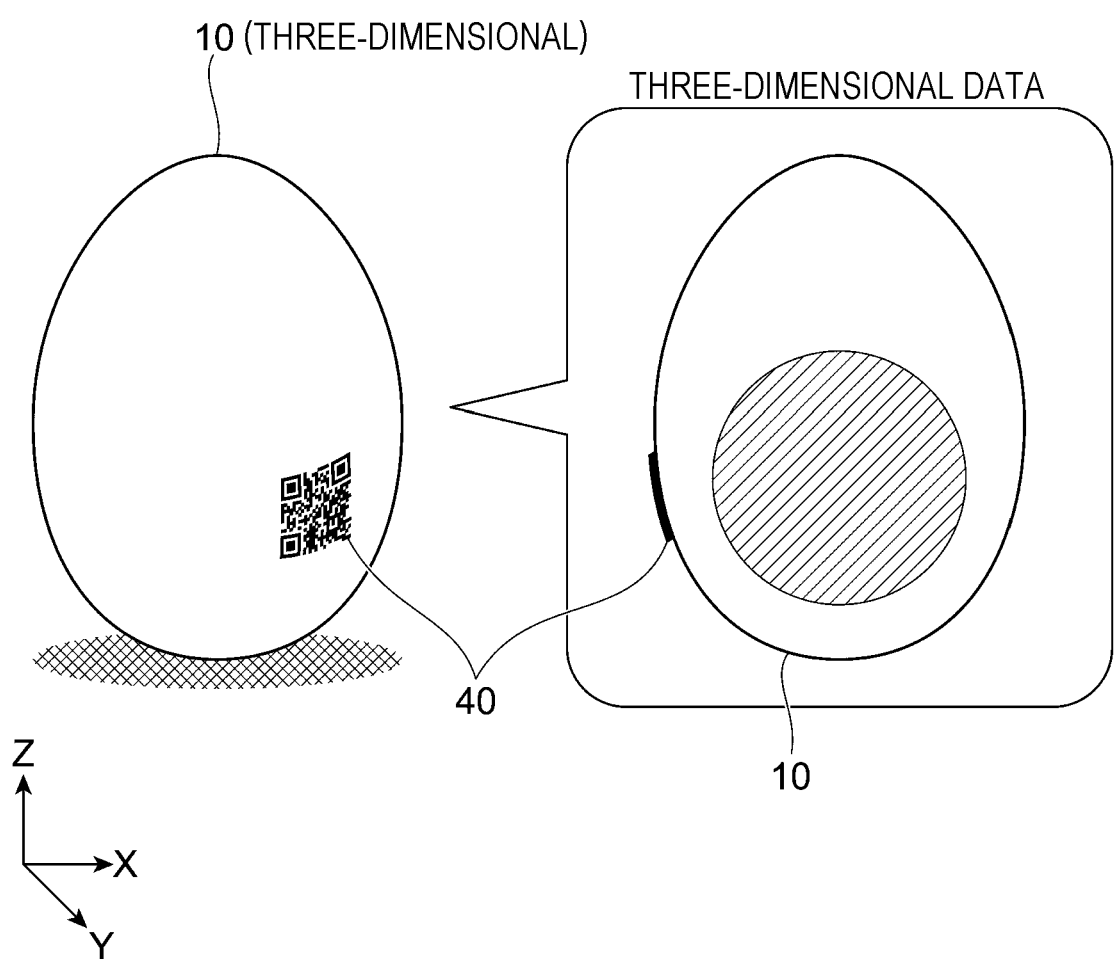
FIG. 47 illustrates another example in which a QR code is formed at a position closer to a person and an aerial image is formed on the back side with respect to the QR code.

FIG. 47 illustrates another example in which a QR code 40 is formed at a position closer to a person 20 and an aerial image 10 is formed on the back side with respect to the QR code 40.

In the case of FIG. 47, three-dimensional data corresponding to the aerial image 10 include not only data on the shell of a boiled egg but also data on the white and the yolk. The aerial image 10 illustrated in FIG. 47 corresponds to a three-dimensional image of the shell of the boiled egg. Also in this case, the QR code 40 is formed outside the shell, rather than at a position on the surface of or inside the shell of the boiled egg, in order to allow an image capturer to capture an image easily.

(4) In the exemplary embodiments discussed earlier, the reading order of the divided QR codes is presented to the user. However, a function of presenting to the user the positions at which the QR codes or the divided QR codes are disposed may be prepared.

Figure 48A:
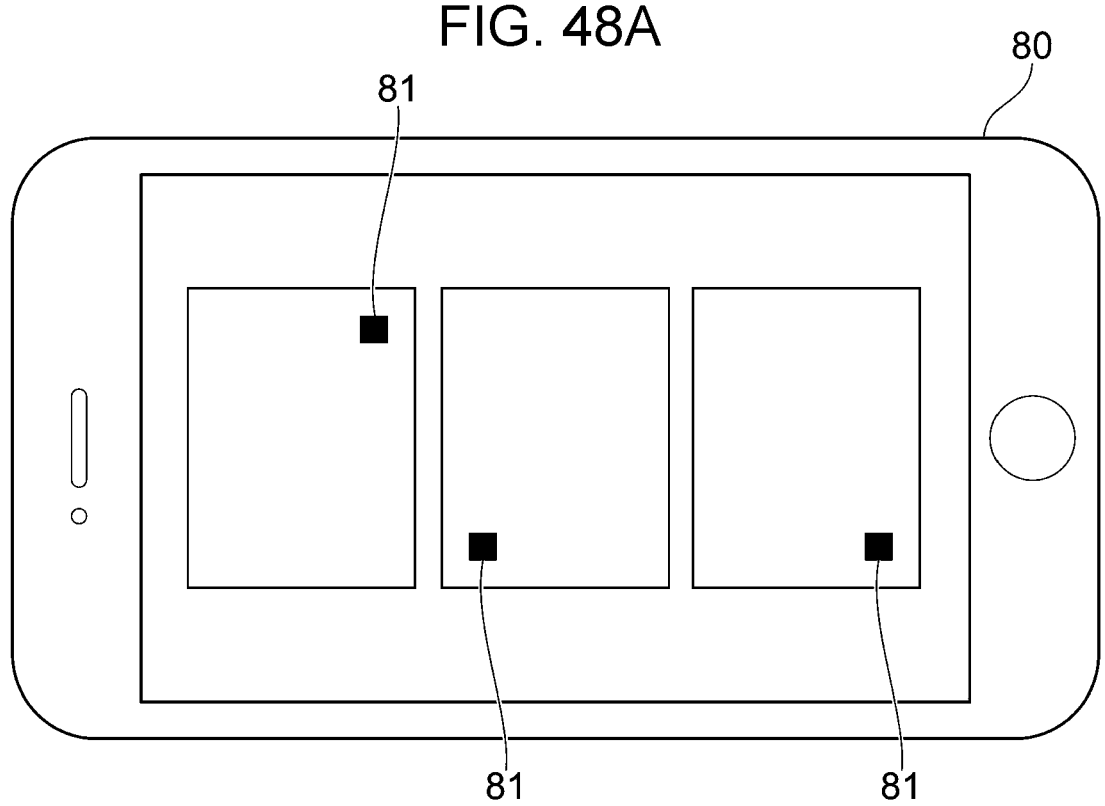
FIGS. 48A and 48B each illustrate an example of presenting positions at which QR codes are displayed in aerial images, with FIG. 48A illustrating a case where the positions of the QR codes are presented graphically and with FIG. 48B illustrating an example in which the positions of the QR codes are indicated using a text.
Figure 48B:
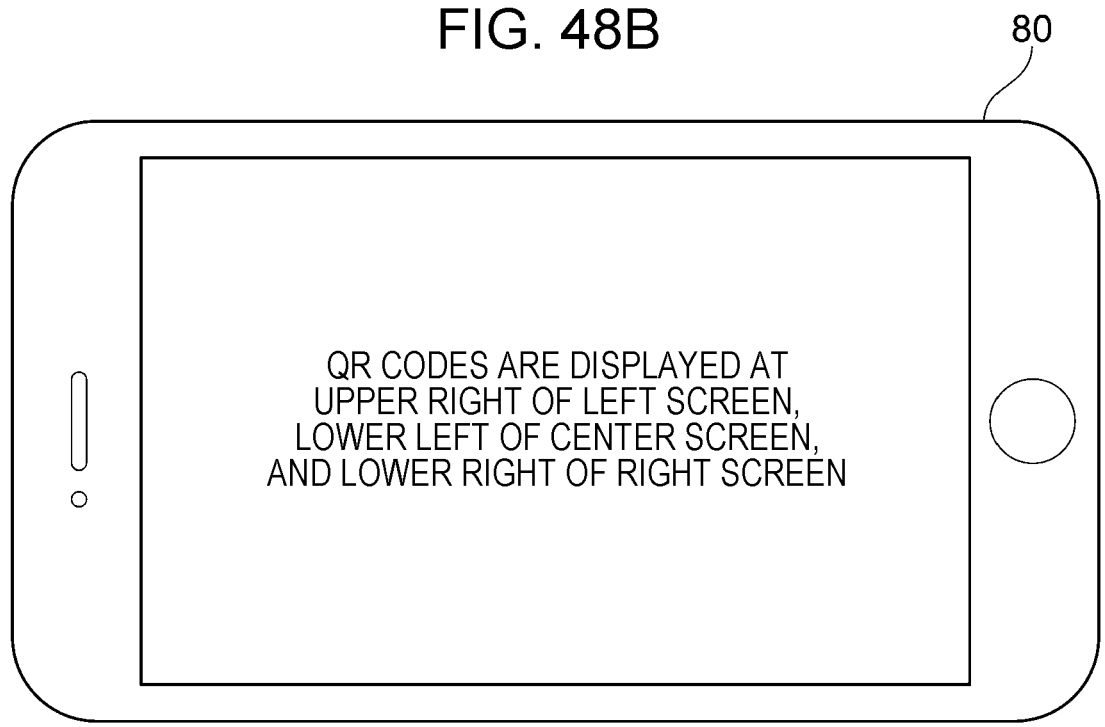

FIGS. 48A and 48B each illustrate an example of presenting positions at which QR codes are displayed in aerial images, with FIG. 48A illustrating a case where the positions of the QR codes are presented graphically and with FIG. 48B illustrating an example in which the positions of the QR codes are indicated using a text.

In the example of FIG. 48A, symbols 81 that indicate the positions of the QR codes are displayed at the upper right of the left aerial image, the lower left of the center aerial image, and the lower right of the right aerial image.

In the example in FIG. 48B, language saying "QR codes are displayed at upper right of left screen, lower left of center screen, and lower right of right screen" is displayed.

(5) In the exemplary embodiments discussed earlier, QR codes are used as examples of a two-dimensional code. However, different codes may also be used.

Figure 49A:
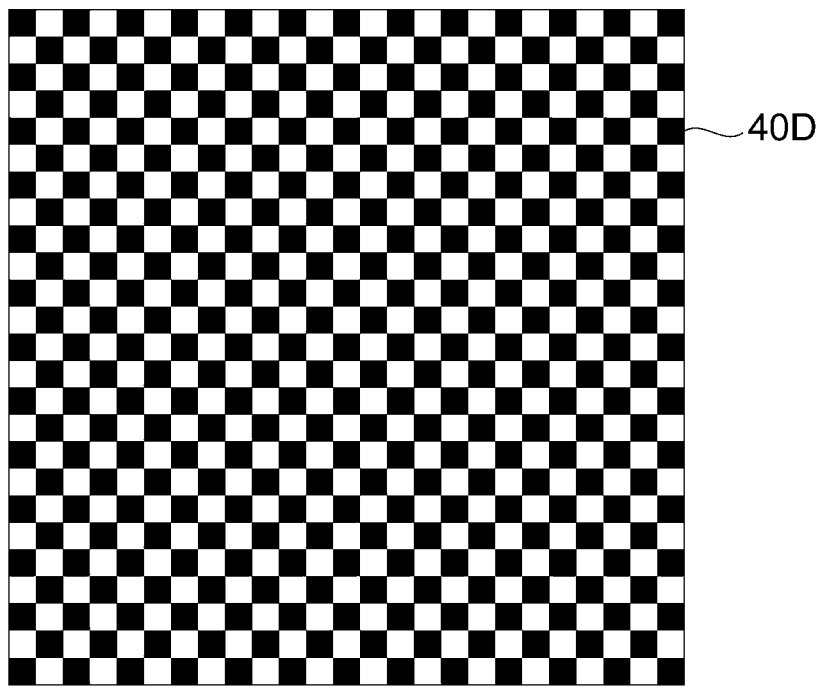
FIGS. 49A and 49B each illustrate another example of a two-dimensional code, with FIG. 49A illustrating an example of a dot pattern and with FIG. 49B illustrating another example of a dot pattern.
Figure 49B:
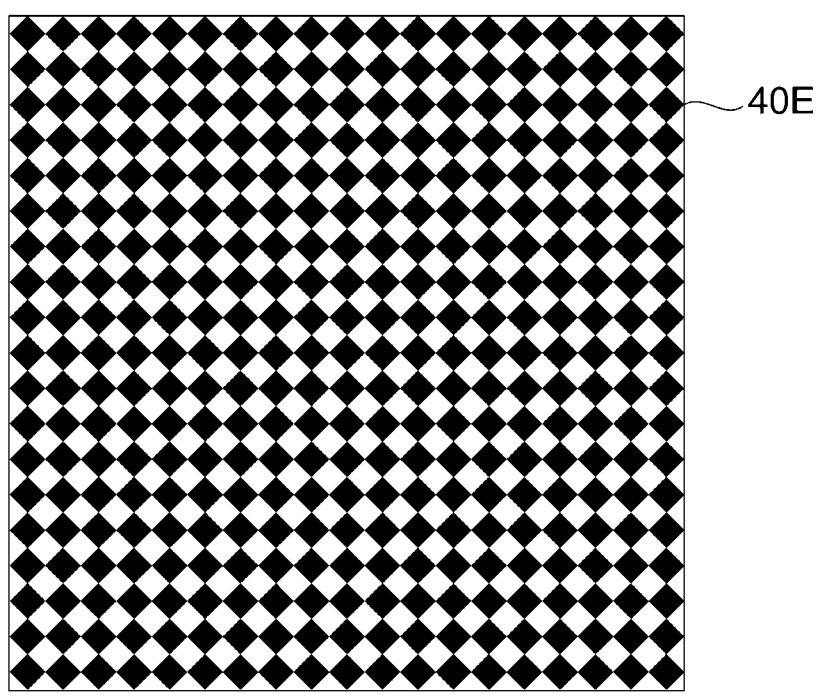

FIGS. 49A and 49B each illustrate another example of a two-dimensional code, with FIG. 49A illustrating an example of a dot pattern and with FIG. 49B illustrating another example of a dot pattern.

A code 40D illustrated in FIG. 49A and a code 40E illustrated in FIG. 49B indicate differences in information in accordance with differences in pattern.

Codes to be formed as aerial images are not limited to a two-dimensional code, and may be a one-dimensional code (e.g. a barcode).

Codes to be formed as aerial images may have a three-dimensional structure.

FIG. 50 illustrates an example of a code 400 that has a three-dimensional structure.

The code 400 illustrated in FIG. 50 has a structure in which three divided codes 40F to 40H are arranged in a layered manner in the depth direction (X direction).

The codes 40F to 40H are each a two-dimensional code. That is, the codes 40F to 40H are each formed on a plane defined by the Z axis and the Y axis.

In the case of FIG. 50, the divided codes 40F to 40H correspond to pieces of divided information obtained by dividing one piece of original information.

Thus, the original information may not be decoded unless all the divided codes 40F to 40H are read.

The code 400 may be formed such that the divided codes 40F to 40H are disposed so as not to overlap each other as seen from the user. In this case, the user is able to capture images of all the divided codes 40F to 40H at a time.

The code 400 may be formed such that the divided codes 40E to 40G corresponding to respective positions (layers) in the depth direction are captured in an image distinguishably.

In FIG. 50, the divided code 40F is formed in red, the divided code 40G is formed in green, and the divided code 40H is formed in yellow. In this case, images at different positions in the depth direction are decodable distinguishably.

Plural divided code images 40F to 40H at different positions in the depth direction may be formed in a time-sharing manner.

FIG. 51 illustrates an example of forming divided codes 40E to 40G one by one in a time-sharing manner, in which (A), (B), and (C) correspond to time T1, time T2, and time T3, respectively.

In FIG. 51, the divided code 40F is formed at time T1, the divided code 40G is formed at time T2, and the divided code 40H is formed at time T3.

(6) An automatic focus function that is used to read a QR code or a divided QR code is not described in relation to the exemplary embodiments discussed earlier. An automatic focus function of a phase detection type, in which a shift in focus is detected from the degree of a shift between two images, or of a contrast detection type, in which a state in which a captured image has a high contrast is detected as a state in focus, may be used, for example.

Infrared light or ultrasonic waves for distance measurement radiated toward the QR code 40 (see FIG. 1) or the divided QR code 40A (see FIG. 14), which is formed as the aerial image 10 (see FIG. 1), pass through such a code, rather than being reflected by the code. Thus, an automatic focus function of an active type may not be used.

The smartphone 80 (see FIG. 23) according to the exemplary embodiments discussed earlier is provided with a function of preferentially placing a focus on an image that has a characteristics of a QR code through image recognition in the case where an image capture mode for a QR code or the like is selected. If the smartphone 80 is provided with this function, it is possible to read a QR code in the case where the QR code is positioned in front of a different aerial image and in the case where the QR code is positioned in rear of a different aerial image.

(7) In the exemplary embodiments discussed earlier, the smartphone 80 (see FIG. 23) is used to read a code such as a QR code. However, any device that includes a code reading function, such as a tablet computer, a so-called digital camera, or a dedicated reading device, may also be used.

What is claimed is:

1. An information processing apparatus comprising:
a processor configured to function as:
a control unit that controls formation of a plurality of aerial images and of at least one graphical code image configured to be displayed on at least one of the plurality of aerial images,
wherein the control unit controls formation of the at least one graphical code image in accordance with information on a position of a user within a surrounding environment, and
wherein the control unit switches a position of the at least one graphical code image from one of the plurality of aerial images to another of the plurality of aerial images based upon the position of the user.

2. The information processing apparatus according to claim 1,
wherein the at least one graphical code image is a plurality of graphical code images, and the control unit disperses positions at which the plurality of graphical code images are formed.

3. The information processing apparatus according to claim 2,
wherein the control unit divides corresponding information, and assigns pieces of the divided information to the plurality of graphical code images.

4. The information processing apparatus according to claim 2,
wherein the control unit determines an arrangement such that the plurality of graphical code images are not observed so as to overlap each other as seen from a position of the user.

5. The information processing apparatus according to claim 2,
wherein the control unit determines an arrangement in which the graphical code images are dispersed such that only one image is readable at a time.

6. The information processing apparatus according to claim 3, wherein the control unit provides images that indicate a reading order to the corresponding graphical code images.

7. The information processing apparatus according to claim 3,
wherein the control unit notifies a terminal operated by a user of a reading order.

8. The information processing apparatus according to claim 3,
wherein the control unit forms the corresponding graphical code images one by one in accordance with a reading order.

9. The information processing apparatus according to claim 1,
wherein the control unit forms the code image at a position at which the code image is not affected by external light.

10. The information processing apparatus according to claim 1,
wherein the control unit controls formation of the code image such that a viewability of the code image is enhanced with respect to the surrounding environment.

11. The information processing apparatus according to claim 1,
wherein the control unit notifies a terminal operated by the user of a position at which the at least one graphical code image is formed.

12. The information processing apparatus according to claim 1,
wherein, in a case where the graphical code image is formed along a curved surface, the control unit deforms the code image such that the code image is planarly captured in an image.

13. The information processing apparatus according to claim 1,
wherein, in a case where an image that is different from the graphical code image is formed in the air, the control unit disposes the code image on a front side as seen by a user.

14. An information processing apparatus comprising:
a processor configured to function as:
a generation unit that generates data on a at least one graphical code image configured to be displayed on at least one of a plurality of aerial images,
wherein the generation unit generates the data on the at least one graphical code image in accordance with information on a position of a user within a surrounding environment, and
wherein the processor is further configured to switch a position of the at least one graphical code image from one of the plurality of aerial images to another of the plurality of aerial images based upon the position of the user.

15. The information processing apparatus according to claim 14,
wherein the at least one graphical code image is a plurality of graphical code images, and the generation unit divides corresponding information into a plurality of pieces, and assigns the plurality of pieces of information to the plurality of graphical code images.

16. The information processing apparatus according to claim 15,
wherein the generation unit provides images that indicate a reading order to the corresponding graphical code images.

17. The information processing apparatus according to claim 15, wherein the generation unit notifies a terminal operated by a user of a reading order.

18. The information processing apparatus according to claim 15,
wherein the generation unit instructs formation of the corresponding graphical code images in accordance with a reading order.

19. The information processing apparatus according to claim 15,
wherein the generation unit disposes the plurality of graphical code images such that the plurality of graphical code images are not observed so as to overlap each other as seen from a position of a user.

20. The information processing apparatus according to claim 15,
wherein the generation unit disposes the graphical code images as being dispersed such that only one image is readable at a time.

21. The information processing apparatus according to claim 14,
wherein the generation unit designates a position at which the at least one graphical code image is formed on a basis of information on a position at which the at least one graphical code image is not affected by external light.

22. The information processing apparatus according to claim 14,
wherein the generation unit controls formation of the at least one graphical code image such that a viewability of the at least one graphical code image is enhanced with respect to the surrounding environment.

23. The information processing apparatus according to claim 14,
wherein the generation unit notifies a terminal operated by a user of a position at which the graphical code image is formed.

24. The information processing apparatus according to claim 14,
wherein, in a case where the graphical code image is formed along a curved surface, the generation unit deforms the graphical code image such that the graphical code image is planarly captured in an image.

25. The information processing apparatus according to claim 14,
wherein, in a case where an image that is different from the code image is formed in the air, the processor disposes the code image on a front side as seen by a user.

26. A non-transitory computer readable medium storing a program causing a computer to function as:
a control unit that controls formation of a plurality of aerial images and of at least one graphical code image configured to be displayed on at least one of the plurality of aerial images,
wherein the control unit controls formation of the at least one graphical code image in accordance with information on a position of a user within a surrounding environment, and wherein the control unit switches a position of the at least one graphical code image from one of the plurality of aerial images to another of the plurality of aerial images based upon the position of the user.

27. A non-transitory computer readable medium storing a program causing a computer to function as:
a generation unit that generates data on a at least one graphical code image configured to be displayed on at least one of a plurality of aerial images, wherein the generation unit generates the data on the at least one graphical code image in accordance with information on a position of a user within a surrounding environment, and wherein the processor is further configured to switch a position of the at least one graphical code image from one of the plurality of aerial images to another of the plurality of aerial images based upon the position of the user.

\* \* \* \* \*